United States Patent
Ahn et al.

(10) Patent No.: US 11,943,817 B2
(45) Date of Patent: Mar. 26, 2024

(54) METHOD FOR SWITCHING OPERATION MODES IN WIRELESS COMMUNICATION SYSTEM, AND DEVICE THEREFOR

(71) Applicant: LG ELECTRONICS INC., Seoul (KR)

(72) Inventors: Joonkui Ahn, Seoul (KR); Changhwan Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 376 days.

(21) Appl. No.: 17/434,115

(22) PCT Filed: Feb. 26, 2020

(86) PCT No.: PCT/KR2020/002775
§ 371 (c)(1),
(2) Date: Aug. 26, 2021

(87) PCT Pub. No.: WO2020/175923
PCT Pub. Date: Sep. 3, 2020

(65) Prior Publication Data
US 2022/0141887 A1 May 5, 2022

(30) Foreign Application Priority Data
Feb. 26, 2019 (KR) .................. 10-2019-0022594

(51) Int. Cl.
*H04W 74/08* (2009.01)
*H04L 1/00* (2006.01)
(Continued)

(52) U.S. Cl.
CPC ....... *H04W 74/0841* (2013.01); *H04L 1/0025* (2013.01); *H04W 4/70* (2018.02);
(Continued)

(58) Field of Classification Search
None
See application file for complete search history.

(56) References Cited

U.S. PATENT DOCUMENTS 7,969,924 B2 6/2011 Young et al.
9,906,991 B1 * 2/2018 Peddiraju .............. H04W 36/36

FOREIGN PATENT DOCUMENTS

WO WO2017146342 8/2017

OTHER PUBLICATIONS

3GPP 5G, LTE; Evolved Universal Terrestrial Radio Access (E-UTRA); Radio Resource Control (RRC); Protocol specification (3GPP TS 36.331 version 15.3.0 Release 15), Oct. 2018, ETSI TS 136 331 V15.3.0, 916 pages.
(Continued)

*Primary Examiner* — Suhail Khan
(74) *Attorney, Agent, or Firm* — Fish & Richardson P.C.

(57) ABSTRACT

The present specification, relates to a method for switching Internet of Things (IoT) modes in a wireless communication system and a device therefor.
According to the present specification, the method whereby a terminal switches IoT modes in a wireless communication system comprises the steps of: transmitting, in a radio resource control (RRC) connected state, an operation mode switching request for requesting switching from a source IoT mode, which is the current operation mode of the terminal, to a base station via a predetermined physical channel; receiving, from the base station, an operation mode switching response to the operation mode switching request; and switching from the source IoT mode to a predetermined target IoT mode on the basis of the operation mode switching response.

20 Claims, 29 Drawing Sheets

(51) Int. Cl.
*H04W 4/70* (2018.01)
*H04W 72/0446* (2023.01)
*H04W 72/0453* (2023.01)
*H04W 74/00* (2009.01)

(52) U.S. Cl.
CPC ... *H04W 72/0446* (2013.01); *H04W 72/0453* (2013.01); *H04W 74/004* (2013.01); *H04W 74/0866* (2013.01)

(56) References Cited

OTHER PUBLICATIONS

Huawei, HiSilicon, "Use of LTE Control Channel Region for DL transmission," R2-1900457, Revision of R2-1816922, Presented at 3GPP TSG-RAN2 Meeting #105, Athens, Greece, Feb. 25-Mar. 1, 2019, 3 pages.
LG Electronics, "Summary of CE mode A and B improvements for non-BL UEs," R1-1813726, Presented at 3GPP TSG RAN WG1 Meeting #95, Spokane, USA, Nov. 12-16, 2018, 12 pages.
PCT International Search Report in International Appln. No. PCT/KR2020/002775, dated Jun. 15, 2020, 7 pages.

* cited by examiner

[FIG. 1]
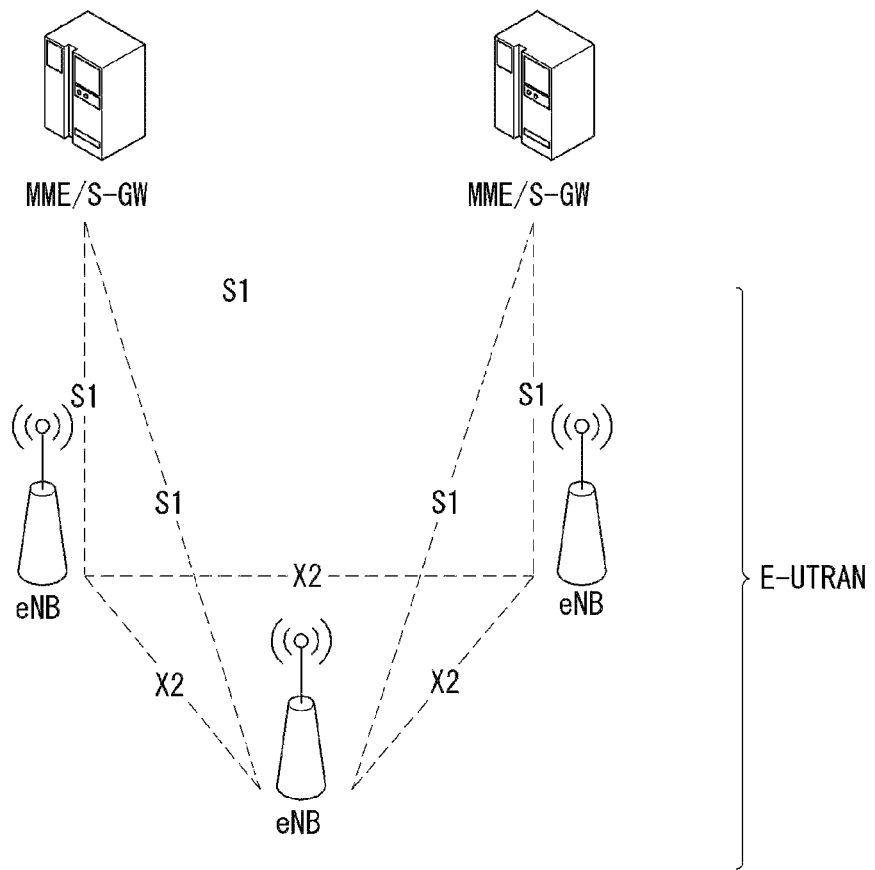

[FIG. 2]
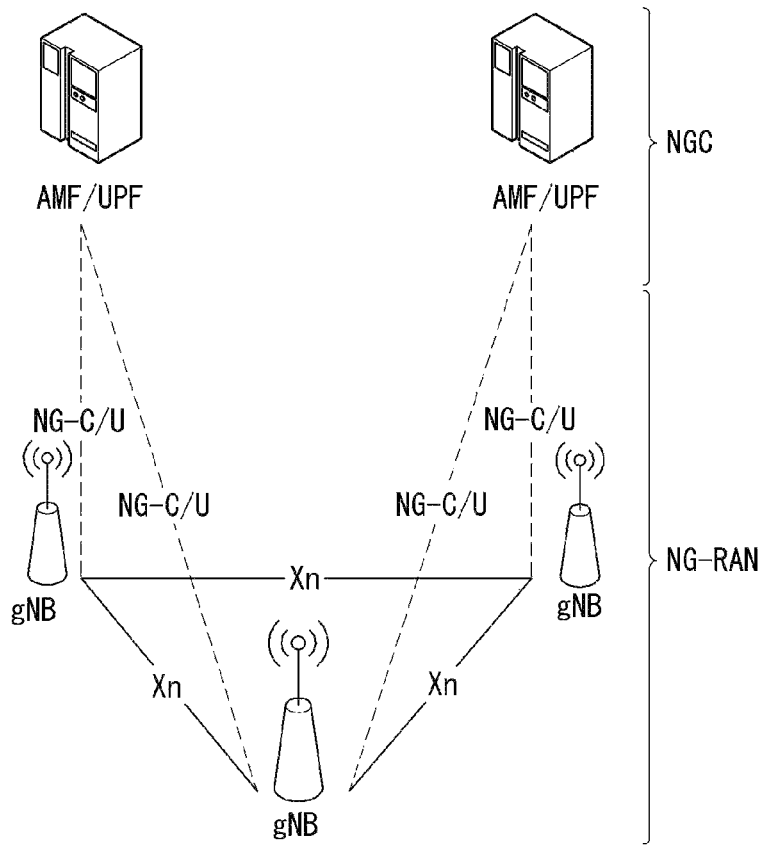
[FIG. 3]
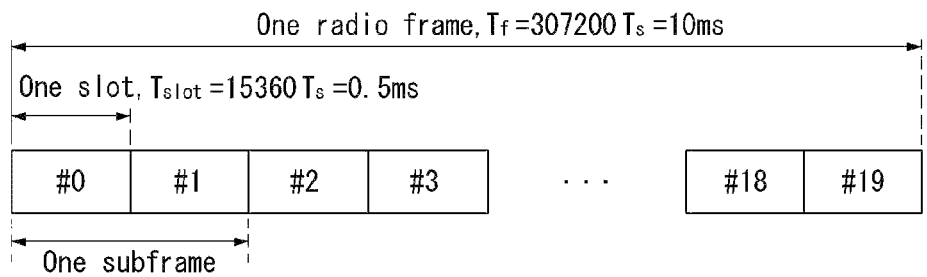

[FIG. 4]
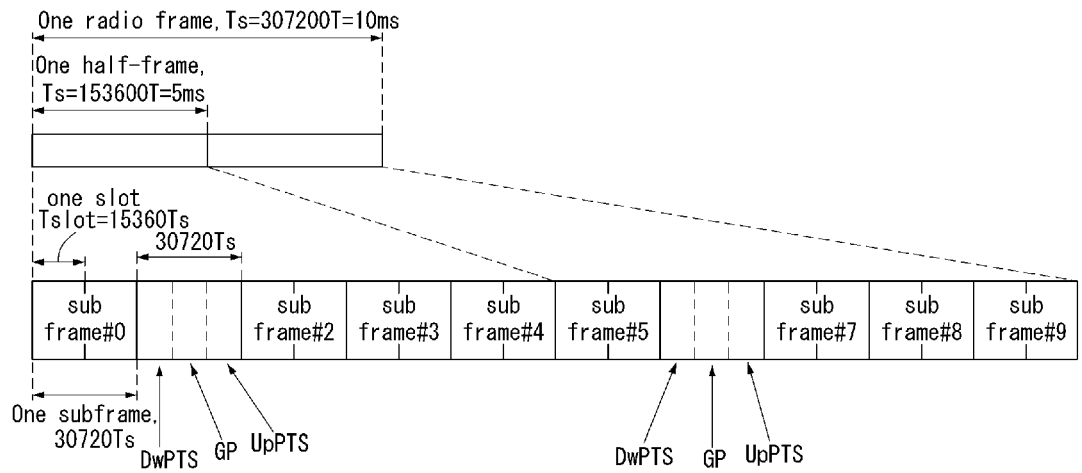
[FIG. 5]
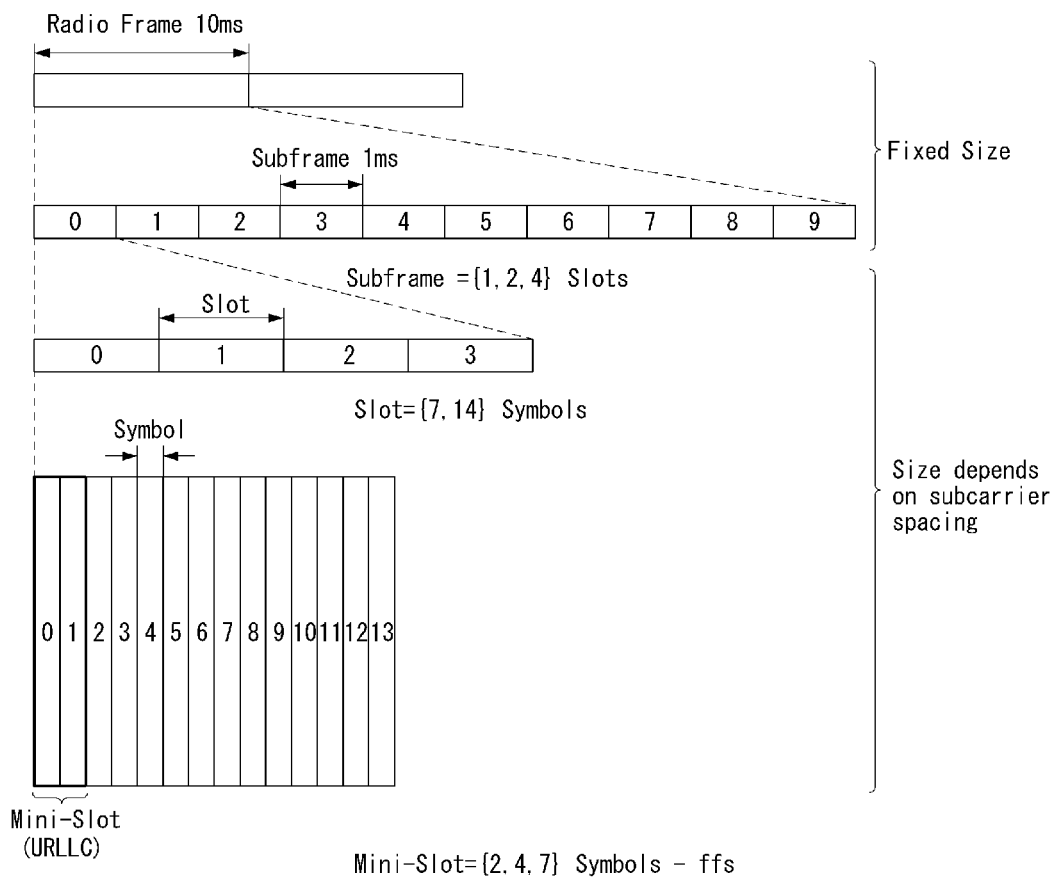

[FIG. 6]
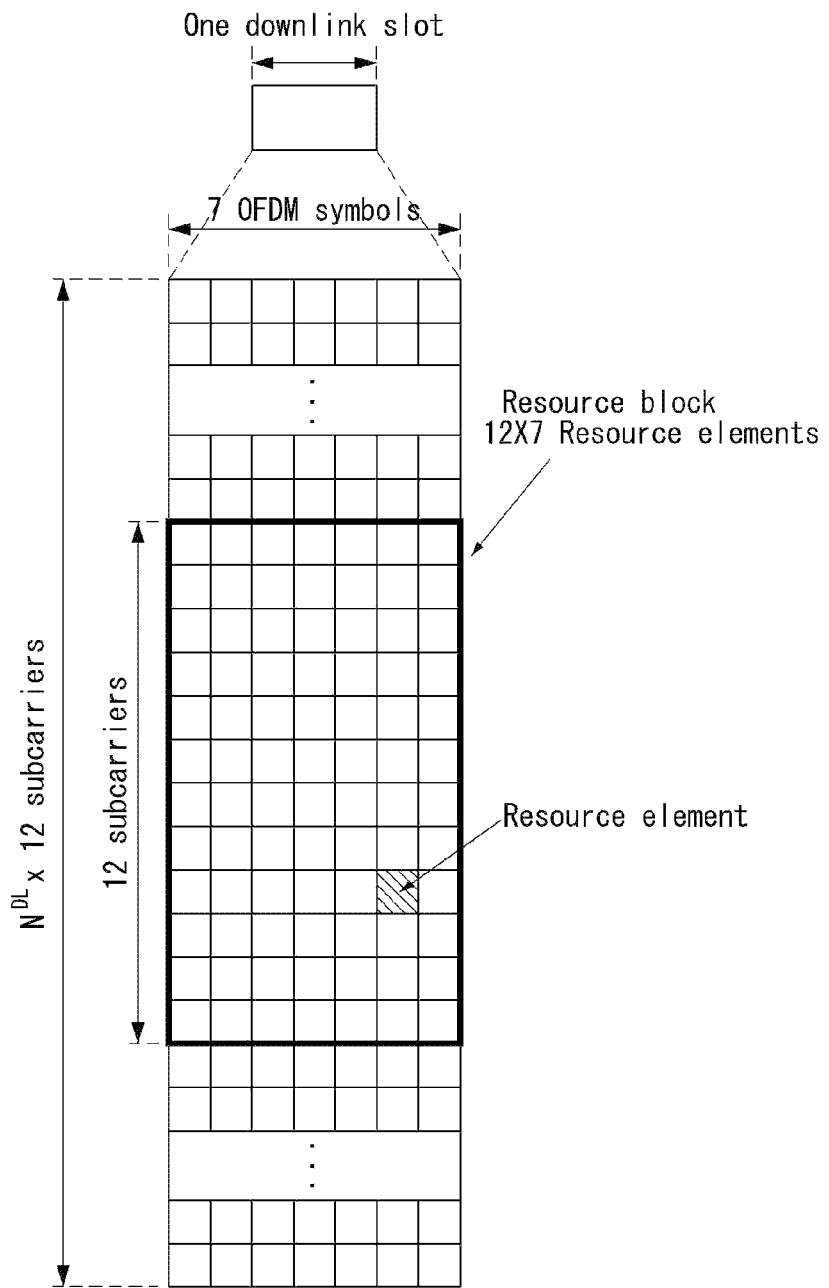

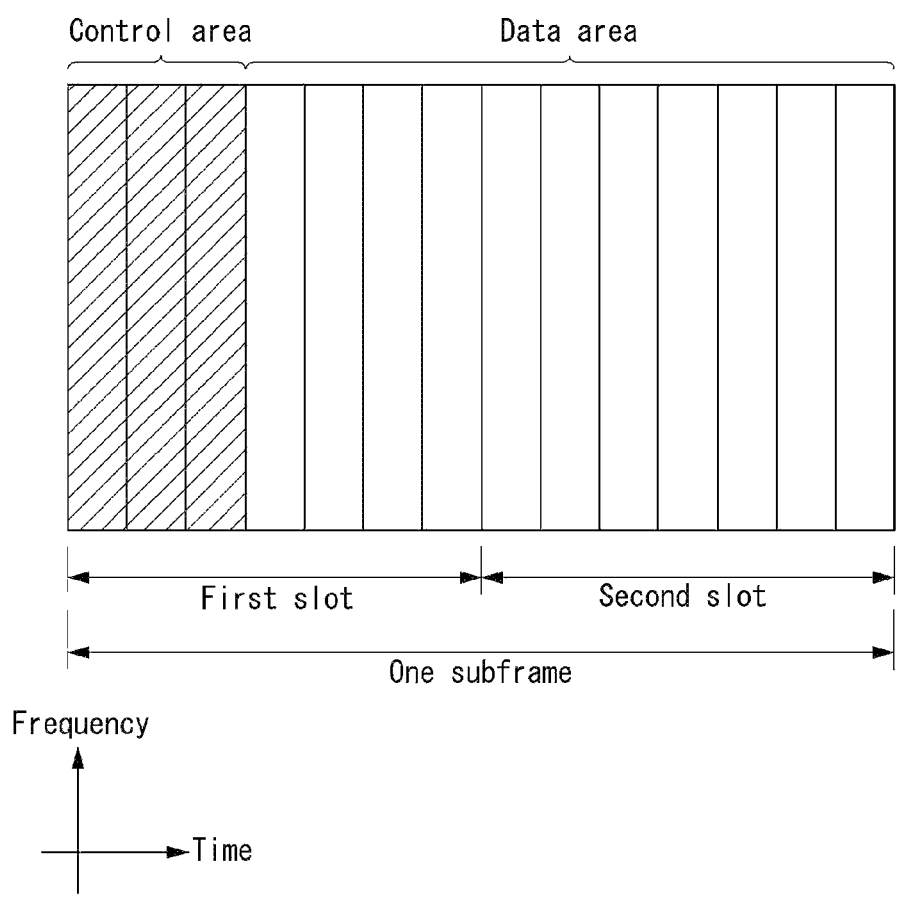

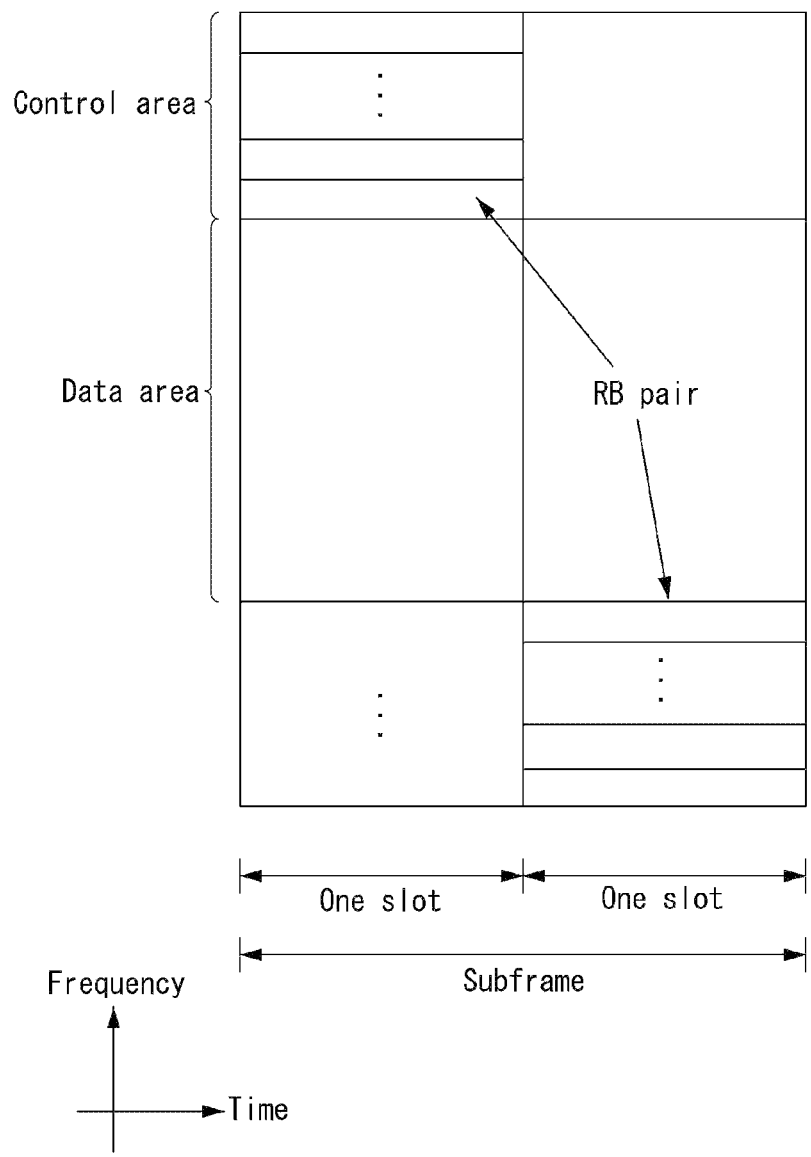

[FIG. 9]
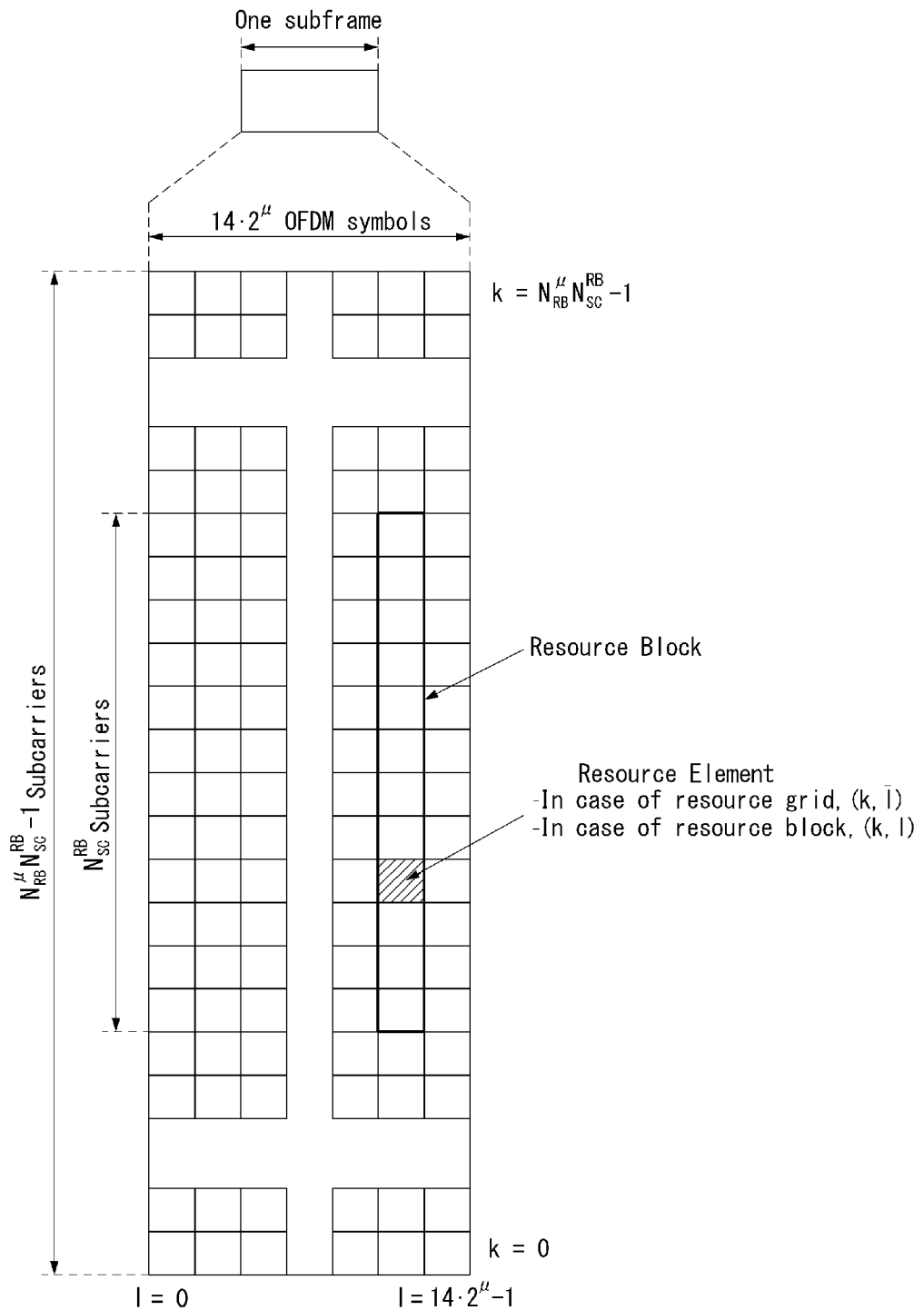

[FIG. 10]
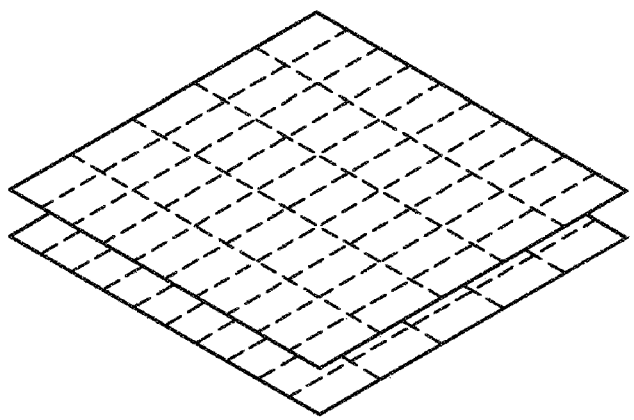
Antennas port A
Antennas port B  } Numerology X
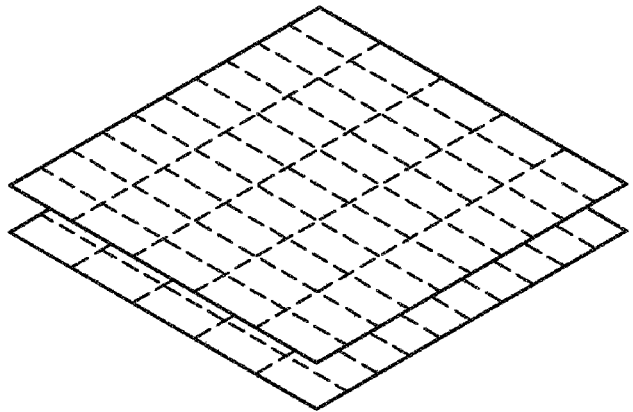
Antennas port A
Antennas port B  } Numerology Y

[FIG. 11]
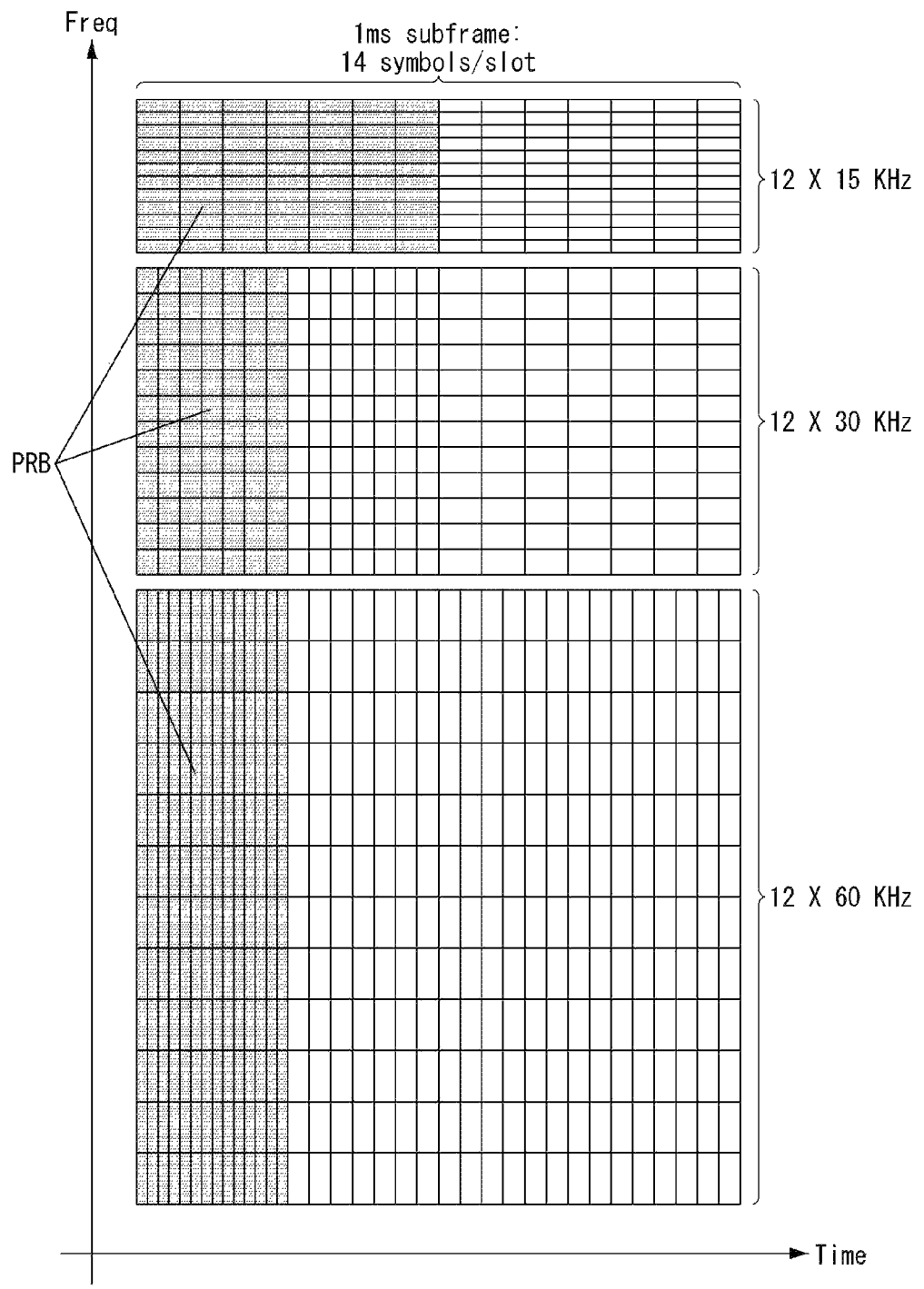

[FIG. 12]
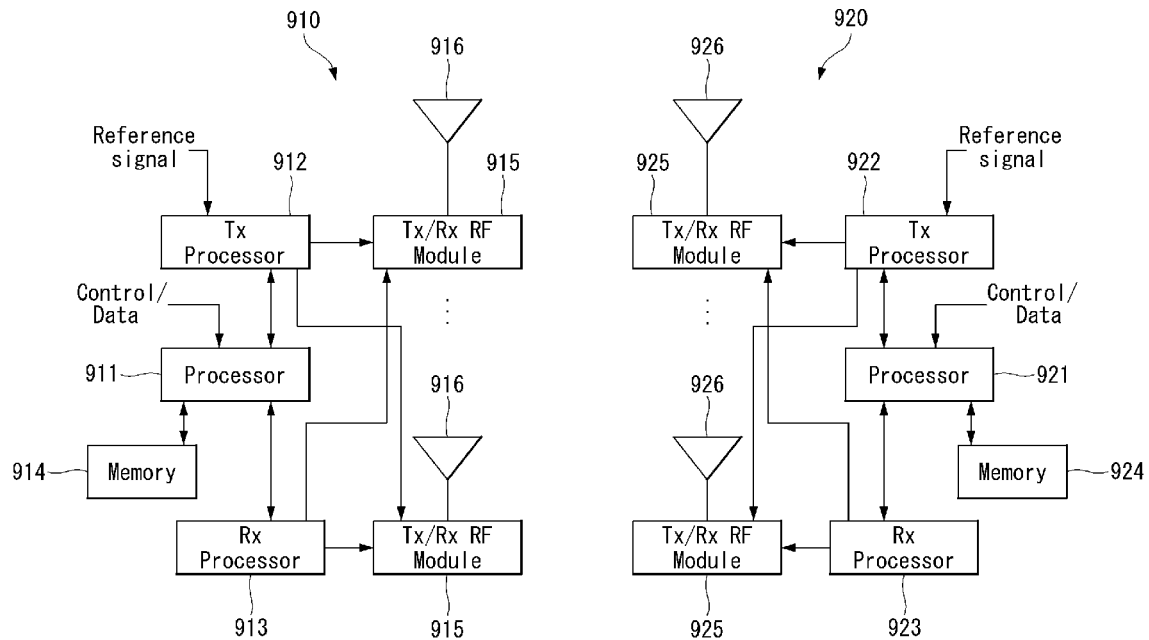
[FIG. 13A]
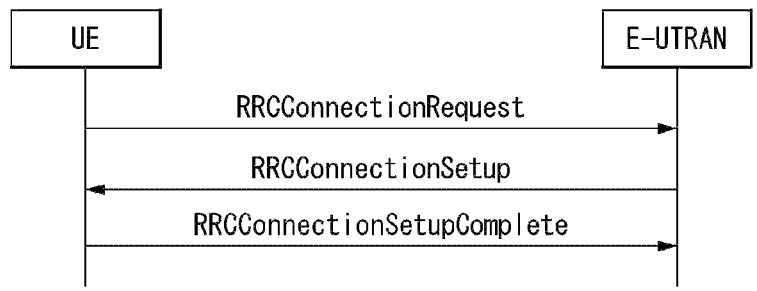
[FIG. 13B]
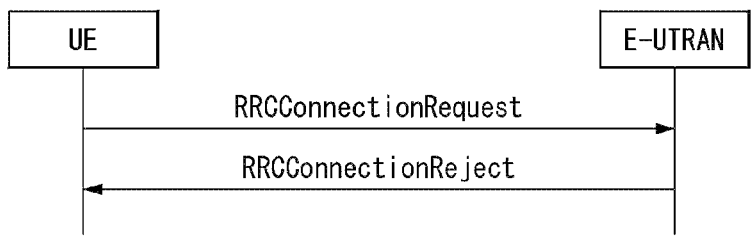

[FIG. 13C]
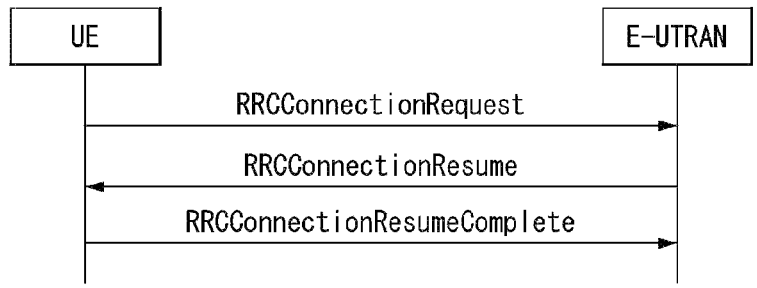
[FIG. 13D]
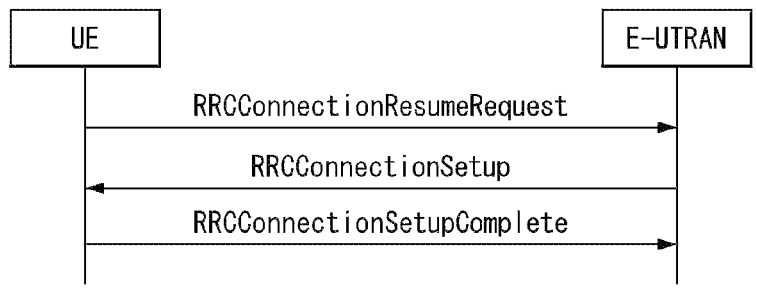
[FIG. 13E]
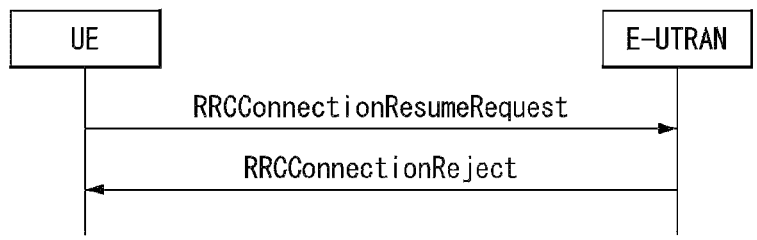
[FIG. 14A]
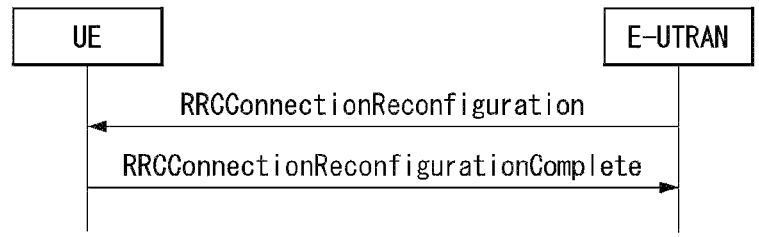

[FIG. 14B]
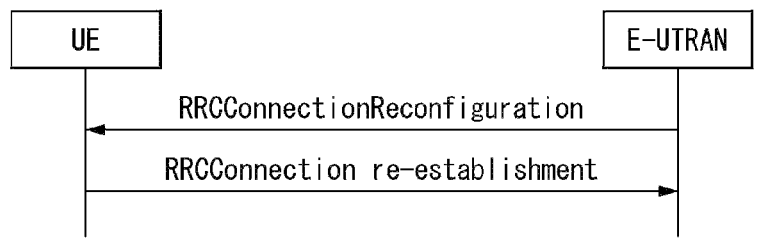
[FIG. 15]
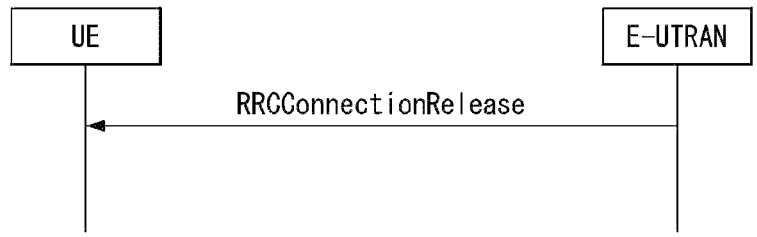

[FIG. 16]
(a) 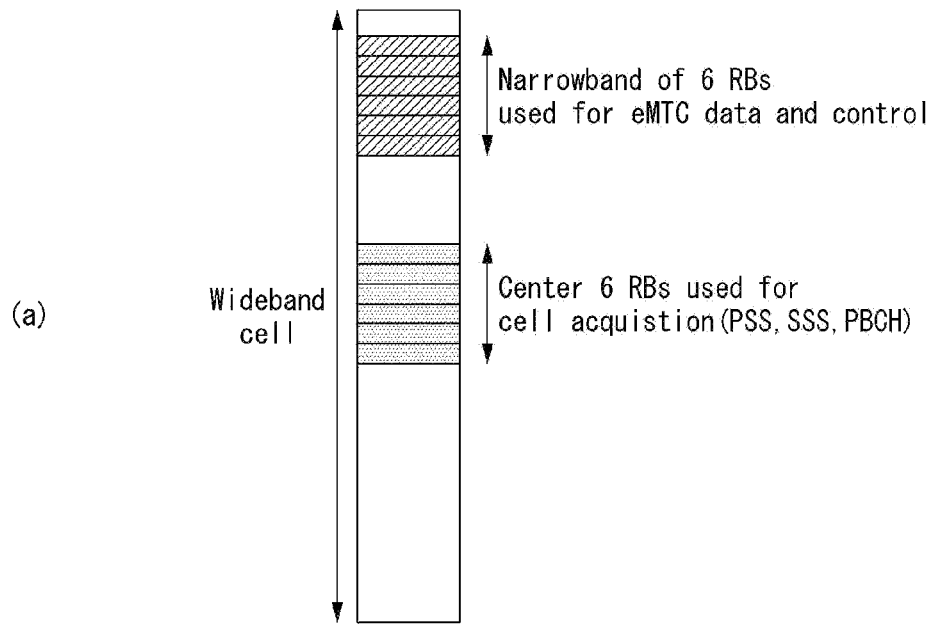
(b) 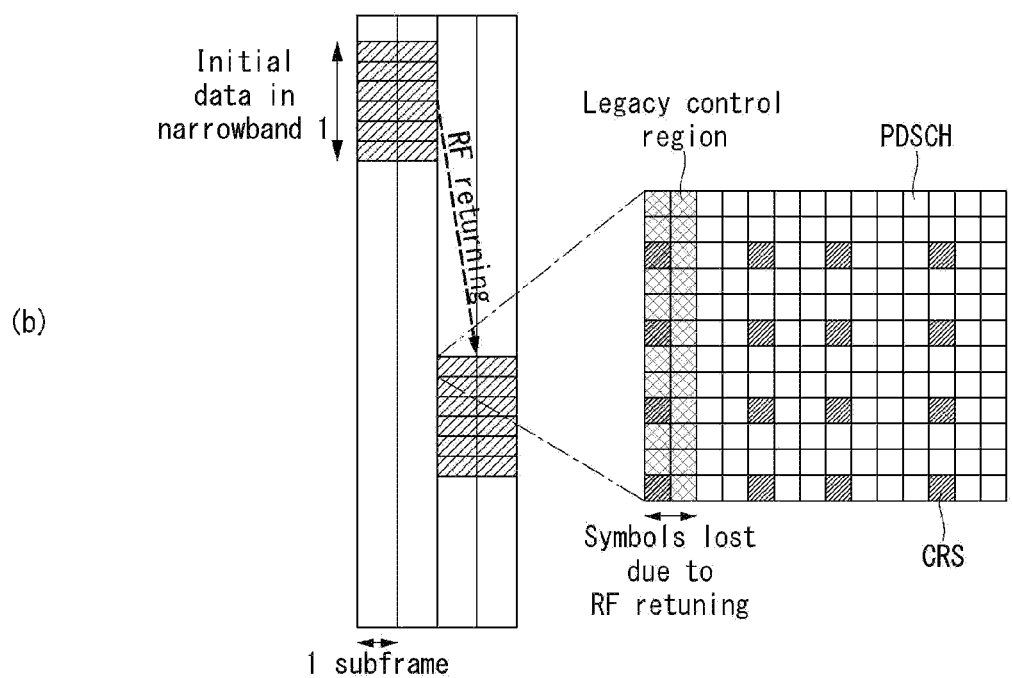

[FIG. 17]
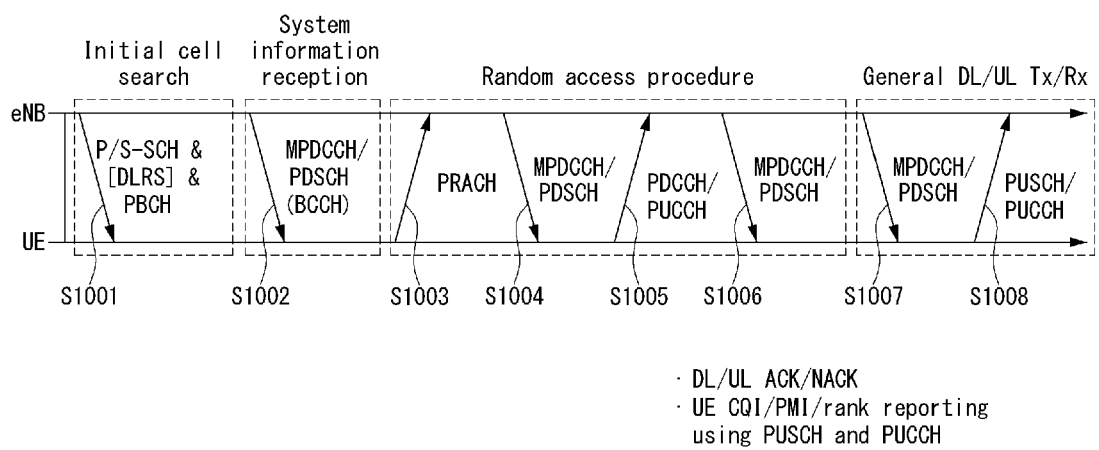

[FIG. 18]
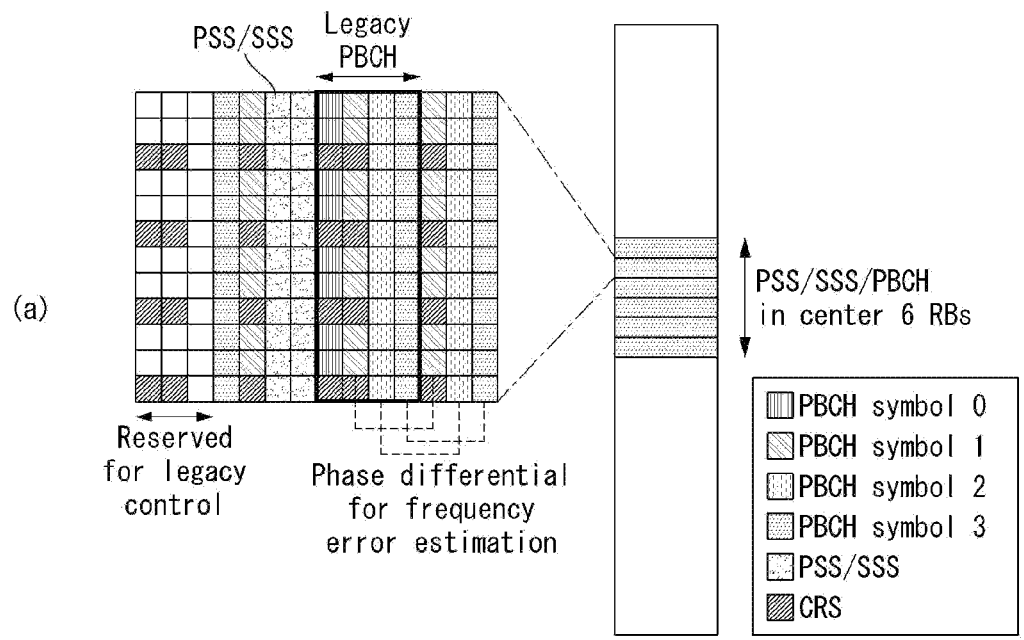
(a)
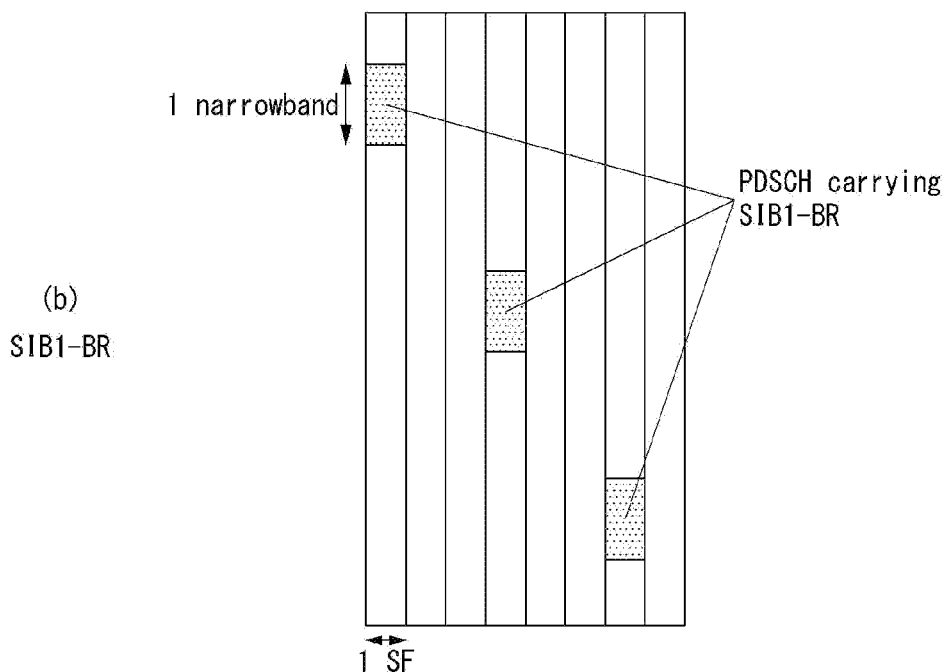
(b) SIB1-BR

[FIG. 19]
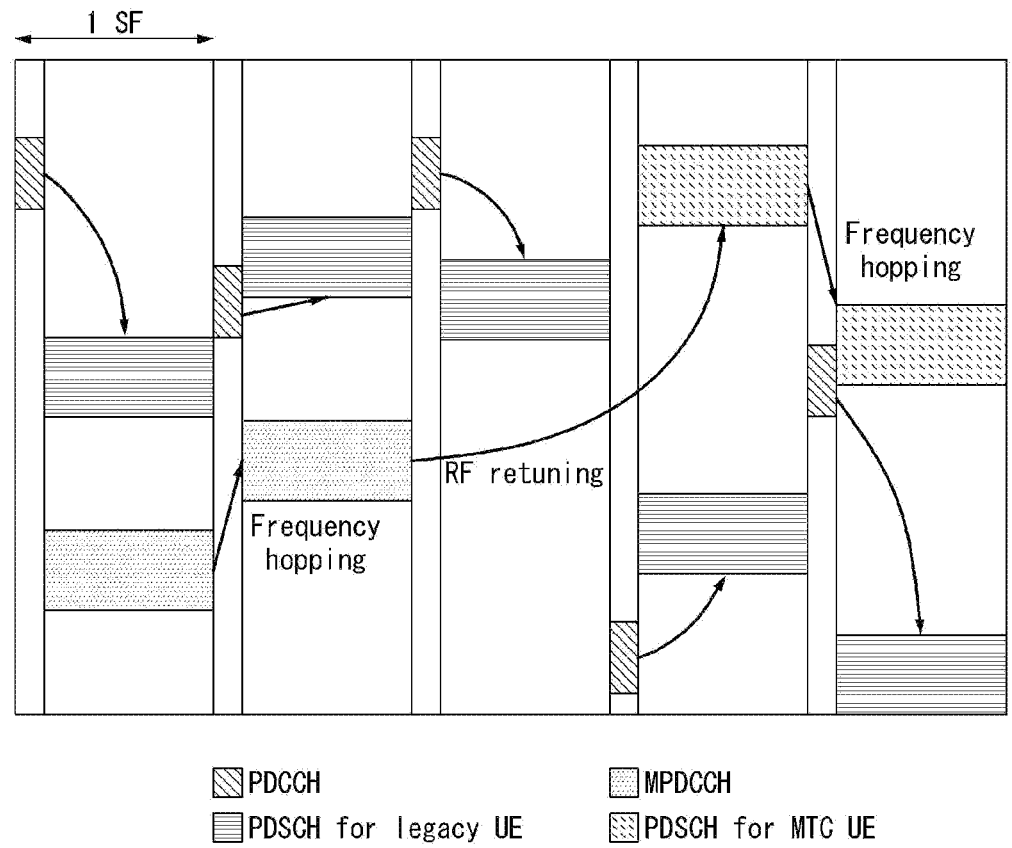
[FIG. 20]
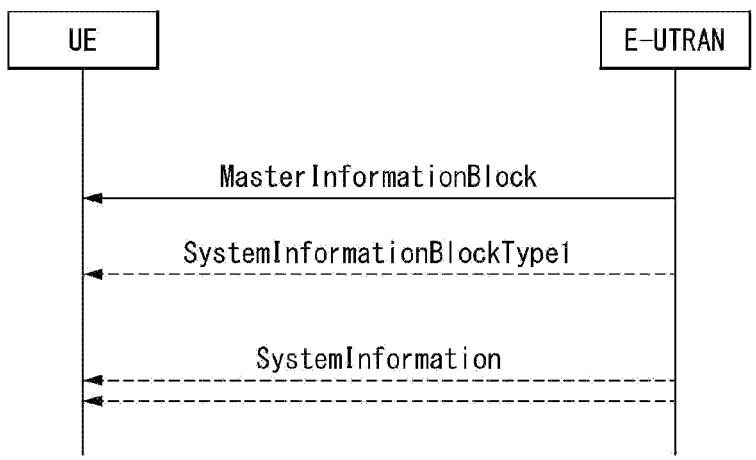

[FIG. 21]
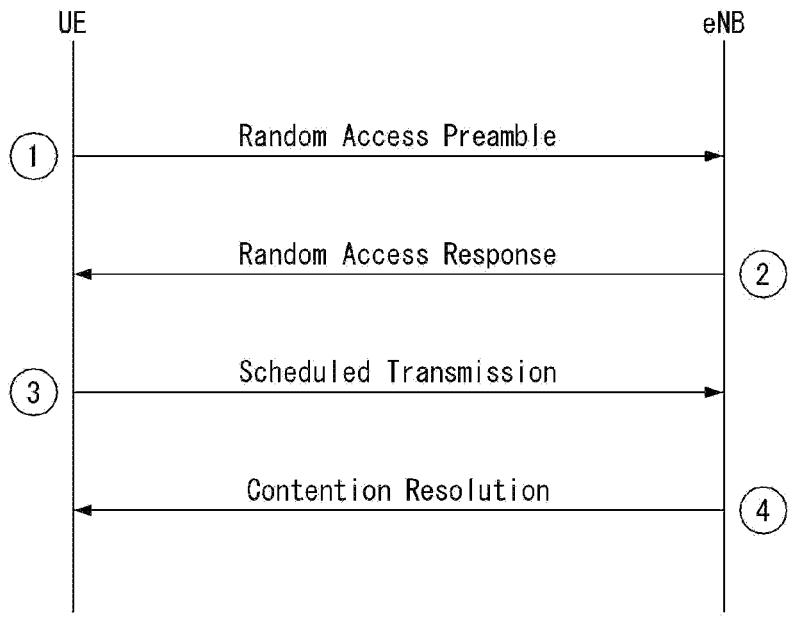
[FIG. 22]
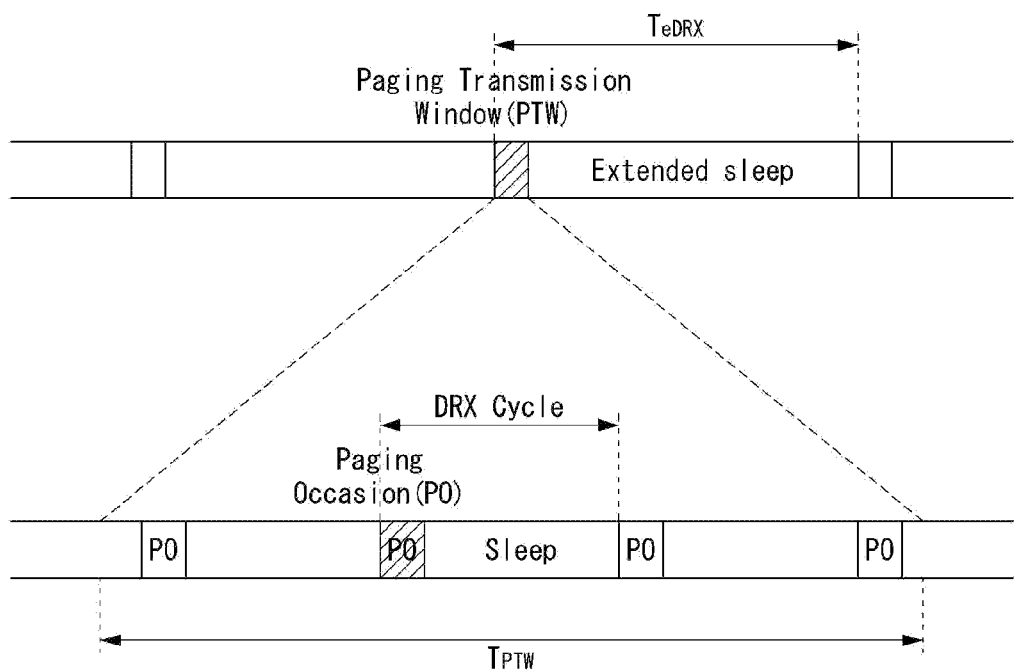

[FIG. 23]
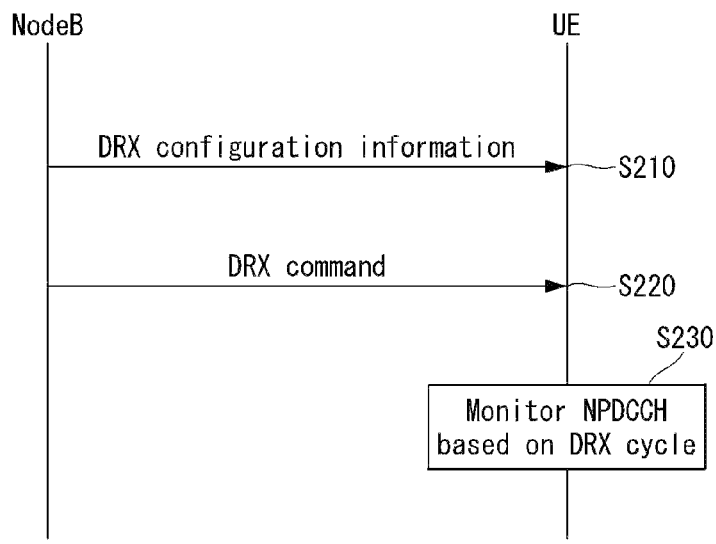
[FIG. 24]
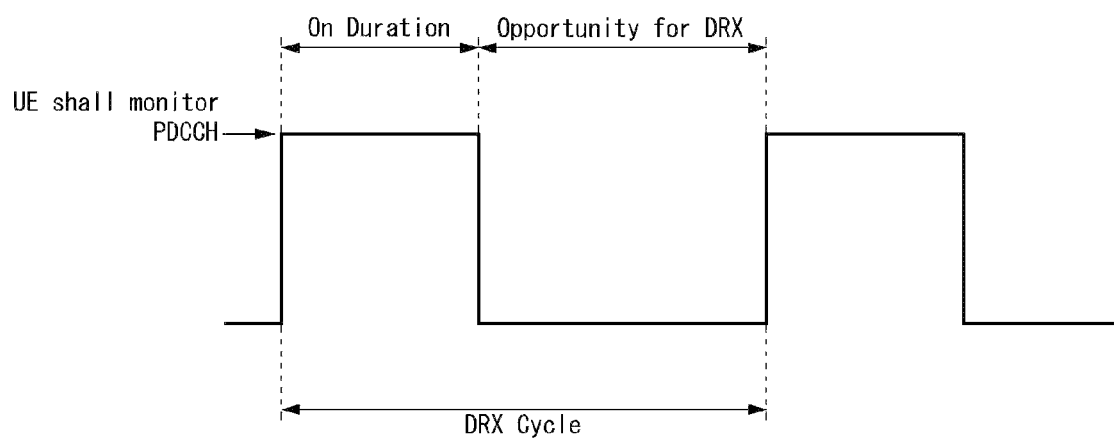

[FIG. 25]
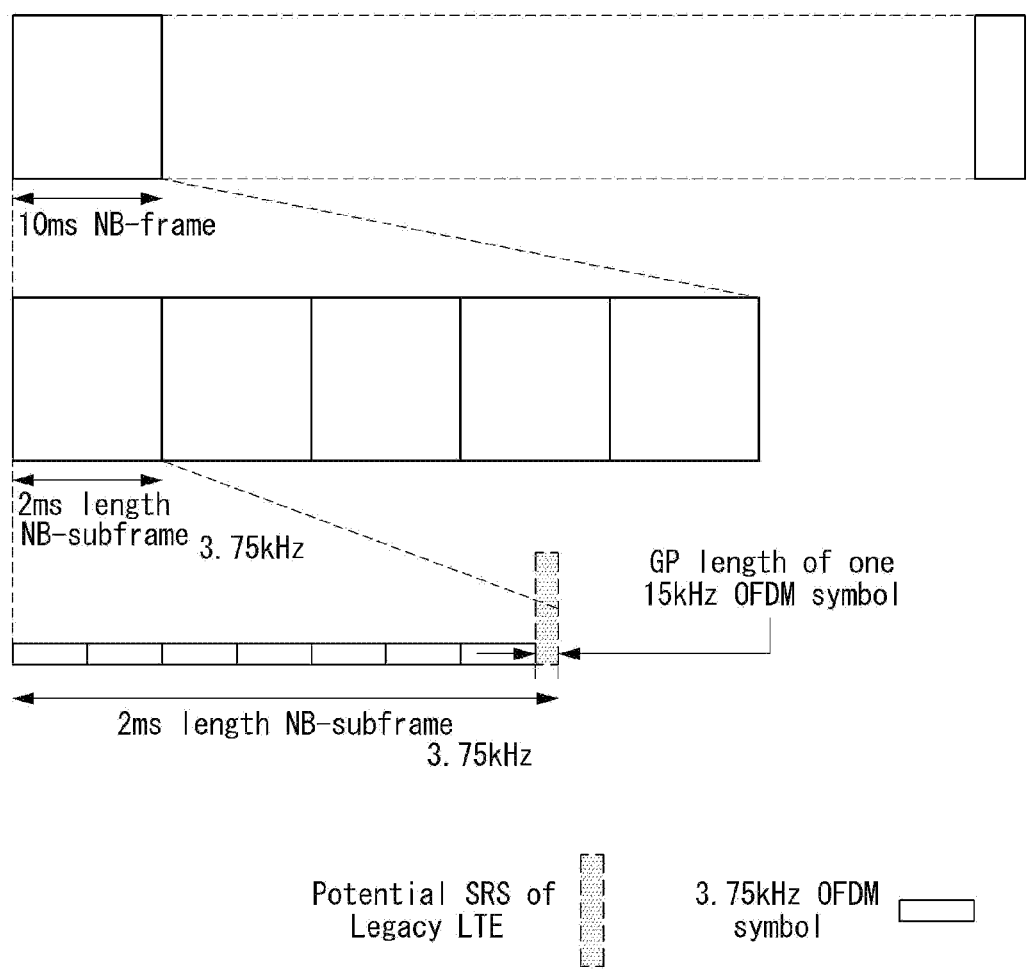

[FIG. 26]
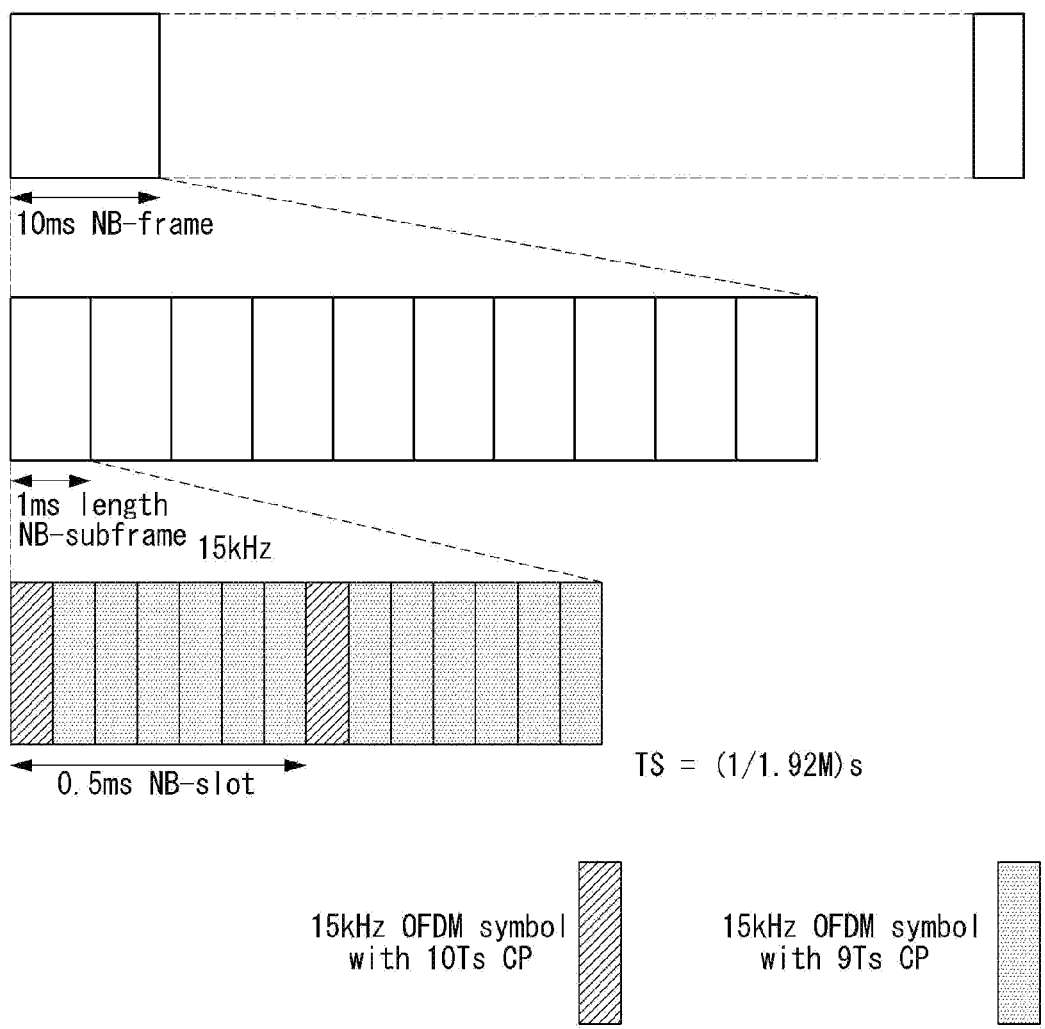

[FIG. 27]
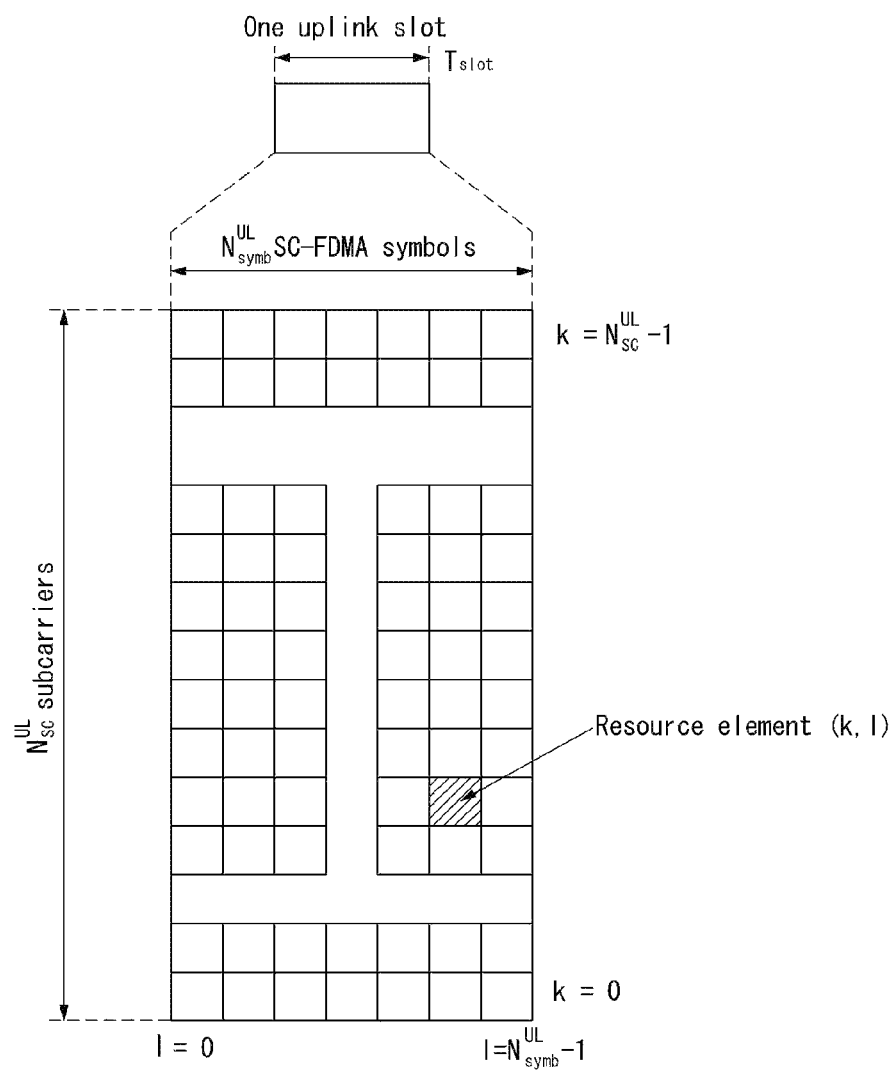

[FIG. 28]
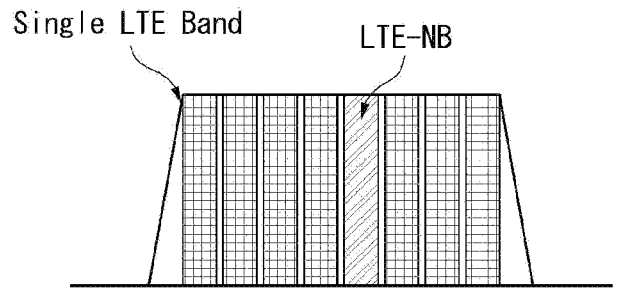
(a) In-band system
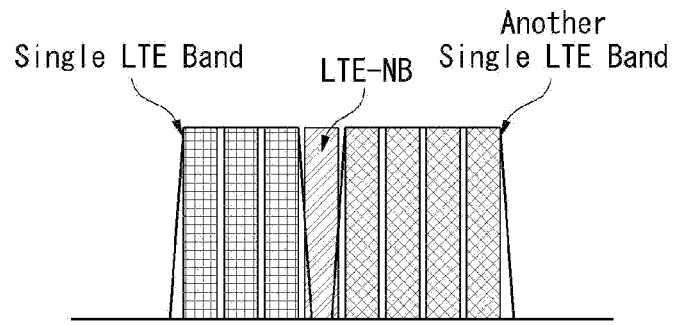
(b) Guard-band system
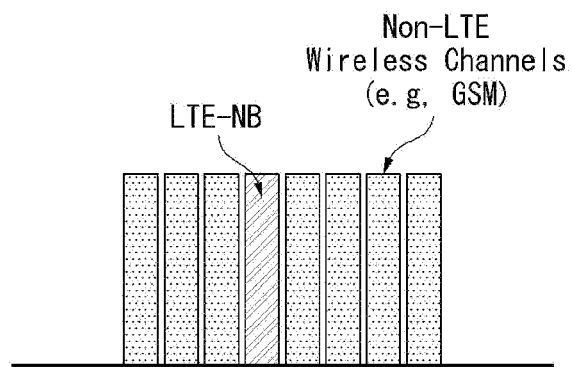
(c) Stand-alone system

[FIG. 29]
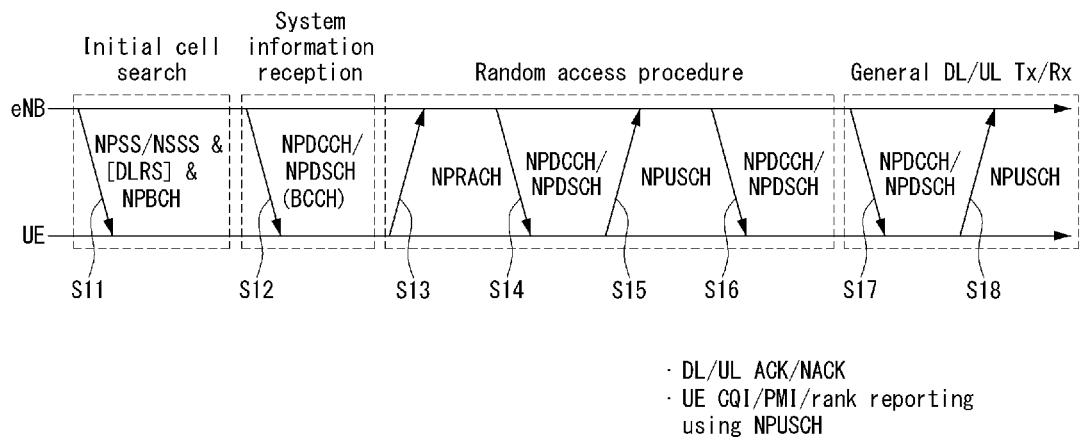
[FIG. 30]
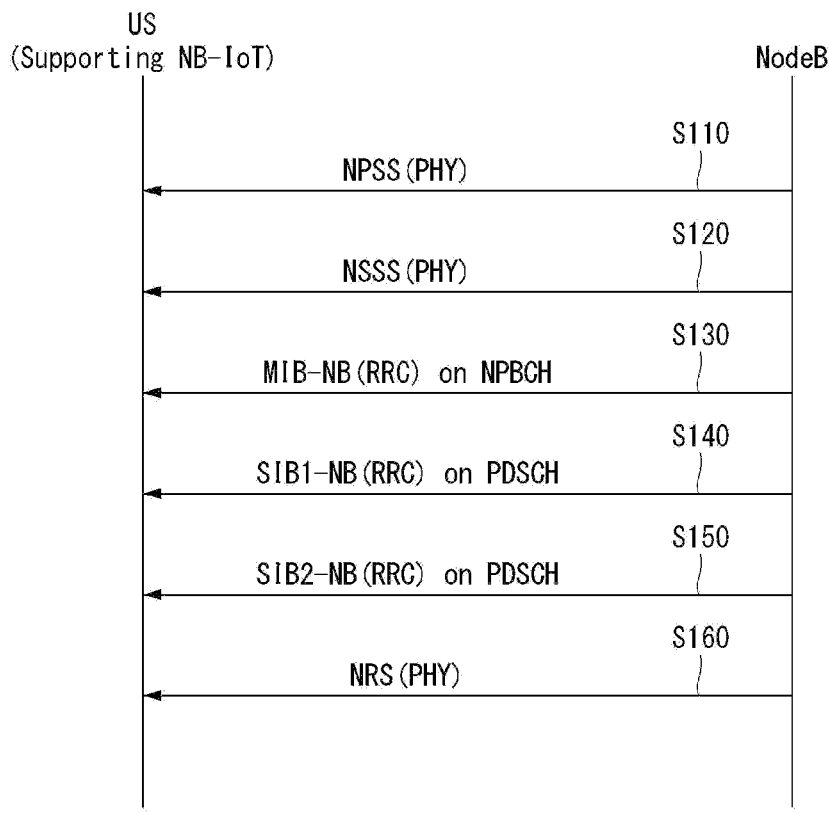

[FIG. 31]
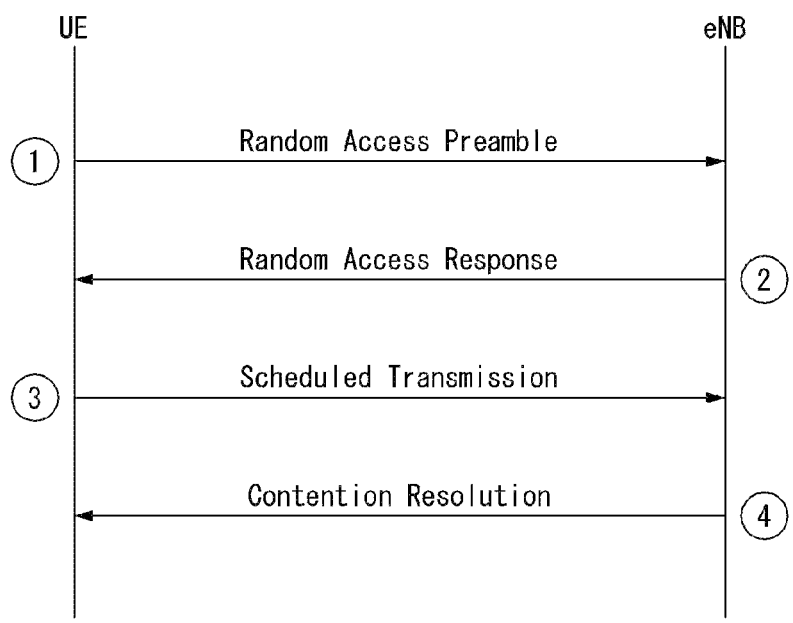
[FIG. 32]
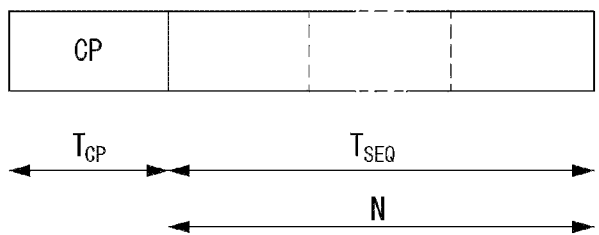

[FIG. 33]
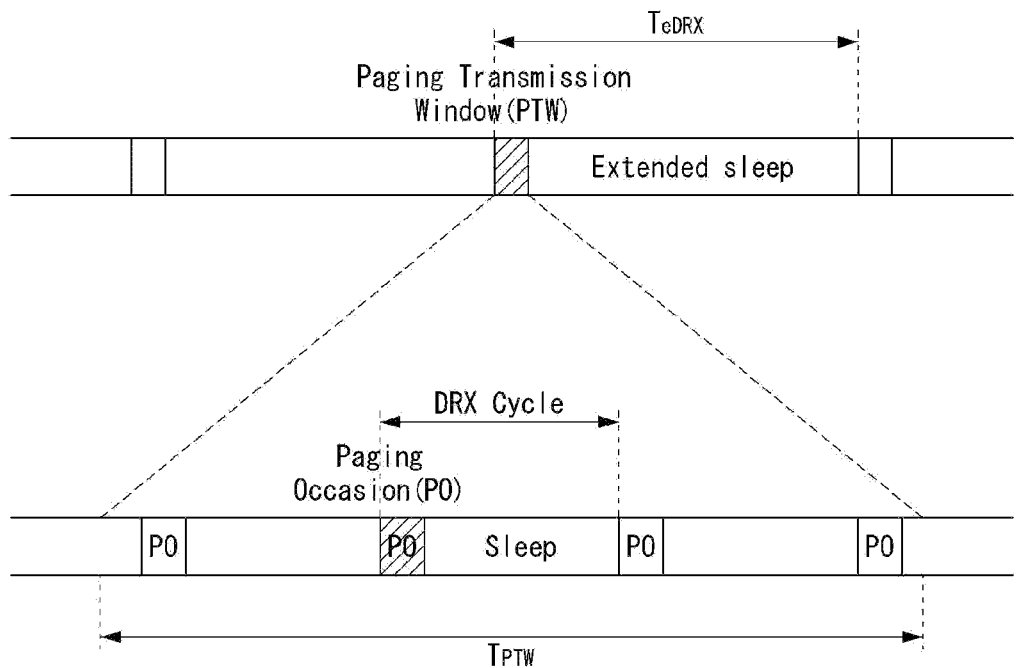
[FIG. 34]
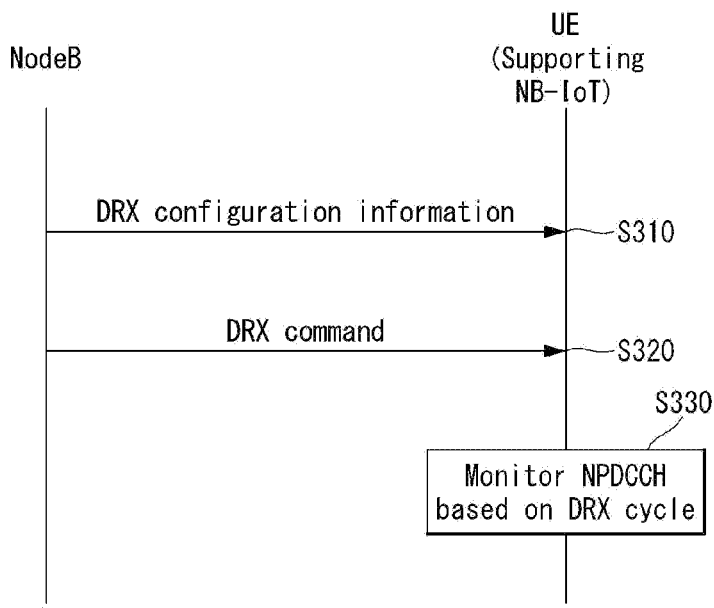

[FIG. 35]
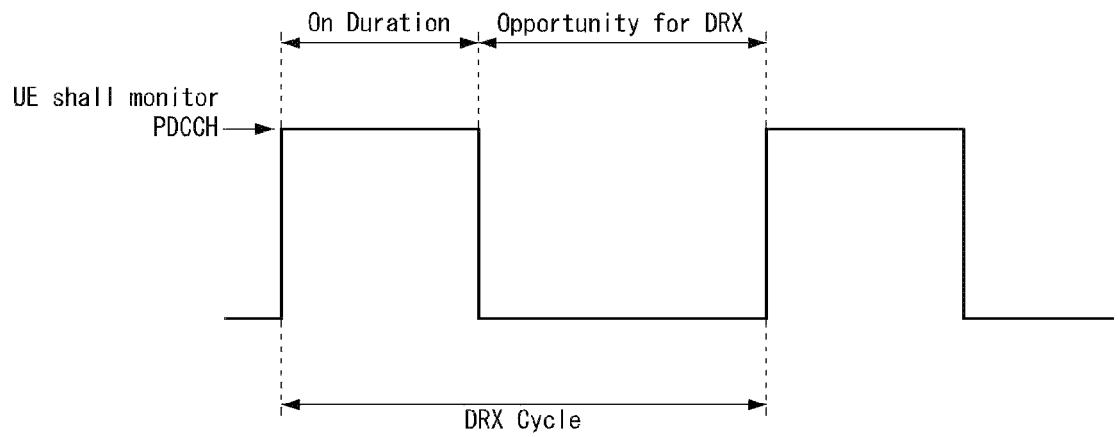
[FIG. 36]
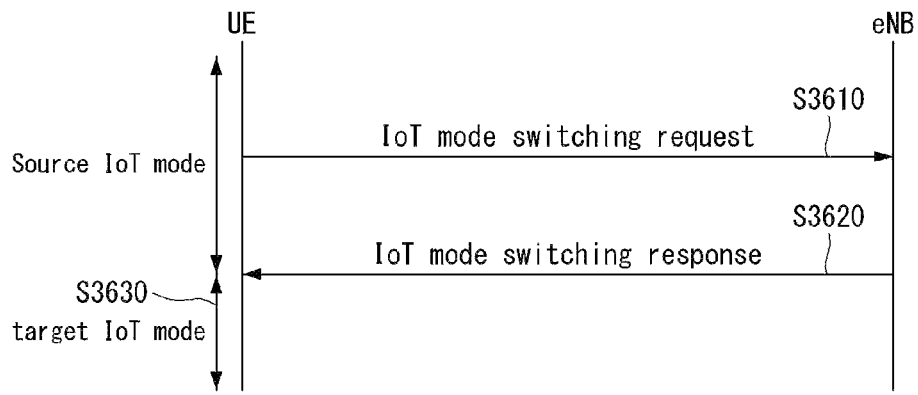
[FIG. 37]
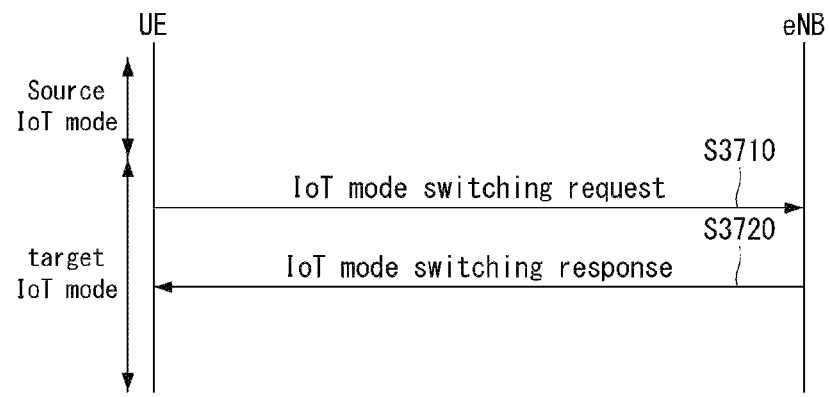

[FIG. 38]
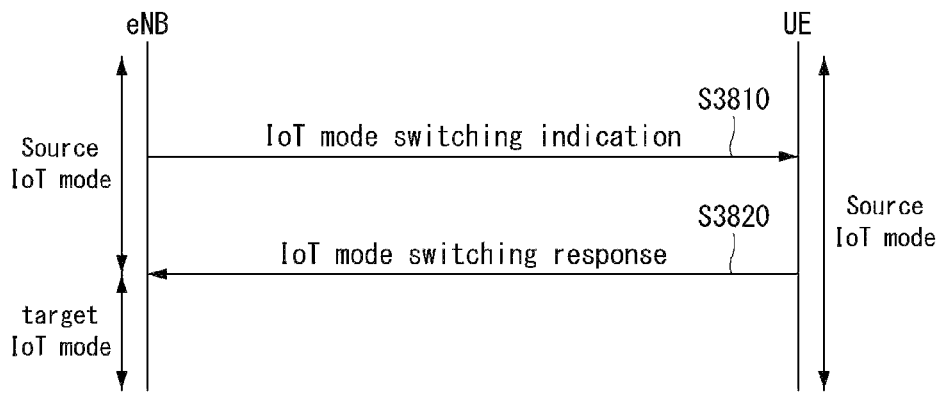
[FIG. 39]
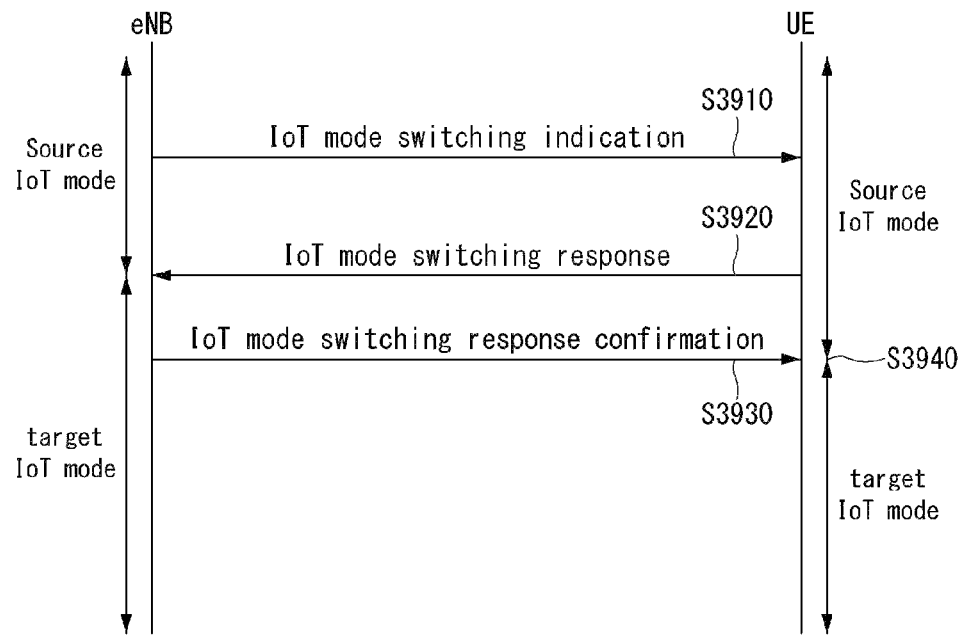
[FIG. 40]
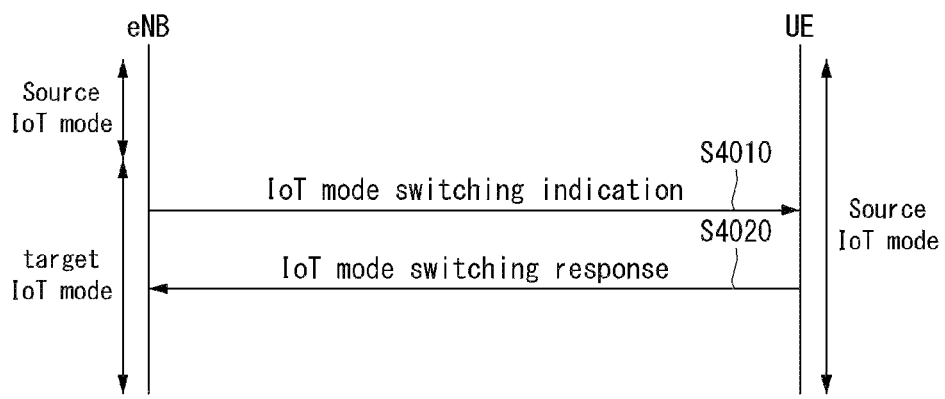

[FIG. 41]
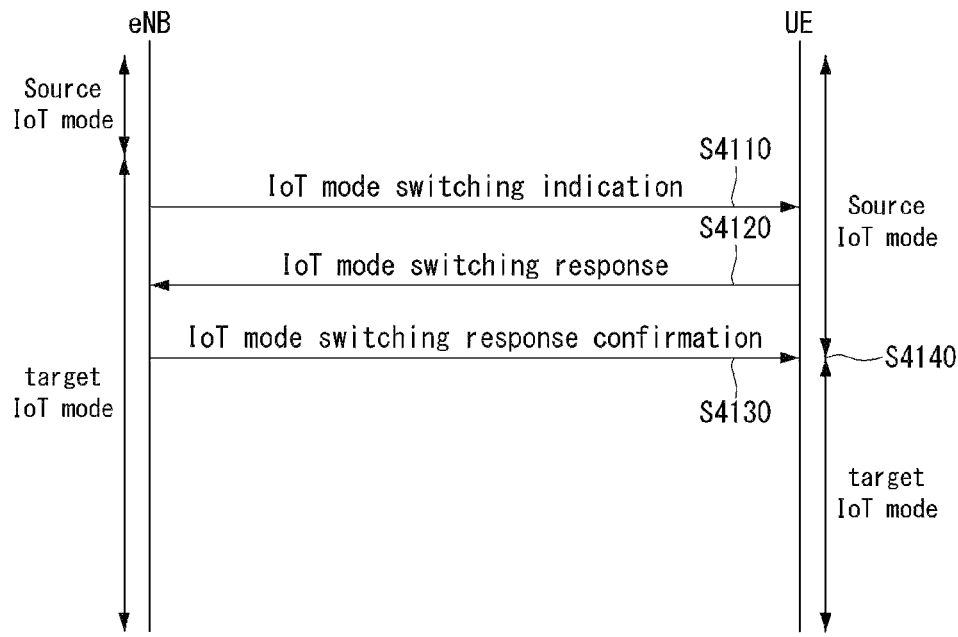
[FIG. 42]
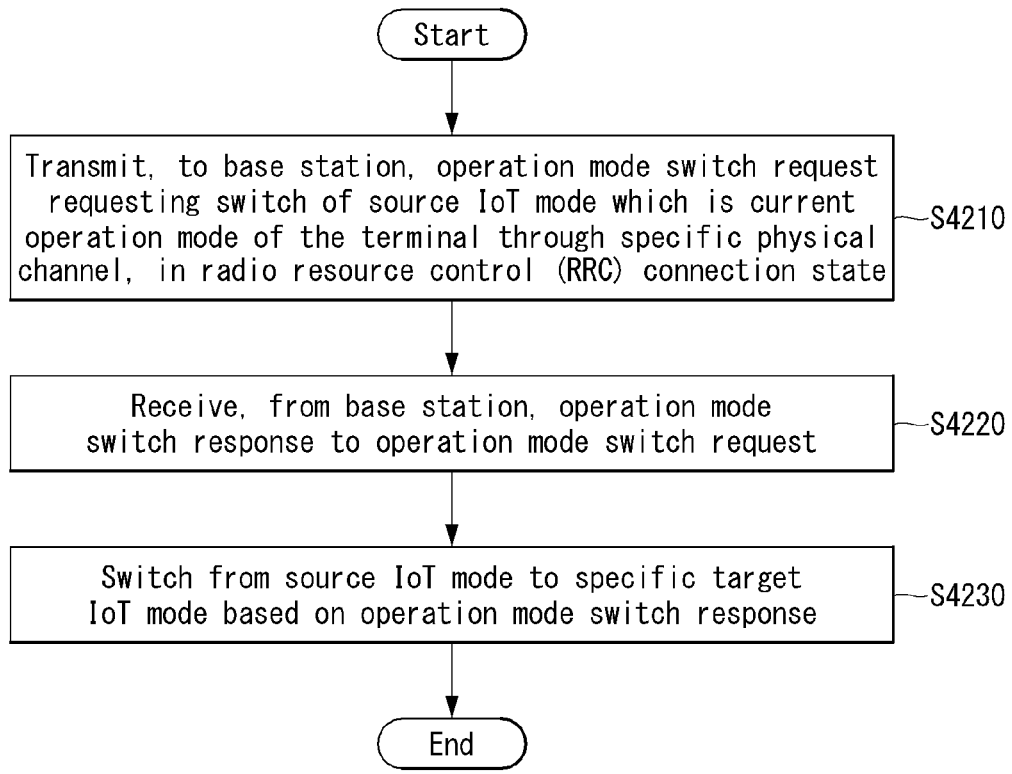

[FIG. 43]
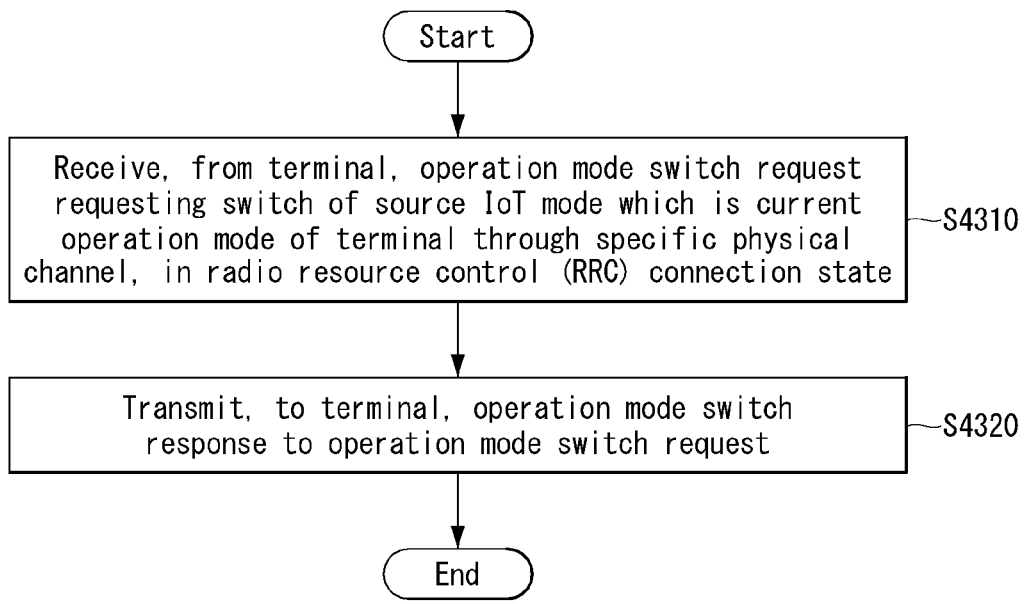

METHOD FOR SWITCHING OPERATION MODES IN WIRELESS COMMUNICATION SYSTEM, AND DEVICE THEREFOR

CROSS-REFERENCE TO RELATED APPLICATION

This application is the National Stage filing under 35 U.S.C. 371 of International Application No. PCT/KR2020/002775, filed on Feb. 26, 2020, which claims the benefit of KR Application No. 10-2019-0022594, filed on Feb. 26, 2019, the contents of which are all hereby incorporated by reference herein in their entirety.

TECHNICAL FIELD

The present disclosure relates to a wireless communication system, and more particularly, to a method for switching Internet of Things (IoT) modes in a connected state, and a device therefor.

BACKGROUND ART

Mobile communication systems were developed to ensure user activity and provide voice service. However, mobile communication systems have extended their range to data service as well as voice, and currently the explosive increase in traffic is causing a lack of resources and there is a users' demand for faster services, which is creating a need for advanced mobile communication systems.

The requirements for next-generation mobile communication systems largely include coping with explosive data traffic, very high data rates per user, coping with a surprisingly large number of connected devices, very low end-to-end latency, and support for high energy efficiency. To this end, research is ongoing on a variety of technologies such as dual connectivity, massive MIMO (massive multiple input multiple output), in-band full duplex, NOMA (non-orthogonal multiple access), support for super wideband, and device networking.

DISCLOSURE

Technical Problem

The present disclosure provides a method for switching operation modes in a wireless communication system, and a device therefor.

Further, the present disclosure provides a method and a device for switching IoT modes of a UE in a connected state with a base station by a request of the UE.

Further, the present disclosure provides a method and a device for switching IoT modes of a UE in a connected state with a base station by an indication of the base station.

The technical objects of the present disclosure are not limited to the aforementioned technical objects, and other technical objects, which are not mentioned above, will be apparently appreciated by a person having ordinary skill in the art from the following description.

Technical Solution

The present disclosure provides method for switching operation mode in wireless communication system and device therefor.

Specifically, in the present disclosure, a method, by a terminal, for switching an Internet of things (IoT) mode in a wireless communication system, the method comprising: transmitting, to a base station, an operation mode switch request requesting a switch of a source IoT mode which is a current operation mode of the terminal through a specific physical channel, in a radio resource control (RRC) connection state; receiving, from the base station, an operation mode switch response to the operation mode switch request; and switching from the source IoT mode to a specific target IoT mode based on the operation mode switch response.

Furthermore, in the present disclosure, wherein the source IoT mode is one of non-BL (bandwidth reduced low complexity) mode, non-BL CE (coverage enhancement) mode, eMTC (enhanced machine type communication) mode, and NB (narrowband)-IoT mode, and wherein the target IoT mode is one of IoT modes different from the source IoT mode.

Furthermore, in the present disclosure, wherein the specific physical channel is one of a physical uplink physical shared channel (PUSCH), a physical uplink control channel (PUCCH), and a physical random access channel (PRACH).

Furthermore, in the present disclosure, wherein the operation mode switch request includes indication information for instructing a switch from the source IoT mode to a first target IoT mode.

Furthermore, in the present disclosure, wherein based on the operation mode switch response including acceptance information instructing acceptance of the indication information, the specific target IoT mode is the first target IoT mode.

Furthermore, in the present disclosure, wherein based on the operation mode switch response includes indication information for instructing a switch from the source IoT mode to a second target IoT mode, the second target IoT mode is determined based on a received signal strength of the operation mode switch request.

Furthermore, in the present disclosure, wherein based on that the first target IoT mode and the second target IoT mode are different from each other, the specific target mode is the second target mode.

Furthermore, in the present disclosure, wherein the specific physical channel is a channel to which a parameter for data transmission/reception in the source IoT mode is applied.

Furthermore, in the present disclosure, wherein based on the specific physical channel being one of the PUCCH and the PRACH, the specific physical channel is scheduled on a specific resource which is separately configured for transmission of the operation mode switch request.

Furthermore, in the present disclosure, wherein the specific physical channel is a channel to which a parameter for data transmission/reception in the first target IoT mode is applied.

Furthermore, in the present disclosure, wherein the specific physical channel is scheduled on a specific resource of the first target IoT mode which is configured separately for transmission of the operation mode switch request, and wherein transmission through an uplink physical channel of the source IoT mode which is scheduled on a resource that is temporally overlapping with the specific resource or adjacent to the specific resource is dropped.

Furthermore, in the present disclosure, wherein based on the specific physical channel being PRACH, a timing advance (TA) value applied to transmission of the operation mode switch request is the same as a TA value applied to an uplink physical channel of the source IoT mode.

Furthermore, in the present disclosure, wherein the TA value applied to the uplink physical channel of the source IoT mode is a value greater than or less than 0.

Furthermore, in the present disclosure, wherein the operation mode switch response is received through a downlink physical channel scheduled on a resource of the first target IoT mode.

Furthermore, in the present disclosure, wherein the operation mode switch response includes indication information instructing for instructing a switch from the operation mode to a target IoT mode different from the first target IoT mode.

Furthermore, in the present disclosure, further comprising: receiving, from the base station, a reference signal; and determining whether to transmit the operation mode switch request based on the reference signal.

Furthermore, in the present disclosure, a method, by a base station, for switching an Internet of things (IoT) mode in a wireless communication system, the method comprising: receiving, from a terminal, an operation mode switch request requesting a switch of a source IoT mode which is a current operation mode of the terminal through a specific physical channel, in a radio resource control (RRC) connection state; and transmitting, to the terminal, an operation mode switch response to the operation mode switch request, wherein the source IoT mode is switched to a specific target IoT mode based on the operation mode switch response.

Furthermore, in the present disclosure, A terminal for switching an Internet of things (IoT) mode in a wireless communication system, the terminal comprising: a transmitter for transmitting a radio signal; a receiver for receiving the radio signal; and a processor operatively connected to the transmitter and the receiver, wherein the processor is configured to control: the transmitter to transmit, to a base station, an operation mode switch request requesting a switch of a source IoT mode which is a current operation mode of the terminal through a specific physical channel, in a radio resource control (RRC) connection state; the receiver to receive, from the base station, an operation mode switch response to the operation mode switch request; and to switch from the source IoT mode to a specific target IoT mode based on the operation mode switch response.

Furthermore, in the present disclosure, a base station for switching an Internet of things (IoT) mode in a wireless communication system, the base station comprising: a transmitter for transmitting a radio signal; a receiver for receiving the radio signal; and a processor operatively connected to the transmitter and the receiver, wherein the processor is configured to control: the receiver to receive, from a terminal, an operation mode switch request requesting a switch of a source IoT mode which is a current operation mode of the terminal through a specific physical channel, in a radio resource control (RRC) connection state; and the transmitter to transmit, to the terminal, an operation mode switch response to the operation mode switch request, wherein the source IoT mode is switched to a specific target IoT mode based on the operation mode switch response.

Furthermore, in the present disclosure, One or more non-transitory computer-readable media (CRM) storing one or more instructions, comprising: wherein the one or more instructions executable by the one or more processors are executed by a terminal, the terminal: transmits, to a base station, an operation mode switch request requesting a switch of a source IoT mode which is a current operation mode of the terminal through a specific physical channel, in a radio resource control (RRC) connection state; receives, from the base station, an operation mode switch response to the operation mode switch request; and switches from the source IoT mode to a specific target IoT mode based on the operation mode switch response.

Advantageous Effects

In the present disclosure, there is an effect that IoT modes in a connected state in a wireless communication system can be switched.

Further, in the present disclosure, there is an effect that IoT modes of a UE in a connected state with a base station can be switched by a request of the UE.

Further, in the present disclosure, there is an effect that the IoT modes of the UE in the connected state with the base station can be switched by an indication of the base station.

Advantages which can be obtained in the present disclosure are not limited to the aforementioned advantages and other unmentioned advantages will be clearly understood by those skilled in the art from the following description.

DESCRIPTION OF DRAWINGS

The accompanying drawings, which are included as part of the detailed description to help understand the present disclosure, provide embodiments of the present disclosure, and describe technical features of the present disclosure together with the detailed description.

FIG. 1 illustrates an example of a network structure of an evolved universal terrestrial radio access network (E-UTRAN) to which the present disclosure may be applied.

FIG. 2 illustrates an example of an overall system structure of NR to which a method proposed in the present disclosure may be applied.

FIG. 3 illustrates an example of frame structure type 1.

FIG. 4 illustrates an example of frame structure type 2.

FIG. 5 is a diagram illustrating an example of a frame structure in NR.

FIG. 6 is a diagram illustrating an example of a resource grid for a downlink slot.

FIG. 7 illustrates an example of a structure of a downlink subframe.

FIG. 8 illustrates an example of a structure of an uplink subframe.

FIG. 9 illustrates an example of a resource grid supported by a wireless communication system to which a method proposed in the present disclosure may be applied.

FIG. 10 illustrates examples of a resource grid for each antenna port and numerology to which a method proposed in the present disclosure may be applied.

FIG. 11 is a diagram illustrating an example of a physical resource block in NR.

FIG. 12 is a block diagram of a wireless communication device to which methods proposed in the present disclosure may be applied.

FIGS. 13A to 13E are diagrams illustrating examples of an RFC connection establishment procedure.

FIGS. 14A and 14B are diagrams illustrating examples of an RFC connection re-configuration procedure.

FIG. 15 is a diagram illustrating an example of an RRC connection release procedure.

FIG. 16 is a diagram illustrating an example of a narrowband operation and a frequency diversity.

FIG. 17 is a diagram illustrating physical channels which may be used in MTC and a general signal transmission method using the same.

FIG. 18 is a diagram illustrating an example of system information transmission of MTC.

FIG. 19 is a diagram illustrating an example of scheduling for each of MTC and legacy LTE.

FIG. 20 illustrates a general system information acquisition procedure.

FIG. 21 illustrates a contention based random access procedure.

FIG. 22 illustrates an example of a DRX scheme in an idle state and/or an inactive state.

FIG. 23 illustrates an example of a DRX configuration and indication procedure for an MTC UE.

FIG. 24 illustrates a DRX cycle.

FIG. 25 illustrates an example of an NB-IoT frame structure (subcarrier spacing: 3.75 kHz).

FIG. 26 illustrates an example of an NB-IoT frame structure (subcarrier spacing: 15 kHz).

FIG. 27 illustrates an example of a resource grid for an NB-IOT uplink.

FIG. 28 illustrates an example of operation modes supported in an NB-IoT system.

FIG. 29 is a diagram illustrating physical channels which may be used in NB-IoT and a general signal transmission method using the same.

FIG. 30 illustrates an example for an initial access procedure of NB-IoT.

FIG. 31 illustrates an example for a random access procedure of NB-IoT.

FIG. 32 illustrates a structure of a random access symbol group.

FIG. 33 illustrates an example of a DRX scheme in an idle state and/or an inactive state.

FIG. 34 illustrates an example of a DRX configuration and indication procedure for an NB-IoT UE.

FIG. 35 illustrates a DRX cycle.

FIG. 36 is a flowchart showing an example of a method for switching IoT operation modes in a connected state in a wireless communication system proposed in the present disclosure.

FIG. 37 is a flowchart showing an example of a method for switching IoT operation modes in a connected state in a wireless communication system proposed in the present disclosure.

FIG. 38 is a flowchart showing an example of a method for switching IoT operation modes in a connected state in a wireless communication system proposed in the present disclosure.

FIG. 39 is a flowchart showing another example of a method for switching IoT operation modes in a connected state in a wireless communication system proposed in the present disclosure.

FIG. 40 is a flowchart showing an example of a method for switching IoT operation modes in a connected state in a wireless communication system proposed in the present disclosure.

FIG. 41 is a flowchart showing another example of a method for switching IoT operation modes in a connected state in a wireless communication system proposed in the present disclosure.

FIG. 42 is a flowchart showing an example an operation implemented in a UE for performing a method for switching IoT operation modes in a connected state in a wireless communication system proposed in the present disclosure.

FIG. 43 is a flowchart showing an example an operation implemented in a base station for performing a method for switching IoT operation modes in a connected state in a wireless communication system proposed in the present disclosure.

MODE FOR DISCLOSURE

Hereinafter, preferred embodiments according to the present disclosure will be described in detail with reference to the accompanying drawings. The detailed description to be disclosed below with the accompanying drawings is intended to describe exemplary embodiments of the present disclosure, and is not intended to represent only embodiments in which the present disclosure may be practiced. The detailed description below includes specific details to provide a thorough understanding of the present disclosure. However, those skilled in the art appreciate that the present disclosure may be practiced without these specific details.

In some cases, in order to avoid obscuring the concept of the present disclosure, well-known structures and devices may be omitted, or may be illustrated in a block diagram form centering on core capabilities of each structure and device.

In the disclosure, a base station means a terminal node of a network directly performing communication with a terminal. In the present document, specific operations described to be performed by the base station may be performed by an upper node of the base station in some cases. That is, it is apparent that in the network constituted by multiple network nodes including the base station, various operations performed for communication with the terminal may be performed by the base station or other network nodes other than the base station. A base station (BS) may be generally substituted with terms such as a fixed station, Node B, evolved-NodeB (eNB), a base transceiver system (BTS), an access point (AP), and the like. Further, a 'terminal' may be fixed or movable and be substituted with terms such as user equipment (UE), a mobile station (MS), a user terminal (UT), a mobile subscriber station (MSS), a subscriber station (SS), an advanced mobile station (AMS), a wireless terminal (WT), a Machine-Type Communication (MTC) device, a Machine-to-Machine (M2M) device, a Device-to-Device (D2D) device, and the like.

Hereinafter, a downlink means communication from the base station to the terminal and an uplink means communication from the terminal to the base station. In the downlink, a transmitter may be a part of the base station and a receiver may be a part of the terminal. In the uplink, the transmitter may be a part of the terminal and the receiver may be a part of the base station.

Specific terms used in the following description are provided to help appreciating the disclosure and the use of the specific terms may be modified into other forms within the scope without departing from the technical spirit of the disclosure.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as Global System for Mobile communications (GSM)/General Packet Radio Service (GPRS)/Enhanced Data Rates for GSM Evolution (EDGE). The OFDMA may be implemented as radio technology such as IEEE 802.11(Wi-Fi), IEEE 802.16(WiMAX), IEEE 802-20, E-UTRA (Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

5G new radio (5G NR) defines enhanced mobile broadband (eMBB), massive machine type communications (mMTC), Ultra-Reliable and Low Latency Communications (URLLC), vehicle-to-everything (V2X) according to a usage scenario.

In addition, the 5G NR standard is classified into standalone (SA) and non-standalone (NSA) according to co-existence between the NR system and the LTE system.

In addition, the 5G NR supports various subcarrier spacings, and supports CP-OFDM in downlink and CP-OFDM and DFT-s-OFDM (SC-OFDM) in uplink.

The embodiments of the disclosure may be based on standard documents disclosed in at least one of IEEE 802, 3GPP, and 3GPP2 which are the wireless access systems. That is, steps or parts which are not described to definitely show the technical spirit of the disclosure among the embodiments of the disclosure may be based on the documents. Further, all terms disclosed in the document may be described by the standard document.

3GPP LTE/LTE-A/NR is primarily described for clear description, but technical features of the disclosure are not limited thereto.

LTE refers to technology after 3GPP TS 36.xxx Release 8. In detail, LTE technology after 3GPP TS 36.xxx Release 10 is referred to as LTE-A, and LTE technology after 3GPP TS 36.xxx Release 13 is referred to as LTE-A pro. 3GPP NR refers to technology after TS 38.xxx Release 15. LTE/NR may be referred to as a 3GPP system. "xxx" stands for standard document detail number. LTE/NR may be collectively referred to as a 3GPP system. For backgrounds, terms, abbreviations, etc. used in the description of the present disclosure, reference may be made to matters described in standard documents published before the present disclosure. For example, the following documents may be referred:

3GPP LTE
  36.211: Physical channels and modulation
  36.212: Multiplexing and channel coding
  36.213: Physical layer procedures
  36.300: Overall description
  36.331: Radio Resource Control (RRC)
3GPP NR
  38.211: Physical channels and modulation
  38.212: Multiplexing and channel coding
  38.213: Physical layer procedures for control
  38.214: Physical layer procedures for data
  38.300: NR and NG-RAN Overall Description
  36.331: Radio Resource Control (RRC) protocol specification
System General
LTE System Structure FIG. 1 illustrates an example of a network structure of an evolved universal terrestrial radio access network (E-UTRAN) to which the present disclosure can be applied.

E-UTRAN system is a system evolved from the existing UTRAN system, for example, may be a 3GPP LTE/LTE-A system. The E-UTRAN is composed of base stations (eNBs) that provide a control plane and a user plane protocol to a terminal, and the base stations are connected through an X2 interface. An X2 user plane interface (X2-U) is defined between the base stations. The X2-U interface provides non-guaranteed delivery of a user plane packet data unit (PDU). An X2 control plane interface (X2-CP) is defined between two neighboring base stations. X2-CP performs functions such as context transfer between base stations, control of a user plane tunnel between a source base station and a target base station, handover-related message delivery, and uplink load management. The base station is connected to the terminal through a wireless interface and is connected to an evolved packet core (EPC) through the S1 interface. An S1 user plane interface (S1-U) is defined between a base station and a serving gateway (S-GW). The S1 control plane interface (S1-MME) is defined between the base station and a mobility management entity (MME). The S1 interface performs an evolved packet system (EPS) bearer service management function, a non-access stratum (NAS) signaling transport function, network sharing, an MME load balancing function, and the like. The S1 interface supports many-to-many-relation between the base station and the MME/S-GW.

NR System Structure

FIG. 2 illustrates an example of an overall structure of a new radio (NR) system to which a method proposed by the present disclosure is applicable.

Referring to FIG. 8, an NG-RAN consists of gNBs that provide an NG-RA user plane (new AS sublayer/PDCP/RLC/MAC/PHY) and control plane (RRC) protocol terminations for a user equipment (UE).

The gNBs are interconnected with each other by means of an Xn interface.

The gNBs are also connected to an NGC by means of an NG interface.

More specifically, the gNBs are connected to an access and mobility management function (AMF) by means of an N2 interface and to a user plane function (UPF) by means of an N3 interface.

Frame Structure
LTE Frame Structure

A frame structure in LTE will be described.

Unless otherwise mentioned in the LTE standard, sizes of various fields in the time domain are expressed as a number of a time unit $T_s=1/(15000\times2048)$ seconds. DL and UL transmission is organized with radio frames having a duration of $T_f=307200\times T_s=10$ ms. Two radio frame structures are supported.

Type 1 is applicable to FDD
  Type 2 is applicable to TDD
  (1) Frame Structure Type 1

FIG. 3 illustrates an example of frame structure type 1.

Frame structure type 1 may be applied to both full duplex and half duplex FDDs. Each radio frame has a length of $T_f=308200*T_s=10$ ms, and is constituted by 20 slots in which $T_f=308200*T_s=10$ ms, which are numbered with 0 to 19. The subframe is defined as two consecutive slots, and subframe i is constituted by slots 2i and 2i−1.

In the case of the FDD, 10 subframes are available for downlink transmission and 10 subframes are available for uplink transmission at every 10 ms interval.

The uplink and downlink transmission is separated from the frequency domain. In a half duplex FDD operation, the UE may not simultaneously perform transmission and reception, while there is no such limitation in the full duplex FDD.

Frame Structure Type 2

FIG. 4 illustrates an example of frame structure type 2.

Frame structure type 2 is applicable to the FDD. Each radio frame having the length of $T_f=307200*T_s=10$ ms is constituted by two half-frames each having a length of $15360*T_s=0.5$ ms. Each half-frame is constituted by 5 subframes having a length of $30720*T_s=1$ ms. Supported uplink-downlink components are listed in Table 2, and here, for each subframe in the radio frame, "D" represents that the subframe is reserved for the downlink transmission, "U" represents that the subframe is reserved for the uplink transmission, and "S" represents a special subframe having three fields constituted by a downlink pilot time slot (DwPTS), a guard period (GP), and an uplink pilot time slot (UpPTS). Under a premise of a DwPTS, a GP, and a UpPTS having a length which is the same as a total length Tf=307200*Ts=10 ms, the lengths of the DwPTS and the UpPTS are provided by Table 1. Each subframe i is defined as two slots 2i and 2i+1 in which a length in each subframe is 15360*Ts=0.5 ms.

An uplink-downlink component having a switch-point periodicity from downlink to uplink of both 5 ms and 10 ms is supported. In the case of the switch-point periodicity from the downlink to the uplink of 5 ms, the special subframe exists in both two half-frames. In the case of the switch-point periodicity from the downlink to the uplink of 10 ms, the special subframe exists only in a first half-frame. Subframes 0 and 5, and DwPTS are continuously reserved for the downlink transmission. The UpPTS, and a subframe immediately subsequent to the special subframe are continuously reserved for the uplink transmission.

NR Frame Structure

Next, the frame structure in NR will be described.

FIG. 5 is a diagram showing an example of a frame structure in NR.

In the NR system, multiple numerologies may be supported. The numerologies may be defined by subcarrier spacing and a cyclic prefix (CP) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an orthogonal frequency division multiplexing (OFDM) numerology and a frame structure, which may be considered in the NR system, will be described.

A plurality of OFDM numerologies supported in the NR system may be defined as in Table 1.

TABLE 1

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

NR supports a number of numerology (or subcarrier spacing (SCS)) to support various 5G services. For example, when SCS is 15 kHz, it supports wide area in traditional cellular bands, and when SCS is 30 kHz/60 kHz, dense-urban, lower latency and a wider carrier bandwidth, and when the SCS is 60 kHz or higher, a bandwidth greater than 24.25 GHz to overcome phase noise.

The NR frequency band is defined as a frequency range of two types (FR1, FR2). FR1 is the sub 6 GHz range, and FR2 is the above 6 GHz range, which may mean a millimeter wave (mmW).

Table 2 below shows the definition of the NR frequency band.

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in the NR system, a size of various fields in the time domain is expressed as a multiple of a time unit of $T_s=1/(\Delta f_{max}\cdot N_f)$, where $\Delta f_{max}=480\cdot 10^3$, and $N_f=4096$. Downlink and uplink transmissions are organized into radio frames with a duration of $T_f=(\Delta f_{max}N_f/100)\cdot T_s=10$ ms. The radio frame consists of ten subframes each having a section of $T_{sf}=(\Delta f_{max}N_f/1000)\cdot T_s=1$ ms. In this case, there may be a set of frames in the uplink and a set of frames in the downlink.

FIG. 2 illustrates a relation between a UL frame and a DL frame in a wireless communication system to which a method proposed by the disclosure is applicable.

As illustrated in FIG. 2, a UL frame number i for transmission from a user equipment (UE) shall start $T_{TA}=N_{TA}T_s$ before the start of a corresponding downlink frame at the corresponding UE.

Regarding the numerology μ, slots are numbered in increasing order of $n_s^\mu \in \{0, \ldots, N_{subframe}^{slots,\mu}-1\}$ within a subframe, and are numbered in increasing order of $n_{s,f}^\mu \in \{0, \ldots, N_{frame}^{slots,\mu}-1\}$ within a radio frame. One slot consists of consecutive OFDM symbols of $N_{symb}^\mu$, and $N_{symb}^\mu$ is determined depending on a numerology in use and slot configuration. The start of slots n in a subframe is aligned in time with the start of OFDM symbols $n_s^\mu N_{symb}^\mu$ in the same subframe.

Not all UEs are able to transmit and receive at the same time, and this means that not all OFDM symbols in a DL slot or an UL slot are available to be used.

Table 3 shows the number of OFDM symbols per slot ($N_{symb}^{slot}$), the number of slots per radio frame ($N_{slot}^{frame,\mu}$), and the number of slots per subframe ($N_{slot}^{subframe,\mu}$) in a normal CP, and Table 3 shows the number of OFDM symbols per slot, the number of OFDM symbols per slot and the number of slots per radio frame, and the number of slots per subframe in an extended CP.

TABLE 3

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 3 shows an example of a frame structure in an NR system. 3 is only for convenience of description, and does not limit the scope of the present disclosure.

In the case of Table 4, if μ=2, that is, as an example of a case where the subcarrier spacing (SCS) is 60 kHz, referring to Table 3, 1 subframe (or frame) includes 4 slots 1 subframe={1,2,4} slots shown in FIG. 3 is an example, and the number of slot(s) that can be included in one subframe may be defined as shown in Table 2.

In addition, a mini-slot (mini-slot) may consist of 2, 4 or 7 symbols (symbol), may be composed of more or fewer symbols.

Physical Resource

LTE Physical Resource

FIG. 6 is a diagram showing an example of a resource grid for a downlink slot.

In FIG. 6, a downlink slot includes a plurality of OFDM symbols in time domain. It is described herein that one downlink slot includes 7 OFDM symbols, and one resource block (RB) includes 12 subcarriers in frequency domain as an example. However, the present disclosure is not limited thereto. Each element on the resource grid is referred to as a resource element (RE). One RB includes 12×7 REs. The number NDL of RBs included in the downlink slot depends on a downlink transmit bandwidth. The structure of an uplink slot may be same as that of the downlink slot.

FIG. 7 shows an example of a downlink subframe structure.

In FIG. 7, a maximum of three OFDM symbols located in a front portion of a first slot within a subframe correspond to a control region to be assigned with a control channel. The remaining OFDM symbols correspond to a data region to be assigned with a physical downlink shared chancel (PDSCH). Examples of downlink control channels used in the 3GPP LTE includes a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/not-acknowledgment (NACK) signal. Control information transmitted through the PDCCH is referred to as downlink control information (DCI). The DCI includes uplink or downlink scheduling information or includes an uplink transmit (Tx) power control command for arbitrary UE groups.

The PDCCH may carry a transport format and a resource allocation of a downlink shared channel (DL-SCH), resource allocation information of an uplink shared channel (UL-SCH), paging information on a paging channel (PCH), system information on the DL-SCH, a resource allocation of an upper-layer control message such as a random access response transmitted on the PDSCH, a set of Tx power control commands on individual UEs within an arbitrary UE group, a Tx power control command, activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined according to a correlation between the number of CCEs and the coding rate provided by the CCEs. The BS determines a PDCCH format according to a DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging indicator identifier (e.g., paging-RNTI (P-RNTI)) may be masked to the CRC. If the PDCCH is for system information (more specifically, a system information block (SIB) to be described below), a system information identifier and a system information RNTI (SI-RNTI) may be masked to the CRC. To indicate a random access response that is a response for transmission of a random access preamble of the UE, a random access-RNTI (RA-RNTI) may be masked to the CRC.

FIG. 8 shows an example of an uplink subframe structure.

In FIG. 8, an uplink subframe can be divided in a frequency domain into a control region and a data region. The control region is allocated with a physical uplink control channel (PUCCH) for carrying uplink control information. The data region is allocated with a physical uplink shared channel (PUSCH) for carrying user data. To maintain a single carrier property, one UE does not simultaneously transmit the PUCCH and the PUSCH. The PUCCH for one UE is allocated to an RB pair in a subframe. RBs belonging to the RB pair occupy different subcarriers in respective two slots. This is called that the RB pair allocated to the PUCCH is frequency-hopped in a slot boundary.

NR Physical Resource

In connection with the physical resource in the NR system, antenna port, resource grid, resource element, resource block, and carrier part may be taken into consideration.

Hereinafter, the physical resources that may be considered in the NR system are described in detail.

First, in connection with antenna port, the antenna port is defined so that the channel carrying a symbol on the antenna port may be inferred from the channel carrying another symbol on the same antenna port. Where the large-scale property of the channel carrying a symbol on one antenna port may be inferred from the channel carrying a symbol on a different antenna port, the two antenna ports may be said to have a QC/QCL (quasi co-located or quasi co-location) relationship. Here, the large-scale properties include one or more of delay spread, Doppler spread, frequency shift, average received power, and received timing.

FIG. 9 illustrates an example resource grid supported in a wireless communication system to which a method as proposed in the disclosure may apply.

Referring to FIG. 9, although an example is described in which the resource grid is constituted of $N_{RB}^{\mu} N_{sc}^{RB}$ subcarriers in the frequency domain, and one subframe includes 14·2μ OFDM symbols, embodiments of the disclosure are not limited thereto.

In the NR system, the transmitted signal is described with one or more resource grids constituted of $N_{RB}^{\mu} N_{sc}^{RB}$ subcarriers and $2^{\mu} N_{symb}^{(\mu)}$ OFDM symbols. Here, $N_{RB}^{\mu} \leq N_{RB}^{max,\mu}$. $N_{RB}^{max,\mu}$ refers to the maximum transmission bandwidth, and this may be varied between uplink and downlink as well as numerologies.

In this case, as shown in FIG. 10, one resource grid may be configured per numerology μ and antenna port p.

FIG. 10 illustrates examples of per-antenna port and numerology resource grids to which a method as proposed in the disclosure may apply.

Each element of the resource grid for numerology μ and antenna port p is denoted a resource element and is uniquely identified by index pair (k,l). Here, k=0, . . . , $N_{RB}^{\mu}N_{sc}^{RB}-1$ is the index in the frequency domain, and l=0, . . . , $2^{\mu}N_{symb}^{(\mu)}-1$ denotes the position of symbol in the subframe. Upon denoting the resource element in slot, index pair (k,l) is used. Here, l=0, . . . , $N_{symb}^{\mu}-1$.

For numerology μ and antenna port, resource element (k, l) corresponds to complex value $a_{k,l}^{(p,\mu)}$. Where there is no risk of confusion or where a specific antenna port or numerology is not specified, indexes p and μ may be dropped and, as a result, the complex value may become $a_{k,l}^{(p)}$ or $a_{k,l}$.

The physical resource block is defined with $N_{sc}^{RB}=12$ consecutive subcarriers in the frequency domain.

Point A may serve as a common reference point of a resource block grid and may be acquired as follows.

OffsetToPointA for PCell downlink indicates the frequency offset between the lowest subcarrier of the lowest resource block superposed with the SS/PBCH block used by the UE for initial cell selection and point A, and is expressed by resource block units assuming a 15 kHz subcarrier spacing for FR1 and a 60 kHz subcarrier spacing for FR2; and absoluteFrequencyPointA indicates the frequency-position of point A expressed as in an absolute radio-frequency channel number (ARFCN).

Common resource blocks are numbered upwards from 0 in the frequency domain for a subcarrier spacing setting μ.

A center of subcarrier 0 for common resource block 0 for the subcarrier spacing setting μ coincides with 'point A'. The resource element (k,l) for common resource block number $n_{CRB}^{\mu}$ and the subcarrier spacing setting μ in the frequency domain is given as in Equation 1 below.

$$n_{CRB}^{\mu} = \left\lfloor \frac{k}{N_{sc}^{RB}} \right\rfloor \quad \text{[Equation 1]}$$

Here, k may be relatively defined in point A so that k=0 corresponds to a subcarrier centering on point A. Physical resource blocks are numbered with 0 to $N_{BWPj}^{size}-1$ in a bandwidth part (BWP) and i represents the number of the BWP. A relationship between the physical resource block $n_{PRB}$ and the common resource block $n_{CRB}$ in BWP i is given by Equation 2 below.

$$n_{CRB} = n_{PRB} + N_{BWP,i}^{start} \quad \text{[Equation 2]}$$

Here, $N_{BWPj}^{start}$ may be a common resource block in which the BWP relatively starts to common resource block 0.

FIG. 11 is a diagram illustrating an example of a physical resource block in NR.

FIG. 12 illustrates a block diagram of a wireless communication device to which the methods proposed in the present disclosure can be applied.

Referring to FIG. 12, the wireless communication system includes a base station 910 and a plurality of terminals 920 located within the base station area. A base station may be expressed as a transmitting device, a terminal as a receiving device, and vice versa. The base station and the terminal are a processor (processor, 911,921), a memory (memory, 914, 924), one or more Tx/Rx RF module (radio frequency module, 915,925), Tx processor (912,922), Rx processor (913,923), antenna (916,926) include A processor implements the functions, processes and/or methods salpinned above. More specifically, in DL (base station to terminal communication), higher layer packets from the core network are provided to the processor 911. The processor implements the functions of the L2 layer. In DL, the processor provides multiplexing between a logical channel and a transport channel and radio resource allocation to the terminal 920, and is responsible for signaling to the terminal. A transmit (TX) processor 912 implements various signal processing functions for the L1 layer (ie, the physical layer). The signal processing function facilitates forward error correction (FEC) in the terminal, and includes coding and interleaving. The coded and modulated symbols are divided into parallel streams, each stream mapped to OFDM subcarriers, multiplexed with a reference signal (RS) in the time and/or frequency domain, and using Inverse Fast Fourier Transform (IFFT) are combined together to create a physical channel carrying a stream of time domain OFDMA symbols. The OFDM stream is spatially precoded to generate multiple spatial streams. Each spatial stream may be provided to a different antenna 916 via a separate Tx/Rx module (or transceiver) 915. Each Tx/Rx module may modulate an RF carrier with a respective spatial stream for transmission. In the terminal, each Tx/Rx module (or transceiver) 925 receives a signal through each antenna 926 of each Tx/Rx module. Each Tx/Rx module recovers information modulated with an RF carrier and provides it to a receive (RX) processor 923. The RX processor implements the various signal processing functions of layer 1. The RX processor may perform spatial processing on the information to recover any spatial stream directed to the terminal. If multiple spatial streams are directed to a terminal, they may be combined into a single OFDMA symbol stream by multiple RX processors. The RX processor uses a Fast Fourier Transform (FFT) to transform the OFDMA symbol stream from the time domain to the frequency domain. The frequency domain signal includes a separate OFDMA symbol stream for each subcarrier of the OFDM signal. The symbols and reference signal on each subcarrier are recovered and demodulated by determining the most probable signal placement points transmitted by the base station. These soft decisions may be based on channel estimate values. The soft decisions are decoded and deinterleaved to recover the data and control signal originally transmitted by the base station on the physical channel. Corresponding data and control signals are provided to the processor 921.

UL (from terminal to base station communication) is processed in the base station 910 in a manner similar to that described in relation to the receiver function in the terminal 920. Each Tx/Rx module 925 receives a signal via a respective antenna 926. Each Tx/Rx module provides an RF carrier and information to the RX processor 923. The processor 921 may be associated with a memory 924 that stores program code and data. Memory may be referred to as a computer-readable medium.

RRC Protocol States and State Transitions

RRC uses the following states.

RRC Idle State (RRC IDLE)
PLMN selection
DRXDRX configured by NAS
Broadcast of system information
Paging
Cell re-selection mobility
The UE shall have been allocated an id which uniquely identifies the UE in a tracking area.
No RRC context stored in the eNB (except for a UE that supports User Plane CIoT EPS optimizations where a context may be stored for the resume procedure)
Sidelink communication transmission and reception
Sidelink discovery announcement and monitoring
V2X sidelink communication transmission and reception EDT.
RRC connected state (RRC_CONNECTED)
The UE has an E-UTRAN-RRC connection.
The UE has a context in E-UTRAN.
E-UTRAN knows the cell which the UE belongs to.
Network can transmit and/or receive data to/from UE.
Network controlled mobility (handover and inter-RAT cell change order to GERAN with NACC)
Neighbour cell measurements
Sidelink communication transmission and reception
Sidelink discovery announcement and monitoring
V2X sidelink communication transmission and reception
At PDCP/RLC/MAC level:
 The UE can transmit and/or receive data to/from the network.
 The UE monitors control signaling channel for shared data channel to see if any transmission over the shared data channel has been allocated to the UE.
 The UE also reports channel quality information and feedback information to eNB.
 A DRX cycle can be configured according to UE activity level for UE power saving and efficient resource utilization. This is under control of the eNB.
E-UTRA connected to 5GC additionally supports RRC_I-NACTIVE state which can be characterized as follows:
 RRC INACTIVE:
 PLMN selection
 Broadcast of system information
 Cell re-selection mobility
 Monitors a Paging channel for CN paging and RAN paging
 RAN-based notification area (RNA) is configured by NG-RAN.
 DRX for RAN paging configured by NG-RAN.
 5GC-NG-RAN connection (both C/U-planes) is established for UE.
 The UE AS context is stored in NG-RAN and the UE.
 NG-RAN knows the RNA which the UE belongs to.
 RRC State Management FIGS. 13A to 13E are diagrams illustrating examples of an RFC connection establishment procedure.

FIG. 13A illustrates a case where RRC connection establishment is successful. The UE transmits an RRC connection request message to the E-UTRAN. Next, the UE receives an RRC connection configuration message from the E-UTRAN. Next, the UE transmits an RRC connection configuration complete message to the E-UTRAN.

FIG. 13B illustrates a case where the RRC connection establishment is unsuccessful by the reject of the base station. The UE transmits the RRC connection request message to the E-UTRAN. Next, the UE receives an RRC connection reject message from the E-UTRAN.

FIG. 13C illustrates a case where RRC connection resume is successful. The UE transmits an RRC connection resume request message to the E-UTRAN. Next, the UE receives the RRC connection resume message from the E-UTRAN. Last, the UE transmits an RRC connection resume success message to the E-UTRAN.

FIG. 13D illustrates a case where an RRC connection resume procedure falls back to an RRC connection establishment procedure. The UE transmits the RRC connection resume message to the E-UTRAN. Next, the UE receives the RRC connection configuration message from the E-UTRAN. Last, the UE transmits an RRC connection configuration success message to the E-UTRAN.

FIG. 13E illustrates a case where the RRC connection resume is unsuccessful by the reject of the base station. The UE transmits the RRC connection resume request message to the E-UTRAN. Next, the UE receives the RRC connection reject message from the E-UTRAN.

FIGS. 14A and 14B are diagrams illustrating examples of an RFC connection re-configuration procedure.

FIG. 14A illustrates a case where an RRC connection reconfiguration procedure is successful.

The UE receives the RRC connection configuration message from the EUTRAN. Next, the UE transmits an RRC connection reconfiguration complete message to the EUTRAN.

FIG. 14B illustrates a case where the RRC connection reconfiguration procedure is unsuccessful.

The UE receives the RRC connection configuration message from the EUTRAN. Although receiving the RRC connection reconfiguration message, the UE cannot transmit the RRC connection reconfiguration complete message. Next, the UE reperforms the RRC connection reconfiguration procedure with the EUTRAN.

A purpose of such a procedure is to modify the RRC connection. As an example, the RRC connection reconfiguration procedure may be performed for (i) RB configuration/modification/release, (ii) handover performing, (iii) measurement configuration/modification/release, (iv) SCell addition, modification/release, etc.

As a part of the RRC reconfiguration procedure, NAS dedicated information may be transmitted from the E-UTRAN to the UE.

FIG. 15 is a diagram illustrating an example of an RRC connection release procedure.

The UE receives the RRC connection release message from the EUTRAN.

A purpose of the RRC connection release procedure is as follows.
 To release the RRC connection, which includes the release of the established radio bearers as well as all radio resources, or
 To suspend the RRC connection, which includes the suspension of the established radio bearers.

Further, the RRC connection release may also be performed by a request of a higher layer. A purpose of the RRC connection release procedure requested by the higher layer is to release to the RRC connection. As a result of performing such a procedure, an access to current CELL may be rejected.

The higher layer causes such a procedure, and for example, when it is determined that the network fails in authentication, such a procedure may be caused.

When the higher layer requests of the release of the RRC connection, the UE may initiate such a procedure.

The UE does not initiate such a procedure for a purpose of power saving.

The UE:
 1> when the higher layer represents blocking of PCell:
  2> handles that PCell used before entering the RRC_IDLE state is prevented.
 1> If a release reason is 'other', the UE performs a specific operation when terminating the RRC_connected state.

MTC (Machine Type Communication)

MTC (Machine Type Communication) is an application that does not require a lot of throughput that may be applied to M2M (Machine-to-Machine) or IoT (Internet-of-Things), and refers to a communication technology adopted to meet the requirements of IoT services in the 3rd Generation Partnership Project (3GPP).

MTC may be implemented to satisfy the criteria of (i) low cost and low complexity, (ii) enhanced coverage, and (iii) low power consumption.

In 3GPP, MTC has been applied from release 10, and briefly looks at the features of MTC added for each release of 3GPP.

First, the MTC described in 3GPP release 10 and release 11 relates to a load control method.

The load control method is to prevent IoT (or M2M) devices from suddenly putting a load on the base station in advance.

More specifically, release 10 relates to a method of controlling, by a base station, the load by disconnecting the connection to the connected IoT devices when a load occurs, and release 11 relates to a method of blocking access to the terminal in advance by notifying a terminal in advance that the base station will access later through broadcasting such as SIB14.

In the case of Release 12, a feature for low cost MTC was added, and for this purpose, UE category 0 was newly defined. UE category is an indicator of how much data a terminal can process in a communication modem.

That is, UE category 0 UEs reduce the baseband and RF complexity of UEs by using a half duplex operation with a reduced peak data rate, relaxed RF requirements, and a single receiving antenna.

In Release 13, a technology called eMTC (enhanced MTC) was introduced, and by operating only at 1.08 MHz, which is the minimum frequency bandwidth supported by legacy LTE, the price and power consumption may be further lowered.

The contents described below are mainly features related to eMTC, but may be equally applied to MTC, eMTC, and MTC applied to 5G (or NR) unless otherwise specified. Hereinafter, for convenience of description, it will be collectively referred to as MTC.

Therefore, the MTC to be described later may be referred to in other terms such as eMTC (enhanced MTC), LTE-M1/M2, BL (Bandwidth reduced low complexity)/CE (coverage enhanced), non-BL UE (in enhanced coverage), NR MTC, and enhanced BL/CE. That is, the term MTC may be replaced with a term to be defined in the future 3GPP standard.

General MTC Feature (1) MTC operates only in a specific system bandwidth (or channel bandwidth).

The specific system bandwidth may use 6RB of legacy LTE as shown in Table 5 below, and may be defined in consideration of the frequency range and subcarrier spacing (SCS) of the NR defined in Tables 6 to 8. The specific system bandwidth may be expressed as a narrowband (NB). For reference, Legacy LTE refers to a part described in 3GPP standards other than MTC. Preferably, in the NR, the MTC may operate using RBs corresponding to the lowest system bandwidth of Tables 7 and 8 below, as in legacy LTE. Alternatively, in NR, the MTC may operate in at least one bandwidth part (BWP) or may operate in a specific band of the BWP.

TABLE 5

| Channel bandwidth BWChannel [MHz] | 1.4 | 3 | 5 | 10 | 15 | 20 |
|---|---|---|---|---|---|---|
| Transmission bandwidth configuration $N_{RB}$ | 6 | 15 | 25 | 50 | 75 | 100 |

Table 6 is a table showing the frequency range (FR) defined in NR.

TABLE 6

| Frequency range designation | Corresponding frequency range |
|---|---|
| FR1 | 450 MHz-6000 MHz |
| FR2 | 24250 MHz-52600 MHz |

Table 7 is a table showing an example of the maximum transmission bandwidth configuration (NRB) for the channel bandwidth and SCS in FR 1 of NR.

TABLE 7

| SCS (kHz) | 5 MHz NRB | 10 MHz NRB | 15 MHz NRB | 20 MHz NRB | 25 MHz NRB | 30 MHz NRB | 40 MHz NRB | 50 MHz NRB | 60 MHz NRB | 80 MHz NRB | 90 MHz NRB | 100 MHz NRB |
|---|---|---|---|---|---|---|---|---|---|---|---|---|
| 15 | 25 | 52 | 79 | 106 | 133 | 160 | 216 | 270 | N/A | N/A | N/A | N/A |
| 30 | 11 | 24 | 38 | 51 | 65 | 78 | 106 | 133 | 162 | 217 | 245 | 273 |
| 60 | N/A | 11 | 18 | 24 | 31 | 38 | 51 | 65 | 79 | 107 | 121 | 135 |

Table 8 is a table showing an example of the maximum transmission bandwidth configuration (NRB) for the channel bandwidth and SCS in FR 2 of NR.

TABLE 8

| SCS (kHz) | 50 MHz NRB | 100 MHz NRB | 200 MHz NRB | 400 MHz NRB |
|---|---|---|---|---|
| 60 | 66 | 132 | 264 | N.A |
| 120 | 32 | 66 | 132 | 264 |

The MTC narrowband (NB) will be described in more detail.

MTC follows narrowband operation to transmit and receive physical channels and signals, and the maximum channel bandwidth is reduced to 1.08 MHz or 6 (LTE) RBs.

The narrowband may be used as a reference unit for resource allocation units of some channels of downlink and uplink, and the physical location of each narrowband in the frequency domain may be defined differently according to system bandwidth.

The bandwidth of 1.08 MHz defined in MTC is defined in order for the MTC terminal to follow the same cell search and random access procedures as the legacy terminal.

MTC may be supported by cells with a much larger bandwidth (eg 10 MHz) than 1.08 MHz, but physical channels and signals transmitted/received by MTC are always limited to 1.08 MHz.

The system having the much larger bandwidth may be a legacy LTE, an NR system, a 5G system, and the like.

Narrowband is defined as six non-overlapping consecutive physical resource blocks in the frequency domain.

If $N_{NB}^{UL} \geq 4$, the wideband is defined as 4 non-overlapping narrowbands in the frequency domain. If $N_{NB}^{UL} < 4$, $N_{WB}^{UL} = 1$ and a single wideband are composed of a $N_{NB}^{UL}$ non-overlapping narrowband(s).

For example, in the case of a 10 MHz channel (50 RBs), 8 non-overlapping narrowbands are defined.

FIG. 16 is a diagram illustrating an example of a narrowband operation and frequency diversity.

FIG. 16(a) is a diagram showing an example of a narrowband operation, and FIG. 16(b) is a diagram showing an example of repetition with RF retuning.

Referring to FIG. 16(b), frequency diversity by RF retuning will be described.

Due to narrowband RF, single antenna and limited mobility, MTC supports limited frequency, spatial and temporal diversity. To reduce the effects of fading and outage, frequency hopping is supported between different narrowbands by RF retuning.

This frequency hopping is applied to different uplink and downlink physical channels when repetition is possible.

For example, when 32 subframes are used for PDSCH transmission, the first 16 subframes may be transmitted on the first narrowband. At this time, the RF front-end is retuned to another narrowband, and the remaining 16 subframes are transmitted on the second narrowband.

The narrowband of the MTC may be configured by system information or downlink control information (DCI).

(2) MTC operates in a half duplex mode and uses a limited (or reduced) maximum transmit power.

(3) MTC does not use a channel (defined in legacy LTE or NR) that should be distributed over the entire system bandwidth of legacy LTE or NR.

As an example, legacy LTE channels not used for MTC are PCFICH, PHICH, and PDCCH.

Accordingly, the MTC cannot monitor the above channels and thus defines a new control channel MPDCCH (MTC PDCCH).

The MPDCCH spans up to 6RBs in the frequency domain and one subframe in the time domain.

MPDCCH is similar to EPDCCH, and additionally supports common search space for paging and random access.

The MPDCCH is similar to the concept of E-PDCCH used in legacy LTE.

(4) MTC uses a newly defined DCI format, and may be DCI formats 6-0A, 6-0B, 6-1A, 6-1B, 6-2, etc. as an example.

(5) MTC may repeatedly transmit PBCH (physical broadcast channel), PRACH (physical random access channel), M-PDCCH (MTC physical downlink control channel), PDSCH (physical downlink shared channel), PUCCH (physical uplink control channel), and PUSCH (physical Uplink shared channel). Such MTC repetitive transmission may decode the MTC channel even when the signal quality or power is very poor, such as in a poor environment such as a basement, thereby increasing a cell radius and effecting signal penetration. The MTC can support only a limited number of transmission modes (TM) that can operate in a single layer (or single antenna), or can support a channel or a reference signal (RS) that can operate in a single layer. For example, the transmission mode in which the MTC can operate may be TM 1, 2, 6 or 9.

(6) HARQ retransmission of MTC is adaptive and asynchronous, and is based on a new scheduling assignment received on the MPDCCH.

(7) In MTC, PDSCH scheduling (DCI) and PDSCH transmission occur in different subframes (cross subframe scheduling).

(8) All resource allocation information (subframe, transport block size (TBS), subband index) for SIB1 decoding is determined by parameters of MIB, and no control channel is used for SIB1 decoding of MTC.

(9) All resource allocation information (subframe, TBS, subband index) for SIB2 decoding is determined by several SIB1 parameters, and no control channel for SIB2 decoding of MTC is used.

(10) MTC supports extended paging (DRX) cycle.

(11) MTC may use the same primary synchronization signal (PSS)/secondary synchronization signal (SSS)/common reference signal (CRS) used in legacy LTE or NR. In the case of NR, PSS/SSS is transmitted in units of an SS block (or SS/PBCH block or SSB), and a tracking RS (TRS) may be used for the same purpose as a CRS. That is, TRS is a cell-specific RS and may be used for frequency/time tracking.

MTC Operation Mode and Level

Next, an MTC operation mode and level will be described. MTC is classified into two operation modes (first mode and second mode) and four different levels for coverage enhancement, and may be as shown in Table 9 below.

The MTC operation mode is referred to as CE Mode. In this case, the first mode may be referred to as CE Mode A and the second mode may be referred to as CE Mode B.

TABLE 9

| Mode | Level | Description |
| --- | --- | --- |
| Mode A | Level 1 | No repetition for PRACH |
| | Level 2 | Small Number of Repetition for PRACH |
| Mode B | Level 3 | Medium Number of Repetition for PRACH |
| | Level 4 | Large Number of Repetition for PRACH |

The first mode is defined to improve small coverage in which complete mobility and channel state information (CSI) feedback are supported, and thus there is no repetition or a mode with a small number of repetitions. The operation of the first mode may be the same as the operation range of UE category 1. The second mode is defined for UEs with extremely poor coverage conditions supporting CSI feedback and limited mobility, and a large number of repetitive transmissions are defined. The second mode provides up to 15 dB of coverage enhancement based on the range of UE category 1. Each level of MTC is defined differently in RACH and paging procedure.

The method of determining an MTC operation mode and each level will be described.

The MTC operation mode is determined by the base station, and each level is determined by the MTC terminal. Specifically, the base station transmits RRC signaling including information on the MTC operation mode to the terminal. Here, RRC signaling may be an RRC connection setup message, an RRC connection reconfiguration message, or an RRC connection reestablishment message. Here, the term of the message may be expressed as an information element (IE).

Thereafter, the MTC terminal determines a level within each operation mode and transmits the determined level to the base station. Specifically, the MTC terminal determines the level in the operation mode based on the measured channel quality (e.g. RSRP, RSRQ or SINR), and notifies the determined level to the base station using PRACH resources (frequency, time, preamble) corresponding to the determined level.

MTC Guard Period

As described above, MTC operates in the narrowband. The position of the narrowband may be different for each specific time unit (e.g. subframe or slot). The MTC terminal tunes to different frequencies in all time units. Therefore, a certain time is required for all frequency retuning, and this certain time is defined as the guard period of the MTC. That is, when switching from one time unit to the next time unit, the guard period is required, and the transmission and reception do not occur during the period.

The guard period is defined differently depending on whether it is a downlink or an uplink, and is defined differently according to a downlink or uplink situation. First, the guard period defined in the uplink is defined differently according to the characteristics of data carried by the first time unit (time unit N) and the second time unit (time unit N+1). Next, the guard period of the downlink requires a condition that (1) the first downlink narrowband center frequency and the second narrowband center frequency are different, and (2) in TDD, the first uplink narrowband center frequency and the second downlink center frequency are different.

Referring to the MTC guard period defined in Legacy LTE, the guard period of $N_{symb}^{retune}$ eSC-FDMA symbols are generated at most for Tx-Tx frequency retuning between two contiguous subframes. When the higher layer parameter ce-RetuningSymbols is set, then $N_{symb}^{retune}$ is equal to ce-RetuningSymbols, otherwise $N_{symb}^{retune}=2$. In addition, for the MTC terminal configured with the higher layer parameter srs-UpPtsAdd, a guard period of the maximum SC-FDMA symbol is generated for Tx-Tx frequency retuning between the first special subframe for frame structure type 2 and the second uplink subframe.

FIG. 17 is a diagram illustrating physical channels that may be used for MTC and a general signal transmission method using the physical channels.

The MTC terminal, which is powered on again while the power is turned off, or that newly enters the cell, performs an initial cell search operation such as synchronizing with the base station in step S1101. To this end, the MTC terminal receives a Primary Synchronization Signal (PSS) and a Secondary Synchronization Signal (SSS) from the base station, synchronizes with the base station, and acquires information such as a cell identifier (ID). The PSS/SSS used for the initial cell search operation of the MTC may be a legacy LTE PSS/SSS, a Resynchronization signal (RSS), or the like.

Thereafter, the MTC terminal may receive a physical broadcast channel (PBCH) signal from the base station to obtain intra-cell broadcast information.

Meanwhile, the MTC terminal may check a downlink channel state by receiving a downlink reference signal (DL RS) in the initial cell search step. Broadcast information transmitted through the PBCH is MIB (Master Information Block), and in MTC, the MIB is repeated in a subframe (subframe #9 for FDD, subframe #5 for TDD) different from the first slot of subframe #0 of the radio frame.

PBCH repetition is performed by repeating exactly the same constellation (constellation) point in different OFDM symbols so that it may be used for initial frequency error estimation even before attempting PBCH decoding.

FIG. 18 is a diagram an example of system information transmission of an MTC.

FIG. 18(a) is a diagram showing an example of a frequency error estimation method of a repetition pattern for subframe #0, a general CP, and repeated symbols in FDD, and FIG. 18(b) illustrates an example of the transmission of the SIB-BR on the wideband LTE channel.

In MIB, five reserved bits are used in MTC to transmit scheduling information for a new system information block for bandwidth reduced device (SIB1-BR) including a time/frequency location and a transmission block size.

The SIB-BR is transmitted directly on the PDSCH without any control channel associated with it.

The SIB-BR remains unchanged in 512 radio frames (5120 ms) to allow multiple subframes to be combined.

Table 10 is a table showing an example of the MIB.

TABLE 10

```
-- ASN1START
MasterInformationBlock ::=          SEQUENCE {
    dl-Bandwidth                    ENUMERATED {
                                        n6, n15, n25, n50, n75, n100},
    phich-Config                    PHICH-Config,
    systemFrameNumber                   BIT STRING (SIZE (8)),
    schedulingInfoSIB1-BR-r13           INTEGER (0..31),
    systemInfoUnchanged-BR-r15          BOOLEAN,
    spare                           BIT STRING (SIZE (4))
}
-- ASN1STOP
```

In Table 10, the schedulingInfoSIB1-BR field represents an index for a table defining SystemInformationBlockType1-BR scheduling information, and value 0 means that SystemInformationBlockType1-BR is not scheduled. Overall functions and information carried by SystemInformationBlockType1-BR (or SIB1-BR) are similar to SIB1 of legacy LTE. The contents of SIB1-BR may be classified into (1) PLMN, (2) cell selection criteria, and (3) scheduling information for SIB2 and other SIBs.

After completing the initial cell search, the MTC terminal may acquire more detailed system information by receiving the MPDCCH and the PDSCH according to the MPDCCH information in step S1002. MPDCCH is (1) very similar to EPDCCH, carries common and UE specific signaling, (2) may be transmitted only once or may be transmitted repeatedly (the number of repetitions is configured by higher layer signaling), (3) A number of MPDCCHs are supported and the UE monitors the set of MPDCCHs, (4) is formed by combining an enhanced control channel element (eCCE), each eCCE includes a set of resource elements, (5) RA-RNTI (Radio Network Temporary Identifier), SI-RNTI, P-RNTI, C-RNTI, temporary C-RNTI, and semi-persistent scheduling (SPS) C-RNTI.

Thereafter, the MTC terminal may perform a random access procedure such as steps S1003 to S1006 in order to complete access to the base station. The basic configuration related to the RACH procedure is transmitted by SIB2. In addition, SIB2 includes parameters related to paging. Paging Occasion (PO) is a subframe in which P-RNTI may be transmitted on MPCCH. When the P-RNTI PDCCH is repeatedly transmitted, PO refers to the start subframe of the MPDCCH repetition. The paging frame (PF) is one radio frame and may include one or a plurality of POs. When DRX is used, the MTC terminal monitors only one PO per DRX cycle. Paging NarrowBand (PNB) is one narrowband, and the MTC terminal performs paging message reception.

To this end, the MTC terminal may transmit a preamble through a physical random access channel (PRACH) (S1003), and receive a response message (RAR) to the preamble through an MPDCCH and a corresponding PDSCH (S1004). In the case of contention-based random access, the MTC terminal may perform a contention resolution procedure such as transmission of an additional PRACH signal (S1005) and reception of an MPDCCH signal and a PDSCH signal corresponding thereto (S1006). Signals and/or messages (Msg 1, Msg 2, Msg 3, Msg 4) transmitted in the RACH procedure in the MTC may be repeatedly transmitted, and this repetition pattern is set differently according to the CE level. Msg 1 means PRACH preamble, Msg 2 means RAR (random access response), Msg 3 means UL transmission of the MTC terminal for RAR, and Msg 4 means DL transmission of the base station for Msg 3.

For random access, signaling for different PRACH resources and different CE levels is supported. This provides the same control of the near-far effect for the PRACH by grouping together UEs experiencing similar path loss. Up to four different PRACH resources may be signaled to the MTC terminal.

The MTC terminal estimates the RSRP using a downlink RS (e.g. CRS, CSI-RS, TRS, etc.), and selects one of the resources for random access based on the measurement result. Each of the four resources for random access has a relationship with the number of repetitions for the PRACH and the number of repetitions for the random access response (RAR).

Therefore, the MTC terminal with bad coverage needs a large number of repetitions to be successfully detected by the base station, and needs to receive an RAR having a corresponding repetition number to satisfy their coverage level.

Search spaces for RAR and contention resolution messages are also defined in the system information and are independent for each coverage level.

The PRACH waveform used in MTC is the same as the PRACH waveform used in legacy LTE (e.g. OFDM and Zadof-Chu sequence).

After performing the above-described procedure, the MTC terminal receives MPDCCH signal and/or PDSCH signal (S1007) and transmits physical uplink shared channel (PUSCH) signal and/or physical uplink control channel (PUCCH) signal (S1008) as a general uplink/downlink signal transmission procedure. Control information transmitted from the MTC terminal to the base station is collectively referred to as uplink control information (UCI). UCI may include HARQ-ACK/NACK, scheduling request (SR), channel quality indicator (CQI), precoding matrix indicator (PMI), rank indication (RI) information, etc.

When the RRC connection to the MTC terminal is established, the MTC terminal blind-decodes the MPDCCH in a search space configured to obtain uplink and downlink data allocation.

MTC uses all OFDM symbols available in a subframe to transmit DCI. Therefore, time domain multiplexing between the control channel and the data channel is impossible in the same subframe. That is, as described above, cross-subframe scheduling between the control channel and the data channel is possible.

The MPDCCH having the last repetition in subframe #N schedules PDSCH allocation in subframe #N+2.

The DCI transmitted by the MPDCCH provides information on how many times the MPDCCH is repeated so that the MTC terminal knows when PDSCH transmission starts.

PDSCH allocation may be performed in different narrowbands. Therefore, the MTC terminal needs to retune before decoding the PDSCH allocation.

For uplink data transmission, scheduling follows the same timing as legacy LTE. Here, the last MPDCCH in subframe #N schedules PUSCH transmission starting in subframe #N+4.

FIG. 19 is a diagram illustrating an example of scheduling for each of the MTC and legacy LTE.

Legacy LTE allocation is scheduled using the PDCCH, which uses the first OFDM symbols in each subframe, and the PDSCH is scheduled in the same subframe as the subframe in which the PDCCH is received.

In contrast, the MTC PDSCH is scheduled to cross-subframe, and one subframe is defined between the MPDCCH and the PDSCH to allow MPDCCH decoding and RF retuning.

The MTC control channel and data channels may be repeated through a large number of subframes having a maximum of 256 subframes for the MPDCCH and a maximum of 2048 subframes for the PDSCH so as to be decoded under extreme coverage conditions.

Cell Search of MTC

The cell search is a procedure in which the UE obtains time and frequency synchronization with a cell and detects a cell ID of the cell. An E-UTRA cell search supports an entire extensible transmission bandwidth corresponding to 6 RBs or more. PSS and SSS are transmitted to a downlink in order to facilitate the cell search.

When a re-synchronization signal is transmitted in the downlink, the re-synchronization signal may be used for obtaining the time and frequency synchronization with the cell again. A physical layer provides 504 unique cell IDs by using the synchronization signal.

The UE searches the PSS/SSS in center 6 PRBs to obtain subframe timing information, duplexing mode (time division duplex (TDD) or frequency division duplex (FDD)), and a cyclic prefix (CP) length. The PSS uses a Zadoff-Chu (ZC) sequence.

In the case of frame structure type 1 (i.e., FDD), the PSS should be mapped to last orthogonal frequency division multiplexing symbol in slots 0 and 10.

In the case of frame structure type 2 (i.e., TDD), the PSS should be mapped to a third OFDM symbol in subframes 1 and 6. The SSS uses interleave concatenation of two binary sequences having a length of 31. The concatenated sequence is scrambled with a scrambling sequence given by the PSS.

In the case of the FDD, the SSS should be mapped to OFDM symbol number NsymbDL-2 in slots 0 and 10, and here, NsymbDL represents the number of OFDM symbols in a downlink slot. In the case of the TDD, the SSS should be mapped to OFDM symbol number NsymbDL-1 in slots 1 and 11, and here, NsymbDL represents the number of OFDM symbols in the downlink slot.

System Information Acquisition of MTC

Hereinafter, a system information acquisition procedure of the MTC described in step S1002 of FIG. 17 will be described in more detail.

When searching the cell by using the PSS/SSS, the UE acquires system information (SI). FIG. 20 illustrates a general system information acquisition procedure.

The UE acquires access stratum (AS) and non-access stratum (NAS) system information broadcasted by the E-UTRAN by applying the system information acquisition procedure. This procedure is applied to an RRC_IDLE UE and an RRC_CONNECTED UE.

The system information is divided into a MasterInformationBlock (MIB) and several System Information Blocks (SIBs). The MIB most requisite physical layer information of the cell, which is required for receiving additional system information. The MIB is transmitted through PBCH. In addition to SystemInformationBlockType1 (SIB1), the SIB is delivered as an SI message, and mapping SI information to the SI message may be configured by SchedulingInfoList included in SIB1, and there is a following limitation.

1) Each SIB is included only in a single SI message, and included in the corresponding message at most once.

2) Only an SIB having the same scheduling request (period) may be mapped to the same SI message.

3) SIB1 (SystemInformationBlockType2 (SIB2)) is continuously mapped to an SI message corresponding to a first item in an SI message list of a scheduling information list.

Several SI messages may be transmitted at the same period. SystemInformationBlockType1 and all SI messages are transmitted through DL-SCH. A BL UE and a UE of CE applies a BR version of the SIB or SI message (e.g., there is SystemInformationBlockType1-BR.).

The MIB uses a fixed schedule in which the period is 40 ms and a repetition is within 40 ms. First transmission of the MIB is scheduled in subframe #0 of a radio frame with SFN mod 4=0, and the repetition is scheduled in subframe #0 of all other radio frames. In the case of a TDD/FDD system having a larger bandwidth than 1.4 MHz, which supports the BL UE or UE in the CE, MIB transmission may be additionally repeated (i) in subframe #0 of the same radio frame and (ii) in subframe #9 of a previous radio frame for the FDD and in subframe #5 of the same radio frame for the TDD may be additionally repeated.

SystemInformationBlockType1 includes information related to a case of evaluating whether the UE may access the cell, and defines scheduling of another system information block. SystemInformationBlockType1 uses a fixed schedule in which the period is 80 ms and the repetition is within 80 ms. First transmission of SystemInformationBlockType1 is scheduled in subframe #5 of a radio frame with SFN mod 8=0, and the repetition is scheduled in subframe #5 of all other radio frames with SFN mod 2=0.

In the case of the BL UE or UEs in CE, an MIB in which additional repetition may be provided is applied. On the contrary, in the case of SIB1 and the additional SI message, separate messages which may be independently scheduled and may have different contents are used.

A separate instance of SIB1 is named as SystemInformationBlockType1-BR. SystemInformationBlockType1-BR includes information such as valid downlink and uplink subframes, maximum support of coverage enhancement, and scheduling information for other SIB. SystemInformationBlockType1-BR is directly transmitted through the PDSCH without an associated control channel. In SystemInformationBlockType1-BR, a schedule in which the period is 80 ms is used. A transport block size (TBS) and repetition within 80 ms for SystemInformationBlockType1-BR are displayed in an RRCConnectionReconfiguration message including MobilityControlInfo through scheduling information SIB1-BR or selectively in the MIB. In particular, in the MIB, 5 reserved bits is used by eMTC in order to schedulinginformation for SystemInformationBlockType1-BR, which includes time and frequency locations, and the transport block size. SIB-BR is maintained in a state not to be changed in 512 radio frames (5120 ms) to combine a lot of subframes.

The SI message is transmitted within a time domain window (referred to as an SI window) periodically generated by using dynamic scheduling. Each SI message is associated with the SI window, and an SI window of another SI message does not overlap. That is, only a corresponding SI is transmitted within one SI window. A length of the SI window may be common to and configured in all SI messages. Within the SI window, the corresponding SI message may be transmitted several times in a multimedia broadcast multicast service single frequency network (MBSFN) subframe, an uplink subframe in the TDD, and a random subframe other than subframe #5 of a radio frame with the SFN mode. The UE decodes system information radio network temporary identity (SI-RNTI) on the PDCCH to acquire detailed time domain scheduling (and other information, e.g., frequency domain scheduling and a used transmission format). In the case of the BL UE or the UE of the CE, the detailed time/frequency domain scheduling information for the SI message is provided by SystemInformationBlockType1-BR.

SystemInformationBlockType2 includes a parameter required for a basic configuration of a random access channel (RACH) to include common and shared channel information. After decoding all required SIBs, the UE may access the cell by starting the random access procedure.

Random Access Procedure of MTC

Hereinafter, the random access procedure of the MTC described in steps S1003 to S1006 of FIG. 17 will be described in more detail.

The random access procedure is performed with respect to the following events.

Initial access in RRC_IDLE;

RRC connection re-establishment procedure;

Handover;

DL data arrival during RRC_CONNECTED requiring random access procedure;

UL data arrival during RRC_CONNECTED requiring random access procedure; and

Location designation purpose during RRC_CONNECTED requiring random access procedure.

A legacy random access procedure and a random access procedure for eMTC are the same in terms of a general large figure and an entire protocol sequence. That is, a main purpose of the random access procedure is to achieve uplink synchronization and obtain a permission to an initial connection. The entire protocol sequence of the random access procedure is constituted by four messages, i.e., Msg1, Msg2, Msg3, and Msg4. Basic information for the random access procedure is notified to the UE through SIB2.

Meanwhile, the radon access procedure for the eMTC supports different PRACH resources and different CE level signaling. This groups UEs which experience a similar path loss to provide control of some of local effects for the PRACH. Up to 4 different PRACH resources may be signaled, and each PRACH resource has a reference signal received power (RSRP) threshold. The UE estimates RSRP by using a cell-specific reference signal (CRS), and selects one of resource for a random access based on a measurement result. Each of the four resources has the number of repetition times for the PRACH and the number of repetition times for the random access response (RAR). Accordingly, in order for a UE in which coverage is bad to be successfully detected by the eNB, more repetitions are required, and in order to satisfy CE levels thereof, the RAR needs to be received by a corresponding number of repetitions. A search space for the RAR and a contention resolution message is defined separately for each CE level. The UE may be configured to be in CE mode A or CE mode B having a UE-specific search space in order to receive an uplink grant and a downlink allocation.

Hereinafter, the random access procedure of the eMTC will be described in detail.

The random access procedure is initiated by a PDCCH order, a media access control (MAC) sub layer itself, or a radio resource control (RRC) sub layer. A random access procedure in Secondary Cell (SCell) should be started only by the PDCCH order. An MAC entity receives PDCCH transmission which matches a PDCCH order masked with cell-RNTI (C-RNTI), and for a specific serving cell, the MAC entity should initiate the random access procedure in this serving cell.

For a random access for a special cell (SpCell), the PDCCH order or RRC selectively represents ra-PreambleIndex and ra-PRACH-MaskIndex, and for a random access in the SCell, the PDCCH order displays ra-PreambleIndex and ra-PRACH-MaskIndex with a different value from 000000. In a primary timing advance group (pTAG), preamble transmission and reception of the PDCCH order through the PRACH are supported only for the SpCell.

It is assumed that the following information for a related serving cell is available before the procedure starts for the BL UE or the UE in the CE.
  Available PRACH resource set related to each enhanced coverage level supported in the serving cell for transmission of random access preamble prach-ConfigIndex.
  Random access preamble group and available random access preamble set in each group (corresponding only to SpCell):
  Case where sizeOfRA-PreamblesGroupA is not the same as numberOfRA-Preambles:
  Random access preamble groups A and B exist, and are calculated as above,
  Otherwise:
  A preamble (if exists) included the random access preamble group for each enhanced coverage level is preamble firstPreamble to lastPreamble.
    Criterion of selecting the PRACH resource based on RSRP measurement per CE level supported in serving cell rsrp-ThresholdsPrachInfoList.
    The maximum number of preamble transmission attempt times per CE level supported in serving cell maxNumPreambleAttemptCE.
    The number of repetition times required for the preamble transmission per attempt for each CE level supported in serving cell mnumRepetitionPerPreambleAttempt.
    A configured UE transmits power of the serving cell that performs the random access procedure, PCMAC,C.
    RA response window size ra-ResponseWindowSize per CE level supported in the serving cell and contention resolution timer) mac-ContentionResolutionTimer (SpCell only).
    Power amplification coefficient powerRampingStep and selective powerRampingStepCE1.
    The maximum number of preamble transmission preambles TransMax-CE.
    Initial preamble power preambleInitialReceivedTargetPower and selective preambleInitialReceivedTargetPowerCE1.
    Preamble format based offset DELTA_PREAMBLE.
  The random access procedure should be performed as follows.
    1> Flush Msg3 buffer.
    1> Configure PREAMBLE_TRANSMISSION_ COUNTER to 1.
    1> Case where the UE is the BL UE or the UE of the CE:
      2> Configure PREAMBLE_TRANSMISSION_COUNTER_CE to 2.
      2> Case where a start CE level is displayed in a PDCCH sequence to start the random access procedure or the start CE level is provided by a higher layer:
        3> The MAC entity is regarded to be at the CE level regardless of the measured RSRP.
      2> Others:
        3> Case where an RSRP threshold value of CE level 3 is configured by the higher layer of rsrp-ThresholdsPrachInfoList, the measured RSRP value is smaller than an RSRP threshold of CE level 3, and the UE may perform CE level 3:
          4> The MAC entity is regarded to be at CE level 3.
        3> Otherwise, case where CE level 3 is configured by the higher layer of rsrp-ThresholdsPrachInfoList, RSRP in which a measured RSRP value of CE level 2 is measured is smaller than an RSRP threshold of CE level 2, and the UE may perform CE level 2:
          4> The MAC entity is regarded to be at CE level 2.
        3> Otherwise, case where the measured RSRP is smaller than an RSRP threshold of CE level 1 configured by the higher layer of rsrp-ThresholdsPrachInfoList:
          4> The MAC entity is regarded to be at CE level 1.
        3> Others:
          4> The MAC entity is regarded to be at CE level 0.
    1> A backoff parameter value is configured to 0 ms.
    1> Selection of a random access resource is performed.

FIG. 21 illustrates a contention based random access procedure.

1. The random access preamble (may be referred to as "Msg1") is transmitted through the PRACH. The UE randomly selects one random access preamble from a random access preamble set indicated by system information or a handover order, and selects a PRACH resource capable of transmitting the random access preamble and transmits the selected PRACH resource.

A physical layer random access preamble is constituted by a cyclic prefix having a length of TCP and a sequence part having a length of TSEQ. Parameter values are listed in Table 11 below, and vary depending on a fame structure and a random access configuration. The higher layer controls a preamble format.

TABLE 11

| Preamble format | $T_{CP}$ | $T_{SEQ}$ |
| --- | --- | --- |
| 0 | $3168 \cdot T_s$ | $24576 \cdot T_s$ |
| 1 | $21024 \cdot T_s$ | $24576 \cdot T_s$ |
| 2 | $6240 \cdot T_s$ | $2 \cdot 24576 \cdot T_s$ |
| 3 | $21024 \cdot T_s$ | $2 \cdot 24576 \cdot T_s$ |
| 4 | $448 \cdot T_s$ | $4096 \cdot T_s$ |

When transmission of the random access preamble is triggered by the MAC layer, the transmission of the random access preamble is limited to specific time and frequency resources. The resources increase in an order of PRB in which index 0 is a lowest number in the radio frame and PRB of a subframe number and a frequency domain in the radio frame to correspond to the subframe. The PRACH resource in the radio frame is represented by a PRACH configuration index.

In the case of the BL/CE UE, PRACH configuration index (prach-ConfigurationIndex), PRACH frequency offset $\bar{n}_{PRBoffset}^{RA}$ (prach-FrequencyOffset), the number of PRACH repetition times per attempt $N_{rep}^{PRACH}$ (numRepetitionPerPreambleAttempt) and, selectively, PRACH starting subframe period $N_{start}^{PRACH}$ (prach-StartingSubframe).

PRACHs of preamble format 0 to 3 are transmitted $N_{rep}^{PRACH} \geq 1$ times, and PRACH of preamble format 4 is transmitted only once.

In the case of the BL/CE UE and each PRACH CEL level, when PRACH configuration frequency hopping is available by a higher layer parameter prach-HoppingConfig, a value of a parameter $n_{PRB\ offset}^{RA}$ depends on system frame number (SFN) and the PRACH configuration index, and given as follows.

When the PRACH configuration index allows the PRACH resource to be generated in all radio frames, the following equation is satisfied.

$$n_{PRB\ offset}^{RA} = \qquad \text{[Equation 3]}$$
$$\begin{cases} \overline{n}_{PRB\ offset}^{RA} & \text{if } n_f \bmod 2 = 0 \\ (\overline{n}_{PRB\ offset}^{RA} + f_{PRB,hop}^{PRACH}) \bmod N_{RB}^{UL} & \text{if } n_f \bmod 2 = 1 \end{cases}$$

In other cases, the following equation is satisfied.

$$n_{PRB\ offset}^{RA} = \qquad \text{[Equation 4]}$$
$$\begin{cases} \overline{n}_{PRB\ offset}^{RA} & \text{if } \left\lfloor \frac{n_f \bmod 4}{2} \right\rfloor = 0 \\ (\overline{n}_{PRB\ offset}^{RA} + f_{PRB,hop}^{PRACH}) \bmod N_{RB}^{UL} & \text{if } \left\lfloor \frac{n_f \bmod 4}{2} \right\rfloor = 1 \end{cases}$$

Here, $n_f$ represents a system frame number corresponding to a first subframe for each PRACH repetition, and $f_{PRB,hop}^{PRACH}$ corresponds to a cell-specific higher layer parameter prach-HoppingOffset. When frequency hopping is not supported for the PRACH configuration, $n_{PRB\ offset}^{RA} = \overline{n}_{PRB\ offset}^{RA}$ is satisfied.

For the BL/CE UE, in only a subset of a subframe in which only preamble transmission is permitted, $N_{rep}^{PRACH}$ repetitions are permitted as a starting subframe. The starting subframe permitted for the PRACH configuration is determined as follows.

A subframe in which the preamble transmission for the PRACH configuration is permitted is as in $n_{sf}^{RA} = 0, \ldots N_{sf}^{RA}-1$. Here, $n_{sf}^{RA}=0$ and $n_{sf}^{RA}=N_{sf}^{RA}-1$ correspond to two subframes permitted for preamble transmission for smallest and largest absolute subframe numbers $n_{sf}^{abs}$, respectively.

When a PRACH starting subframe period $N_{start}^{PRACH}$ is not provided by the higher layer, a periodicity of starting subframes permitted for subframes permitted for the preamble transmission is $N_{rep}^{PRACH}$. Permitted starting subframes defined throughout $n_{sf}^{RA}=0, \ldots N_{sf}^{RA}-1$ are given as in $jN_{rep}^{PRACH}$, and here, $j=0, 1, 2, \ldots$.

When the PRACH starting subframe period $N_{start}^{PRACH}$ is provided by the higher layer, this represents the periodicity of the starting subframes permitted for the subframes permitted for the preamble transmission. Permitted starting subframes defined throughout $n_{sf}^{RA}=0, \ldots N_{sf}^{RA}-1$ are given as in $jN_{start}^{PRACH} + N_{rep}^{PRACH}$, and here, $j=0, 1, 2, \ldots$.

When the starting subframe is not defined throughout $n_{sf}^{RA}=0, \ldots N_{sf}^{RA}-1, N_{sf}^{RA}>N_{sf}^{RA}-N_{rep}^{PRACH}$ is permitted.

The random access preamble is generated from a Zadoff-Chu (ZC) sequence without a correlation zone generated from one or multiple root Zadoff-Chu sequence.

The network configures a series of preamble sequences which may be used by the UE. Up to two 64 preamble sets which may be used in the cell exist in the cell, and set 1 corresponds to a higher layer PRACH configuration using prach-ConfigurationIndex and prach-FrequencyOffset, and when set 2 is configured, set 2 corresponds to a higher layer PRACH configuration using ConfigurationIndexHighSpeed and prach-FrequencyOffsetHighSpeed. 64 preamble sequence sets in the cell may be first obtained when all available cyclic shifts of the root index ZaSeoff-Chu sequence are included in a logic index rootSequenceIndex-HighSpeed (if configured, in the case of set 2) or a logic index RACH_ROOT_SEQUENCE (in the case of set 1) in a sequence of increasing the cyclic shift. Here, both root-SequenceIndexHighSpeed (if configured) and RACH_ROOT_SEQUENCE are broadcasted as some of the system information. When 64 preambles may not be generated from a single root Zadoff-Chu sequence, additional preamble sequences are obtained from a root sequence having consecutive logic indices until a total of 64 sequences are discovered.

2. After the random access preamble is transmitted, the UE attempts to receive a random access response (may be referred to as "Msg2") or a handover order generated by the MAC on the DL-SCH within a random access response reception window displayed by the system information. Random access response information is transmitted in a form of MAC PDCU, and the MAC PDU is transmitted through a Physical Downlink Shared Channel (PDSCH). Specifically, the random access response information is transmitted in the form of the MAC PDCU, and the MAC PDU is transmitted through the Physical Downlink Shared Channel (PDSCH).

In order for the UE to appropriately receive the information transmitted through the PDSCH, a PDCCH is also transmitted jointly. In the case of the eMTC, the MPDCCH is newly introduced. The MPDCCH transports downlink control information and is transmitted through consecutive BL/CE DL subframes of $N_{rep}^{MPDCCH} \geq 1$. Within each $N_{rep}^{MPDCCH}$, BL/CE DL subframes MPDCCH are transmitted by using a set of one or several consecutive enhanced control channel elements (ECCEs) in which each ECCE is constituted by multiple enhanced resource element groups (EREGs).

Further, a narrowband for the MPDCCH is determined by an SIB2 parameter mpdcch-NarrowbandsToMonitor.

The MPDCCH includes information on a UE which is to receive the PDSCH, frequency and time information of the radio resource of the PDSCH, a transmission format of the PDSCH, and the like. When the UE successfully receives the MPDCCH headed to a destination, the UE appropriately receives the random access response transmitted through the PDSCH according to an information item of the MPDCCH. The random access response includes a random access preamble identifier (ID), a UL grant (uplink radio resource), C-RNTI, and a time alignment command (TAC). In the above description, a reason for requiring the random access preamble identifier is that since a single random access response may include random access response information for one or more UEs, the random access preamble identifier informs any UE of whether the UL grant is temporary. The C-RNTI and the TAC are valid. The random access preamble identifier is the same as the random access preamble selected by the UE in step 1. The UL grant included in the random access response depends on a CE mode.

3. When the UE receives a random access response valid therefor, the UE processes the information included in the random access response. That is, the UE applies the TAC and stores temporary C-RNTI. Further, the UE transmits, to the base station, scheduled data (referred to as "Msg3") stored a buffer thereof or newly generated data by using the UL grant for the UL-SCH. In this case, the data included in the UL grant should include an identifier of the UE. The reason is that since the BS may not determine the UE performing the random access procedure in the contention based random access procedure, the BS should then identify the UE in order to solve a collision.

Further, there are two types of methods including the identifier of the UE. A first method is that when the UE has a valid cell identifier already allocated to the corresponding cell before the random access procedure, the UE transmits a cell identifier thereof through the UL grant.

Meanwhile, when the UE may not be allocated with the valid cell identifier before the random access procedure, the UE transmits a unique identifier thereof (e.g., SAE-temporary Mobile Subscriber Identity (S-TMSI) or random ID) included in the data. In general, the unique identifier is longer than the cell identifier. When the UE transmits the data through the UL grant, the UE starts a contention resolution timer.

4. After the UE transmits the data including the identifier thereof through the UL grant included in the random access response, the UE waits for a command from the BS for contention resolution (may be referred to as "Msg4"). That is, the UE attempts to receive the MPDCCH in order to receive a specific message. There are two types of methods for receiving the MPDCCH. As described above, when the identifier of the UE transmitted through the UL grant is the cell identifier, the UE attempts to receive the MPDCCH by using the cell identifier thereof and when the identifier is the unique identifier, the UE attempts to receive the MPDCCH by using the temporary C-RNTI included in the random access response.

Thereafter, in a former case, when the MPDCCH is received through the cell identifier before the contention resolution timer expires, the UE determines that the random access procedure is normally performed and terminates the random access procedure.

In a latter case, when the UE receives the MPDCCH through the temporary cell identifier before the contention resolution timer expires, the UE examines data transmitted by the PDSCH indicated by the MPDCCH. When data contents include the unique identifier, the UE determines that the random access procedure is normally performed and terminates the random access procedure.

When the random access procedure is completed, the MAC entity should perform the followings.
  Explicitly signaled ra-PreambleIndex and ra-PRACH-MaskIndex are discarded.
  In an Msg3 buffer, an HARQ buffer used for transmission of the MAC PDU is flushed.
  Discontinuous Reception Procedure of MTC Hereinafter, the MTC DRX procedure described in FIG. 17 will be described in more detail.

While performing the general signal transmission/reception procedure of the MTC, the MTC UE may be switched from an idle state (e.g., RRC_IDLE state) and/or an inactive state (e.g., RRC_INACTIVE state) in order to reduce power consumption. In this case, the MTC UE which is switched to a valid state and/or the inactive state may be configured by using the DRX scheme. As an example, the MTC UE which is switched to the idle state and/or the inactive state may be configured to perform monitoring of the MPDCCH related to paging only in a specific subframe (or a frame or a slot) according to a DRX cycle configured by the BS. Here, the MPDCCH related to the paging may mean MPDCCH scrambled to paging access-RNTI (P-RNTI).

FIG. 22 illustrates an example of a DRX scheme in an idle state and/or an inactive state.

As illustrated in FIG. 22, the MTC UE in the RRC_IDLE state monitors only a partial subframe (SF) in relation to paging (i.e., paging occasion (PO)) within a subset (i.e., paging frame (PF)) of the radio frame.

The paging is used to trigger RRC connection and change system information for the UE in the RRC_IDLE mode.

Further, a DRX configuration and a DRX indication for the MTC UE may be performed as illustrated in FIG. 22. FIG. 23 illustrates an example of a DRX configuration and indication procedure for an MTC UE. Further, FIG. 23 is just for convenience of the description and does not limit the method proposed in the present disclosure.

Referring to FIG. 23, the MTC UE may receive, from a base station (e.g., NodeB, eNodeB, eNB, gNB, etc.), DRX configuration information (S210). In this case, the MTC UE may receive, from the BS, such information through higher layer signaling (e.g., RRC signaling). Here, the DRX configuration information may include DRX cycle information, a DRX offset, configuration information for timers related to DRX, etc.

Thereafter, the MTC UE may receive, from the BS, a DRX command (S220). In this case, the UE may receive, from the BS, the DRX command through higher layer signaling (e.g., MAC-CE signaling).

The MTC UE that receives the DRX command may monitor the MPDCCH in a specific time unit (e.g., the subframe or the slot) according to the DRX cycle (S230). Here, monitoring the MPDCCH may mean that the corresponding CRC is scrambled with a predetermined specific RNTI value after decoding the MPDCCH of a specific area according to the DCI format to be received through the search space to check whether the corresponding value matches (i.e., coincides with) a desired value.

When the corresponding MTC UE receives information indicating a change of a paging ID and/or system information in the MPDCCH through the procedure illustrated in FIG. 23, the corresponding MTC UE may be configured to initialize (or reconfigure) a connection (e.g., RRC connection) with the BS (e.g., a cell search procedure of FIG. 17) or receive (or acquire) new system information from the BS (e.g., a system acquisition procedure of FIG. 17, etc.).

As an example, when the MTC UE detects the MPDCCH with Paging Access Radio Network Temporary Identifier (P-RNTI) in the PO, the MTC UE decodes a corresponding PDSCH. A paging message may be transmitted through the PDSCH, and may include information including a list of MTC UEs to be paged, and whether the paging is for a connection configuration or whether the system information is changed.

Each MTC UE which searches an ID thereof in this list may deliver the ID to a higher layer to which the ID is paged and receive a command to initialize the RRC connection in sequence. When the system information is changed, the MTC UE may start reading SIB1-BR and acquire information used for reading the SIB from there again.

When coverage enhancement repetition is applied, the PO refers to first transmission in repetition. The PF and the PO are determined from the DRX periodicity provided from the SIB2-BR and the IMSI provided from the USIM card. DRX is discontinuous reception of a DL control channel used for saving a battery life. 128, 256, 512 and 1024 radio frame periodicities corresponding to time intervals between 1.28 seconds and 10.24 seconds are supported. Since an algorithm for determining the PF and the PO also depends on the IMSI, different UEs have different paging occasions, which are temporally evenly distributed. It is enough for the MTC UE to monitor one paging occasion within the DRX cycle and when there are various multiple paging occasions therein, the paging is repeated in each of the various paging occasions.

The concept of Extended DRX (eDRX) may be applied even to the MTC. This is performed by using a hyper frame. When the eDRX is supported, a time period in which the UE does not monitor the paging message may be significantly extended up to a maximum of 3 hours. In response thereto, the MTC UE should know which HFN and which time interval within the HFN a paging time window (PTW), and monitor the paging. The PTW is defined as start and stop of SFN. Within the PTW, the PF and the PO are determined in the same scheme as non-extended DRX.

FIG. 24 illustrates a DRX cycle.

As illustrated in FIG. 24, in FIG. 24, the DRX cycle designates periodic repetition of 'On Duration' according to a possible period of inactivity.

The MAC entity may be configured by RRC having a DRX function controlling a PDCCH monitoring activity of the UE for RNTI (e.g., C-RNTI) of the MAC entity. Accordingly, the MTC UE may monitor the PDCCH during a short period (e.g., 'On Duration'), and stop PDCCH monitoring for a long period (e.g., an occasion for the DRX).

If the DRX is configured when the MAC entity is in RRC_CONNECTED (i.e., connection mode DRX, CDRX), the MAC entity may discontinuously monitor the PDCCH by using a DRX operation designated below. Otherwise, the MAC entity may continuously monitor the PDCCH. In the case of the MTC, the PDCCH may refer to the MPDCCH. In the case of the MTC, an extended DRX cycle of 10.24(s) is supported in the RRC connection.

The RRC controls the DRX operation by configuring DurationTimer, drx-InactivityTimer, drx-RetransmissionTimerShortTTI (one per DL HARQ process in the case of an HARQ process reserved by using short TTI), drx-ULRetransmissionTimer (one per asynchronous UL HARQ process in the case of the HARQ process reserved by using 1 ms TTI), drx-ULRetransmissionTimerShortTTI (in the case of the HARQ process reserved by using short TTI), longDRX-Cycle, drxStartOffset value, and selectively drxShortCycleTimer and shortDRX-Cycle values. An HARQ RTT timer (except for a broadcast process) for the DL HARQ process and a UL HARQ RTT timer for the asynchronous UL HARQ process are defined.

Paging in Extended DRX

The UE may be configured by higher layers having an extended DRX (eDRX) cycle $T_{eDRX}$. Except for NB-IOT, the UE may operate in the extended DRX only when the UE is configured by the higher layer and the cell represents supporting for the eDRX in the system information.

In the case of the NB-IOT, the UE may operate in the extended DRX only when the UE is configured by the higher layers.

When the UE is configured by $T_{eDRX}$ cycle of 512 radio frames, the UE monitors the PO as defined in the paging in the DRX by using parameter T=512. Otherwise, the UE which is configured by the eDRX monitors the PO defined in the paging in the DRX during a periodic paging time window (PTW) configured for the UE or until receiving a paging message an NAS identifier of the UE for the UE during the PTW.

In this case, the UE may stop monitoring the PO when receiving the paging message including the NAS identifier even before the PTW lapsed.

The PTW may be UE specific, and may be determined by a Paging Hyperframe (PH), and a start position (PTW_start) and an end position (PTW_end) in the PH.

The PH, the PTW_start, and the PTW_end may be given by the following equation.

The PH is an H-SFN satisfying the following equation.

$$H\text{-SFN mod } TeDRX,H = (UE\_ID\_H \text{ mod } TeDRX,H) \quad \text{[Equation 5]}$$

In the equation, each parameter is as follows.
UE_ID_H:
When P-RNTI is monitored on the PDCCH or the MPDCCH, 10 most significant bits of hashed ID.
When the P-RNTI is monitored on the NPDCCH, 12 most significant bits of the hashed ID.
$T_{eDRX,H}$: eDRX cycle of the UE in the hyperframe ($T_{eDRX,H}$=1, 2, . . . , 256 Hyper-frames) (for the NB-IOT, $T_{eDRX,H}$=2, . . . , 1024 Hyper-frames), configured by the higher layer.

The PTW_start represents a first radio frame of PH which is a part of the PTW, and has an SFN satisfying the following equation.

$$SFN = 256 * ieDRX, \text{ where}$$

$$ieDRX = floor(UE\_ID\_H / TeDRX, H) \text{mod } 4 \quad \text{[Equation 6]}$$

The PTW_end is a last radio frame of the PTW, and the SFN satisfies the following equation.

$$SFN = (PTW\_start + L * 100 - 1) \text{mod } 1024 \quad \text{[Equation 7]}$$

In the equation, L represents a length (seconds) of the PTW configured by the higher layer.

Hashed_ID represents a frame check sequence (FCS) for bits b31, b30, 쩝 , b0 of S-TMSI, and the S-TMSI has a value of <b39, b38, . . . , b0>.

32-bit FCS should be a complement of 1 of a sum (modulo 2) of Y1 and Y2 below.

Y1: Y1 is a remainder of (modulo 2) xk(x31+x30+x29+x28+x27+x26+x25+x24+x23+x22+x21+x20+x19+x18+x17+x16+x15+x14+x13+x12+x11+x10+x9+x8+x7+x6+x5+x4+x3+x2+x1+1) divided by generator polynomial x32+x26+x23+x22+x16+x12+x11+x10+x8+x7+x5+x4+x2+x+1.

Y2: Y2 is a remainder of (modulo 2) Y3 divided by generator polynomial x32+x26+x23+x22+x16+x12+x11+x10+x8+x7+x5+x4+x2+x+1. Here, Y3 is generator polynomial x32 (b31*x31+b30*x30+ 쩝 +b0*1).

Discontinuous Reception (DRX) for Paging

The UE may use discontinuous reception (DRX) in an idle mode in order to reduce power consumption.

One paging occasion (PO) is a subframe in which there is P-RNTI transmitted to Physical Downlink Control Channel (PDCCH), narrowband PDCCH (NPDCCH) or MTC PDCCH (MPDCCH) or a control channel scheduling the paging message may be transmitted.

When the P-RNTI is transmitted on the MPDCCH, the PO represents a start subframe of MPDCCH repetition. When the P-RNTI is transmitted on the NPDCCH, if the subframe determined by the PO is not an invalid NB-IOT downlink subframe, the PO represents the start subframe of the NPDCCH repetition and a first valid NB-IOT downlink subframe after the PO is a start subframe of NPDCCH repetitions. Paging messages for initiation of RAN and CN are the same as each other.

When the UE receives a RAN paging, the UE start an RRC connection resume procedure. If the UE receives a CN initiation paging in the RRC_INACTIVE state, the UE moves to the RRC_IDLE state and informs the NAS.

One paging frame (PF) is one radio frame which may include one or multiple paging occasions. When the DRX is used, the UE needs to monitor only one PO per DRX cycle.

One paging narrowband (PNB) is one narrowband in which the UE receives the paging message.

The PF, the PO, and the PNB are determined by the following equation by using the DRX parameter provided in the system information.

The PF is given by the following equation.

$$\text{SFN mod } T = (T \text{ div } N)*(UE\_ID \text{ mod } N) \quad \text{[Equation 8]}$$

i_S indicated from a subframe pattern is derived by the following equation.

$$i\_s = \text{floor}(UE\_ID/N) \text{mod } Ns \quad \text{[Equation 9]}$$

When the P-RNTI is monitored on the PDCCH, the PNB is determined by the following equation.

$$PNB = \text{floor}(UE\_ID/(N*Ns)) \text{mod } Nn \quad \text{[Equation 10]}$$

When the P-RNTI is monitored on the NPDCCH and the UE supports the paging in a non-anchor carrier, if a paging configuration for the non-anchor carrier is provided in the system information, a paging carrier is determined by a paging carrier having a smallest index n (n(0≤n≤Nn−1)) satisfying the following equation.

$$\text{floor}(UE\_ID/(N*Ns)) \text{mod } W < W(0) + W(1) + \ldots + W(n) \quad \text{[Equation 11]}$$

System information DRX parameters stored in the UE should be locally updated in the UE whenever the DRX parameter values are changed in the SI.

When the UE does not have USIM, e.g., when the UE makes an emergency call without the USIM, the UE should use UE_ID=0 as a default identity in the equation of PF, i_s, and PNB above.

The following parameters are used for calculating PF, i_s, PNB, and NB-IOT paging carriers.
- T: DRX cycle of UE. Except for the NB-IOT, if a UE specific extended DRX value of 512 radio frames is configured by the higher layer, T=512. Otherwise, if the UE specific extended DRX value is allocated by the higher layer, and a default DRX value is broadcasted as the system information, T is determined as a shortest value among the UE specific DRX values.

If the UE specific DRX is not configured by the higher layer, a default value is applied. The UE specific DRX is not applicable to the NB-IOT. If the UE specific DRX is allocated by the higher layer in the RRC_INACTIVE state, T is determined by a shortest time of a RAN paging cycle, a UE specific paging cycle, and a default paging cycle.
- NB: 4T, 2T, T, T/2, T/4, T/8, T/16, T/32, T/64, T/128, and T/256, and NB-IOT are also 512 and T/1024.
- N: min(T, nB)
- Ns: max(1, nB/T)
- Nn: The number of paging narrowbands (in the case of P-RNTI monitored in the MPDCCH) or paging carrier (in the case of P-RNTI monitored in the NPDCCH) provided to the system information
- UE_ID:
  IMSI mod 1024, when the P-RNTI is monitored in the PDCCH.
  IMSI mod 4096, when the P-RNTI is monitored in the NPDCCH.
  IMSI mod 16384, when the P-RNTI is monitored on the MPDCCH or the P-RNTI is monitored on the NPDCCH, and the UE supports the paging in the non-anchor carrier, and the paging configuration for the non-anchor carrier is provided in the system information.
  W(i): Weight i for NB-IoT paging carrier.
  W: Total weight of all NB-IoT paging carriers, i.e., W=W(0)+W(1)+ . . . +W(Nn−1).

IMSI is given as Integer(0 . . . 9) type digits, the IMSI should be construed as a decimal, and a first number given in a sequence represents a highest digit.

For example, the IMSI may be given as in the following equation.

$$IMSI = 12(\text{digit1}=1, \text{digit2}=2) \quad \text{[Equation 12]}$$

In the above equation, the IMSI should be construed as a decimal integer '12' other than "1×16+2=18".

Paging with Wake Up Signal

When the UE supports Wake Up Signal (WUS) and a WUS configuration is provided in the system information, the UE should monitor the WUS by using WUS parameters provided in the system information.

When discontinuous reception (DRX) is used and the UE detects the WUS, the UE should monitor a subsequent paging occasion (PO).

When extended DRX is used and the UE detects the WUS, the UE should perform earlier monitoring of monitoring numPOs following subsequent POs or performing monitoring until the paging message including the NAS identifier of the UE is received.

If the UE does not detect the WUS, the UE need not monitor the subsequent PO.
- numPOs: The number of consecutive Pos mapped to one WUS provided in the system information (numPOs>0).

The WUS configuration provided in the system information includes a time offset between an end of the WUS and a start of a first PO of numPOs POs. A time offset in a subframe used for calculating a start of subframe g0 is defined as follows.
- In the case of a UE using the DRX, the time offset is signaled timeoffsetDRX.
- In the case of a UE using the eDRX, if timeoffset-eDRX-Long is not broadcasted, the time offset is signaled timeoffset-eDRX-Short.
- In the case of the UE using the eDRX, if timeoffset-eDRX-Long is broadcasted, the time offset is a value determined according to a table below.

TABLE 12

| | | timeoffset-eDRX-Long | |
| --- | --- | --- | --- |
| | | 1000 ms | 2000 ms |
| UE Reported wakeUpSignalMinGap-eDRX | 0 ms | timeoffset-eDRX-Short | timeoffset-eDRX-Short |
| | 40 ms | timeoffset-eDRX-Short | timeoffset-eDRX-Short |
| | 000 ms | timeoffset-eDRX-Long | timeoffset-eDRX-Long |
| | 000 ms | timeoffset-eDRX-Short | timeoffset-eDRX-Long |

The time offset is used for determine actual subframe g0 as in the equation below.

$$g0 = P0 - \text{timeoffset} \quad \text{[Equation 13]}$$

In the UE using the eDRX, the same time offset for generation of all WUSs for the PTW is applied between the end of the WUS and a first associated PO of numPOs POs.

In the above equation, the time offset g0 may be used for calculating the start of the WUS.

Wake-Up Signal of MTC (MWUS)

A BL/CE UE using the MWUS may assume an actual duration of the MWUS which starts in subframe w0 as one of sets disclosed in the following table, which correspond to a maximum duration $L_{MWUS_{max}}$ of the MWUS.

TABLE 13

| $L_{MWUS\_max}$ | Actual MWUS durations set |
|---|---|
| 1 | {1} |
| 2 | {1, 2} |
| 4 | (1, 2, 4) |
| 8 | {1, 2, 4, 8} |
| 16 | {1, 2, 4, 8, 16} |
| 32 | {1, 2, 4, 8, 16, 32} |
| 64 | {1, 2, 4, 8, 16, 32, 64} |

The maximum duration of the MWUS starts in subframe w0 and ends in subframe (g0−1). w0 represents a most recent subframe in which $L_{MWUS_{max}}$ BL/CE DL subframes exist in the maximum duration.

The UE may assume that first associated paging occasion subframes associated with the MWUS and the paging occasion exist in the same narrowband.

Sequence Generation

In the subframe, an MWUS sequence w(m) may be defined as in the following equation.

$$w(m) = \theta_{n_f,n_s}(m')e^{j\frac{\pi u n(n+1)}{131}}$$ [Equation 14]

$$m = 0, 1, \ldots, 131$$

$$m' = m + 132x$$

$$n = m \bmod 132$$

$$\theta_{n_f,n_s}(m') = \begin{cases} 1, & \text{if } c_{n_f,n_s}(2m') = 0 \text{ and } c_{n_f,n_s}(2m'+1) = 0 \\ -1, & \text{if } c_{n_f,n_s}(2m') = 0 \text{ and } c_{n_f,n_s}(2m'+1) = 1 \\ j, & \text{if } c_{n_f,n_s}(2m') = 1 \text{ and } c_{n_f,n_s}(2m'+1) = 0 \\ -j, & \text{if } c_{n_f,n_s}(2m') = 1 \text{ and } c_{n_f,n_s}(2m'+1) = 1 \end{cases}$$

$$u = (N_{ID}^{cell} \bmod 126) + 3$$

In the equation, M means the actual duration of the MWUS described above. A scrambling sequence $c_{n_f,n_s}(i)$, i=0, 1, ..., 2·132M−1 is given by a Pseudo-random sequence and initialized as in the following equation at the start of the MWUS.

$$c_{init\_WUS} = (N_{ID}^{cell} + 1)$$ [Equation 15]

$$\left(\left(10n_{f\_start\_PO} + \left\lfloor \frac{n_{s\_start\_PO}}{2} \right\rfloor\right) \bmod 2048 + 1\right)2^9 + N_{ID}^{cell}$$

In the equation, $n_{f\_start\_PO}$ means a first subframe of the first PO associated with the MWUS and $n_{s\_start\_PO}$ means a first slot of the first PO associated with the MWUS.

Mapping to Resource Elements

The same antenna port should be used for all symbols of the MWUS in the subframe. The MWUS may not be transmitted on the same antenna port as one of a downlink reference signal or a synchronization signal, and the UE should not assume that the MWUS is transmitted through the same antenna port as one of the downlink reference signal or the synchronization signal.

If only one CRS port is configured by the eNB, the UE may assume that transmission of all NWUS subframes is performed by using the same antenna port.

Otherwise, the UE may assume that the same antenna port is used for transmission of the MWUS in downlink subframes w0+2n and w0+2n+1. Here, w0 may represent the first downlink subframe of the MWUS as described above, and n may have values of 0 and 1.

An MWUS bandwidth is two consecutive PRBs, and a frequency location of a lowest PRB is signaled by the higher layer.

For two PRB pairs in a frequency domain in which the NWUS is defined, the MWUS sequence w(m) is mapped to resource elements starting at w(0) in an order of an index k=0, 1, ..., $N_{sc}^{RB}-1$ for 12 allocated subcarriers, and the subsequent index l=3, 4, ..., $2N_{symb}^{DL}-1$ is transmitted in each subframe in which the MWUS is transmitted.

In the MWUS sequence, the MWUS PRB pairs are mapped to the set of the subframes at the actual MWUS duration described above. Here, Here, when the MWUS PRB pair is transmitted in a subframe in which the MWUS PRB pair overlaps with a random PRB pair transporting PDSCH associated with the PSS, the SSS, the RSS, the PBCH, or the SI-RNTI, the subframe is counted in MWUS mapping, but is not used for transmitting the MWUS.

A resource element (k,l) which overlaps with the resource element in which the cell-specific reference signal is transmitted is not used for the MWUS transmission, but counted in a mapping procedure.

NB-IoT (Narrowband-Internet of Things)

NB-IoT may mean a system to support low complexity and low power consumption through system bandwidth (system BW) corresponding to 1 Physical Resource Block (PRB) of a wireless communication system (e.g. LTE system, NR system, etc.).

Here, NB-IoT may be referred to as other terms such as NB-LTE, NB-IoT enhancement, enhanced NB-IoT, further enhanced NB-IoT, and NB-NR. That is, NB-IoT may be defined or replaced by a term to be defined in the 3GPP standard, and hereinafter, it will be collectively expressed as "NB-IoT" for convenience of description.

NB-IoT may be mainly used as a communication method of implementing IoT (i.e. Internet of Things) by supporting a device (or terminal) such as machine-type communication (MTC) in a cellular system. In addition, the NB-IoT system uses the same OFDM parameters as the existing system, such as subcarrier spacing (SCS), used in the existing wireless communication system (eg, 3GPP system, LTE system, NR system). —There is no need to allocate an additional band for the IoT system. In this case, by allocating 1 PRB of the existing system band for NB-IoT, there is an advantage in that the frequency may be efficiently used. In addition, in the case of NB-IoT, since each terminal recognizes a single PRB (single PRB) as a respective carrier, the PRB and the carrier referred to in the present disclosure may be interpreted as having the same meaning.

Hereinafter, the frame structure, physical channel, multi-carrier operation, operation mode, general signal transmission/reception, etc. related to NB-IoT in the present disclosure will be described in consideration of the case of the existing LTE system, but it goes without saying that it may be extended and applied even in the case of a next-generation system (e.g. NR system, etc.). In addition, the contents related to NB-IoT in the present disclosure may be extended and applied to MTC (Machine Type Communication) aiming for similar technical purposes (e.g. low-power, low-cost, coverage improvement, etc.).

NB-IoT Frame Structure and Physical Resource

First, the NB-IoT frame structure may be set differently according to subcarrier spacing. Specifically, FIG. 26 illustrates an example of a frame structure when the subcarrier spacing is 15 kHz, and FIG. 25 illustrates an example of a frame structure when the subcarrier spacing is 3.75 kHz. However, the NB-IoT frame structure is not limited thereto, and of course, NB-IoT for other subcarrier spacing (e.g. 30 kHz, etc.) may be considered in different time/frequency units.

In addition, in the present disclosure, the NB-IoT frame structure based on the LTE system frame structure has been described as an example, but this is for convenience of description and is not limited thereto, and it goes without saying that the method described in the present disclosure may be extended and applied to NB-IoT based on the frame structure of a next-generation system (eg NR system).

FIG. 26 illustrate examples of an NB-IoT frame structure (subcarrier spacing: 15 kHz).

Referring to FIG. 26, the NB-IoT frame structure for 15 kHz subcarrier spacing may be set the same as the frame structure of the legacy system (i.e. LTE system) described above. That is, a 10 ms NB-IoT frame may include 10 1 ms NB-IoT subframes, and a 1 ms NB-IoT subframe may include 2 0.5 ms NB-IoT slots. In addition, each 0.5 ms NB-IoT slot may include 7 OFDM symbols.

FIG. 26 illustrate examples of an NB-IoT frame structure (subcarrier spacing: 3.75 kHz). In contrast to FIG. 26, referring to FIG. 25, a 10 ms NB-IoT frame includes 5 2 ms NB-IoT subframes, and a 2 ms NB-IoT subframe includes 7 OFDM symbols and one guard period (GP). In addition, the 2 ms NB-IoT subframe may be expressed as an NB-IoT slot or an NB-IoT resource unit (RU).

Next, the physical resources of the NB-IoT for each of the downlink and uplink will be described.

First, the physical resources of the NB-IoT downlink may be set with reference to physical resources of other wireless communication systems (e.g. an LTE system, an NR system, or the like) except that the system bandwidth is a specific number of RBs (e.g. one RB, that is, 180 kHz). As an example, as described above, when the NB-IoT downlink supports only 15 kHz subcarrier spacing, the physical resource of the NB-IoT downlink may be set to a resource region in which the resource grid of the LTE system shown in FIG. 6 described above is limited to 1 RB (i.e. 1 PRB) in the frequency domain.

Next, even in the case of the physical resource of the NB-IoT uplink, as in the case of the downlink, the system bandwidth may be limited to one RB. FIG. 27 illustrates an example of NB-IoT resource grid on an uplink. As described above, when the NB-IoT uplink supports 15 kHz and 3.75 kHz subcarrier spacing, the resource grid for the NB-IoT uplink may be expressed as shown in FIG. 27.

TABLE 14

| Subcarrier spacing | $N_{sc}^{UL}$ | $T_{slot}$ |
|---|---|---|
| $\Delta f$ = 3.75 kHz | 48 | 61440 · $T_s$ |
| $\Delta f$ = 15 kHz | 12 | 15360 · $T_s$ |

In addition, the resource unit (RU) of the NB-IoT uplink may be composed of SC-FDMA symbols in the time domain and $N_{symb}^{UL} N_{slots}^{UL}$ contiguous subcarriers in the frequency domain. For example, $N_{sc}^{RU}$ and $N_{symb}^{UL}$ may be given by Table 15 below in case of frame structure type 1 (i.e. FDD), and may be given by Table 16 in case of frame structure type 2 (i.e. TDD).

TABLE 13

| NPUSCH format | $\Delta f$ | $N_{sc}^{RU}$ | $N_{slots}^{UL}$ | $N_{symb}^{UL}$ |
|---|---|---|---|---|
| 1 | 3.75 kHz | 1 | 16 | 7 |
|   | 15 kHz | 1 | 16 |   |
|   |   | 3 | 8 |   |
|   |   | 6 | 4 |   |
|   |   | 12 | 2 |   |
| 2 | 3.75 kHz | 1 | 4 |   |
|   | 15 kHz | 1 | 4 |   |

TABLE 14

| NPUSCH format | $\Delta f$ | Supported uplink-downlink configurations | $N_{sc}^{RU}$ | $N_{slots}^{UL}$ | $N_{symb}^{UL}$ |
|---|---|---|---|---|---|
| 1 | 3.75 kHz | 1, 4 | 1 | 16 | 7 |
|   | 15 kHz | 1, 2, 3, 4, 5 | 1 | 16 |   |
|   |   |   | 3 | 8 |   |
|   |   |   | 6 | 4 |   |
|   |   |   | 12 | 2 |   |
| 2 | 3.75 kHz | 1, 4 | 1 | 4 |   |
|   | 15 Khz | 1, 2, 3, 4, 5 | 1 | 4 |   |

Physical Channel of NB-IoT

A base station and/or a terminal supporting NB-IoT may be configured to transmit and receive a physical channel and/or a physical signal separately set from the existing system. Hereinafter, detailed contents related to a physical channel and/or a physical signal supported by NB-IoT will be described.

First, the downlink of the NB-IoT system will be described. An Orthogonal Frequency Division Multiple Access (OFDMA) scheme may be applied to the NB-IoT downlink based on subcarrier spacing of 15 kHz. Through this, orthogonality between subcarriers may be provided so that co-existence with an existing system (e.g. an LTE system, an NR system) may be efficiently supported.

The physical channel of the NB-IoT system may be expressed in a form in which "N (Narrowband)" is added to be distinguished from the existing system. For example, the downlink physical channel is defined as a Narrowband Physical Broadcast Channel (NPBCH), a Narrowband Physical Downlink Control Channel (NPDCCH), /NEPDCCH (Narrowband Enhanced Physical Downlink Control Channel), a Narrowband Physical Downlink Shared Channel (NPDSCH), and the like, and the downlink physical signal is a Narrowband Primary Synchronization Signal (NPSS), a Narrowband Secondary Synchronization Signal (NSSS), a Narrowband Reference Signal (NRS), a Narrowband Positioning Reference Signal (NPRS), a Narrowband Wake Up Signal (NWUS), and the like.

In general, the downlink physical channel and physical signal of the NB-IoT described above may be set to be transmitted based on a time domain multiplexing scheme and/or a frequency domain multiplexing scheme.

In addition, characteristically, in the case of NPBCH, NPDCCH, and NPDSCH, which are downlink channels of the NB-IoT system, repetition transmission may be performed for coverage enhancement.

In addition, the NB-IoT uses a newly defined DCI format, and as an example, a DCI format for NB-IoT may be defined as DCI format N0, DCI format N1, DCI format N2, or the like.

Next, the uplink of the NB-IoT system will be described. A single carrier frequency division multiple access (SC-FDMA) scheme may be applied to the NB-IoT uplink based on subcarrier spacing of 15 kHz or 3.75 kHz. In the uplink of NB-IoT, multi-tone transmission and single-tone transmission may be supported. For example, the multi-tone transmission is supported only in subcarrier spacing of 15 kHz, and the single-tone transmission may be supported for subcarrier spacing of 15 kHz and 3.75 kHz.

As described in the downlink part, the physical channel of the NB-IoT system may be expressed in a form in which "N (Narrowband)" is added to be distinguished from the existing system. For example, the uplink physical channel may be defined as a narrowband physical random access channel (NPRACH) and a narrowband physical uplink shared channel (NPUSCH), and the uplink physical signal may be defined as a narrowband de-modulation reference signal (NDMRS).

Here, the NPUSCH may be composed of NPUSCH format 1 and NPUSCH format 2, and the like. For example, the NPUSCH format 1 may be used for UL-SCH transmission (or transport), and the NPUSCH format 2 may be used for uplink control information transmission such as HARQ ACK signaling.

In addition, characteristically, in the case of NPRACH, which is a downlink channel of the NB-IoT system, repetition transmission may be performed for coverage enhancement. In this case, the repetitive transmission may be performed by applying frequency hopping.

Multi-Carrier Operation of NB-IoT

Next, a multi-carrier operation of NB-IoT will be described. The multi-carrier operation may mean that a plurality of carriers having different uses (i.e. different types) are used when the base station and/or the terminal transmit and receive channels and/or signals to and from each other in the NB-IoT.

In general, the NB-IoT can operate in a multi-carrier mode as described above. At this time, in the NB-IoT, the carrier may be defined as an anchor type carrier (i.e. anchor carrier, anchor PRB) and a non-anchor type carrier (i.e. non-anchor carrier, a non-anchor PRB).

The anchor carrier may mean a carrier that transmits NPSS, NSSS, NPBCH, NPDSCH for system information block (N-SIB), and the like for initial access from the viewpoint of the base station. That is, in the NB-IoT, a carrier for initial access may be referred to as an anchor carrier, and other(s) may be referred to as a non-anchor carrier. In this case, only one anchor carrier may exist on the system, or a plurality of anchor carriers may exist.

Operation Mode of NB-IoT

Next, an operation mode of NB-IoT will be described. In the NB-IoT system, three operation modes may be supported. FIG. 28 illustrates an example of operation modes supported in the NB-IoT system. In the present disclosure, the operation mode of the NB-IoT is described based on the LTE band, but this is only for convenience of description, and it goes without saying that it may be extended and applied to a band of another system (e.g. NR system band).

Specifically, FIG. 28(a) illustrates an example of an in-band system, FIG. 28(b) illustrates an example of a guard-band system, and FIG. 28(c) illustrates an example of a stand-alone system. In this case, the in-band system may be expressed in an in-band mode, the guard-band system may be expressed in an guard-band mode, and the stand-alone system may be expressed in a stand-alone mode.

The in-band system may refer to a system or mode in which a specific 1 RB (i.e. PRB) in the (legacy) LTE band is used for NB-IoT. The in-band system may be operated by allocating some resource blocks of an LTE system carrier.

The guard-band system may refer to a system or mode using NB-IoT in a space reserved for the (legacy) LTE band guard-band. The guard-band system may be operated by allocating a guard-band of an LTE carrier that is not used as a resource block in the LTE system. As an example, the (legacy) LTE band may be configured to have a guard-band of at least 100 kHz at the end of each LTE band. To use 200 kHz, two non-contiguous guard-bands may be used.

As described above, the in-band system and the guard-band system may be operated in a structure in which the NB-IoT coexists in the (legacy) LTE band.

In contrast, the stand-alone system may mean a system or mode independently configured from the (legacy) LTE band. The stand-alone system may be operated by separately allocating a frequency band (e.g. a GSM carrier reallocated in the future) used in GERAN (GSM EDGE Radio Access Network).

Each of the three operation modes described above may be independently operated, or two or more operation modes may be combined and operated.

General Signal Transmission/Reception Procedure of NB-IoT

FIG. 29 is a diagram illustrating an example of physical channels that may be used for NB-IoT and a general signal transmission method using the physical channels. In a wireless communication system, the NB-IoT terminal may receive information from the base station through downlink (DL), and the NB-IoT terminal may transmit information to the base station through uplink (UL). In other words, in the wireless communication system, the base station may transmit information to the NB-IoT terminal through downlink, and the base station may receive information from the NB-IoT terminal through uplink.

The information transmitted and received by the base station and the NB-IoT terminal includes data and various control information, and various physical channels may exist according to the type/use of the information transmitted and received by the base station and the NB-IoT terminal. In addition, the method of transmitting and receiving a signal of the NB-IoT described with reference to FIG. 29 may be performed by the wireless communication device (ex: the base station and the UE of FIG. 12).

When a power supply is turned on again while the power supply is turned off, the NB-IoT terminal newly entering a cell may perform an initial cell search operation such as an operation of synchronizing the terminal and the base station (S11). To this end, the NB-IoT terminal may receive NPSS and NSSS from the base station, perform synchronization with the base station, and obtain information such as cell identity. In addition, the NB-IoT terminal may obtain intra-cell broadcast information by receiving the NPBCH from the base station. In addition, the NB-IoT terminal may check the downlink channel state by receiving a DL RS (Downlink Reference Signal) in the initial cell search step.

In other words, when there is an NB-IoT terminal that has newly entered the cell, the base station may perform the initial cell search operation such as synchronizing with the corresponding terminal. The base station may transmit NPSS and NSSS to the NB-IoT terminal to perform synchronization with the corresponding terminal and transmit information such as cell identity. In addition, the base station may transmit (or broadcast) the NPBCH to the NB-IoT terminal to transmit the broadcast information in the cell. In addition, the base station may check the downlink channel state by transmitting a DL RS to the NB-IoT terminal in the initial cell search step.

After completing the initial cell search, the NB-IoT terminal may receive the NPDCCH and the corresponding NPDSCH to obtain more detailed system information (S12). In other words, the base station may transmit more specific system information by transmitting the NPDCCH and the corresponding NPDSCH to the NB-IoT terminal that has finished the initial cell search.

Thereafter, the NB-IoT terminal may perform a random access procedure to complete access to the base station (S13 to S16).

Specifically, the NB-IoT terminal may transmit a preamble to the base station through the NPRACH (S13), and as described above, the NPRACH may be configured to be repeatedly transmitted based on frequency hopping or the like for coverage enhancement. In other words, the base station may (repeatedly) receive the preamble through the NPRACH from the NB-IoT terminal.

Thereafter, the NB-IoT terminal may receive a random access response (RAR) for the preamble from the base station through the NPDCCH and the corresponding NPDSCH (S14). In other words, the base station may transmit the random access response (RAR) for the preamble to the NB-IoT terminal through the NPDCCH and the corresponding NPDSCH.

Thereafter, the NB-IoT terminal transmits the NPUSCH to the base station using the scheduling information in the RAR (S15), and may perform a contention resolution procedure such as NPDCCH and corresponding NPDSCH (S16). In other words, the base station may receive the NPUSCH from the terminal by using the scheduling information in the NB-IoT RAR and perform the collision resolution procedure.

After performing the above-described procedure, the NB-IoT terminal may perform NPDCCH/NPDSCH reception (S17) and NPUSCH transmission (S18) as a general uplink/downlink signal transmission procedure. In other words, after performing the above-described procedures, the base station may perform NPDCCH/NPDSCH transmission and NPUSCH reception as a general signal transmission/reception procedure to the NB-IoT terminal.

In the case of the NB-IoT, as described above, the NPBCH, NPDCCH, NPDSCH, etc. may be repeatedly transmitted for coverage enhancement. In addition, in the case of the NB-IoT, instead of separate uplink control channel, the UL-SCH (i.e. general uplink data), and the uplink control information may be transmitted through the NPUSCH. In this case, the UL-SCH and the uplink control information may be set to be transmitted through different NPUSCH formats (e.g. NPUSCH format 1, NPUSCH format 2, etc.).

In addition, the control information transmitted from the terminal to the base station may be referred to as UCI (Uplink Control Information). The UCI may include hybrid automatic repeat and reQuest acknowledgement/negative-ACK (HARQ ACK/NACK), scheduling request (SR), channel state information (CSI), and the like. The CSI includes a channel quality indicator (CQI), a precoding matrix indicator (PMI), rank indication (RI), and the like. As described above, in the NB-IoT, the UCI may be generally transmitted through NPUSCH. In addition, according to a request/instruction of a network (e.g. a base station), the terminal may transmit UCI through the NPUSCH in a perdiodic, aperdiodic, or semi-persistent manner.

Initial Access Procedure of NB-IoT

In a general signal transmission/reception procedure of NB-IoT, an initial access procedure to the base station by the NB-IoT UE is briefly described. Specifically, the initial access procedure to the base station by the NB-IoT UE may be constituted by a procedure of searching an initial cell and a procedure of acquiring the system information by the NB-IoT UE.

In this regard, a specific signaling procedure between a UE and a base station (e.g., NodeB, eNodeB, eNB, gNB, etc.) related to the initial access of NB-IoT may be illustrated as in FIG. 30. Hereinafter, detailed contents of the initial access procedure of general NB-IoT, the configuration of NPSS/NSSS, acquisition of the system information (e.g., MIB, SIB, etc.), etc., will be described through description of FIG. 30.

FIG. 30 illustrates an example for the initial access procedure of the NB-IoT, and a name(s) of each physical channel and/or physical signal may be set or named differently according to the wireless communication system to which the NB-IoT is applied. As an example, basically, FIG. 30 is described, but the NB-IoT based on the LTE system is considered, but this is only for convenience of description, and contents thereof may be extensively applied even to the NB-IoT based on the NR system, of course.

The NB-IOT is based on the following signals transmitted in the downlink: primary and secondary narrowband synchronization signals NPSS and NSSS. The NPSS is transmitted through 11 subcarriers from the first subcarrier to the $11^{th}$ subcarrier in the $6^{th}$ subframe of each frame (S110) and the NSSS is transmitted through 12 subcarriers on an NB-IOT carrier in the first subframe of every even frame in the $10^{th}$ subframe for FDD of each frame and 12 subcarriers on an NB-IOT carrier in the first subframe for TDD (S120).

NB-IoT UE may receive MIB-NB (MasterInformationBlock-NB) on NPBCH (NB Physical Broadcast Channel) (S130).

The MIB-NB uses a fixed schedule in which the period is 640 ms and a repetition is within 640 ms. First transmission of the MIB-NB is scheduled in subframe #0 of a radio frame with SFN mod 64=0, and the repetition is scheduled in subframe #0 of all other radio frames. The transmissions are arranged in eight independently decodable blocks with a time duration of 80 ms.

Thereafter, the NB-IoT UE may receive a SystemInformationBlockType1-NB (SIB1-NB) through the PDSCH (S140).

The SIB1-NB uses a fixed schedule with a period of 2560 ms. SIB1-NB transmission occurs in subframe #4 of all different frames in 16 consecutive frames. A start frame for first transmission of SIB1-NB is derived by cell PCID and the number of repetitions within the period of 2560 ms, and is repeated at the same interval within the period of 2560 ms. The TBS for the SystemInformationBlockType1-NB and the repetitions made within 2560 ms are indicated by a field scheduleInfoSIB1 of the MIB-NB.

An SI message is transmitted within time domain windows (referred to as SI windows) which occur periodically by using scheduling information provided by the SystemInformationBlockType1-NB. Each SI message is associated with the SI window, and an SI window of another SI message does not overlap. That is, only a corresponding SI is transmitted within one SI window. A length of the SI window may be common to and configured in all SI messages. In the SI window, the corresponding SI message may be transmitted multiple times through 2 or 8 consecutive NB-IoT downlink subframes according to the TBS. The UE uses a transmission format of the SI message in detailed time/frequency domain scheduling information and other information, e.g., a scheduling information list field of SystemInformationBlockType1-NB. The UE need not accumulate multiple SI messages in parallel, but may need to accumulate the SI messages over multiple SI windows depending on a coverage condition.

The SystemInformationBlockType1-NB configures the length and the transmission period of the SI window for all SI messages.

Further, the NB-IoT UE may receive a SystemInformationBlockType2-NB (SIB2-NB) on the PDSCH (S150).

Meanwhile, an NRS (S160) of FIG. 30 represents a narrowband reference signal.

Random Access Procedure of NB-IoT

In the general signal transmission/reception procedure of the NB-IoT, a random access procedure to the base station by the NB-IoT UE is briefly described. Specifically, the random access procedure to the base station by the NB-IoT UE may be performed through a procedure of transmitting the preamble to the base station and receiving a response thereto.

In this regard, a specific signaling procedure between a UE and a base station (e.g., NodeB, eNodeB, eNB, gNB, etc.) related to the random access of the NB-IoT may be illustrated as in FIG. 31. Hereinafter, specific contents of a random access procedure based on messages (e.g., msg1, msg2, msg3, and msg4) used for the random access procedure of the general NB-IoT will be described through description of FIG. 31.

FIG. 31 illustrates an example for the random access procedure of the NB-IoT, and a name(s) of each physical channel, physical signal, and/or message may be set or named differently according to the wireless communication system to which the NB-IoT is applied. As an example, basically, FIG. 31 is described, but the NB-IoT based on the LTE system is considered, but this is only for convenience of description, and contents thereof may be extensively applied even to the NB-IoT based on the NR system, of course.

As illustrated in FIG. 31, in the case of the NB-IOT, the RACH procedure has the same message flow as LTE having different parameters. The NB-IoT supports only a contention-based random access and a PDCCH order when downlink data arrives. The NB-IoT reuses the eMTC PRACH resource classification according to a coverage level. A PRACH resource is provided for each application coverage level configured with the system information (SI). The NB-IoT UE selects the PRACH resource based on a coverage level determined by NB-IoT UE downlink measurement such as RSB, and transmits a random access preamble (just preamble) (message 1, msg1). In selected PRACH resource NB-IoT, the PRACH may mean narrowband physical random access channel (NPRACH). The random access procedure is performed in either an anchor carrier or a non-anchor carrier in which the PRACH resource is configured in the SI. The preamble transmission may be repeated up to {1, 2, 4, 8, 16, 32, 64, 128} times in order to enhance coverage.

When transmitting the preamble, the NB-IoT UE first calculates a Random Access Radio Network Temporary Identifier (RA-RNTI) thereof from a preamble transmission time. RA-RNTI is given by RA-RNTI=1+floor (SFN_id/4), and SFN_id represents an index (i.e., preamble) of a first radio frame of a specific PRACH. Subsequently, the NB-IoT UE monitors the PDCCH within the time window in order to find the PDCCH for DCI format N1 scrambled with the RA-RNTI, and a random access response (RAR) (message 2, msg2) is displayed. The time window (or RAR window) starts 3 subframe (SF) after a last preamble and has a CE dependent length given in the system information block type 2-narrowband (SIB2-NB).

When the preamble transmission is unsuccessful, for example, when the associated RAR message is not received, the NB-IoT UE transmits another preamble. This may be achieved up to a maximum number, and may vary depending on a CE level. When the maximum number is unsuccessful, if the CE level is configured, the NB-IoT UE proceeds to a next (i.e., higher) CE level. When the total number of access attempt times is reached, an associated failure is reported to the RRC. Jointly with the RAR, the NB-IoT UE obtains a temporary C-RNTI, a timing advance order, etc. Consequently, next msg3 is temporally aligned and this is required for transmission through the NPUSCH. Further, the RAR provides a UL grant for msg3 including all related data for msg3 transmission.

A scheduling resolution message (message 3, msg3) is transmitted for starting the contention resolution process. An associated contention resolution message (message 4, msg4) is finally transmitted to the UE in order to indicate successful completion of the RACH procedure. The contention resolution process is basically the same as that in the LTE. That is, the UE transmits identification through the msg3, and when the UE receives the contention resolution msg4 indicating the identification, the random access procedure is successfully completed.

Due to a specific uplink transmission scheme in the NB-IoT, tone information is further included in the RAR message, and an equation for deriving the Random Access Radio Network Temporary Identifier (RA-RNTI) is newly defined. In order to support transmission repetition, corresponding parameters including an RAR window size and a medium access control (MAC) contention resolution timer are extended.

Hereafter, in regard to the random access procedure of the NB-IOT, the NPRACH which the NB-IoT UE transmits to the base station will be described in detail.

A physical layer random access preamble (i.e., PRACH) is based on single subcarrier/tone transmission having frequency hopping for a single user. The PRACH uses a subcarrier spacing of 3.75 kHz (i.e., a symbol length of 266.7 us), and two cyclic prefix lengths are provided to support different cell sizes. 66.7 s (10 km) and 266.7 s (35 km). The frequency hopping is performed between random access symbols groups (just symbol group) including five Pseudo-random hopping symbols and a cyclic prefix between repetitions of respective symbol groups.

The physical layer random access preamble is based on a single subcarrier frequency hopping symbol group. FIG. 32 illustrates a structure of a random access symbol group.

As illustrated in FIG. 32, a random access symbol group is constituted by a cyclic prefix having a length (TCP) and a sequence of N identical symbols having a total length (TSEQ). The total number of symbol groups in units of preamble repetition is represented by P. The number of time-continuous symbol groups is given as G.

Parameter values of frame structures 1 and 2 are listed in Tables 17 and 18, respectively.

TABLE 17

| Preamble format | G | P | N | $T_{CP}$ | $T_{SEQ}$ |
|---|---|---|---|---|---|
| 0 | 4 | 4 | 5 | $2048T_s$ | $5 \cdot 8127T_s$ |
| 1 | 4 | 4 | 5 | $8192T_s$ | $5 \cdot 8192T_s$ |
| 2 | 6 | 6 | 3 | $24576T_s$ | $3 \cdot 24576T_s$ |

TABLE 18

| Preamble format | Supported uplink-downlink configurations | G | P | N | $T_{CP}$ | $T_{SEQ}$ |
|---|---|---|---|---|---|---|
| 0 | 1, 2, 3, 4, 5 | 2 | 4 | 1 | $4778T_s$ | $1 \cdot 8192T_s$ |
| 1 | 1, 4 | 2 | 4 | 2 | $8192T_s$ | $2 \cdot 8192T_s$ |
| 2 | 3 | 2 | 4 | 4 | $8192T_s$ | $4 \cdot 8192T_s$ |
| 0-a | 1, 2, 3, 4, 5 | 3 | 6 | 1 | $1536T_s$ | $1 \cdot 8192T_s$ |
| 1-a | 1, 4 | 3 | 6 | 2 | $3072T_s$ | $2 \cdot 8192T_s$ |

When transmission of the random access preamble is triggered by the MAC layer, the transmission of the random access preamble is limited to specific time and frequency resources. Up to 3 NPRACH resource configurations may be configured by using respective NPRACH resource configurations corresponding to different application range levels in the cell. The NPRACH resource configuration is given by periodicity, the repetition number, a starting time, a frequency location, and the number of subcarriers. For example, an NPRACH configuration provided by a higher layer (e.g., RRC) may include the following.

NPRACH periodicity (nprach-Periodicity): $N_{period}^{NPRACH}$

Frequency location of first subcarrier allocated to NPRACH (nprach-SubcarrierOffset): $N_{scoffset}^{NPRACH}$ The number of subcarriers allocated NPRACH (nprach-NumSubcarriers): $N_{sc}^{NPRACH}$ The number of start subframes allocated to UE in which random access is initiated (nprach-NumCBRA-Start-Subcarriers): $N_{sc\_cont}^{NPRACH}$ The number of NPRACH repetitions for attempt (num-RepetitionsPerPreambleAttempt): $N_{rep}^{NPRACH}$ NPRACH start time (nprach-StartTime): $N_{start}^{NPRACH}$ Fraction for calculating start subcarrier index for a range of NPRACH subcarrier reserved for indicating UE supporting for multi-tone msg3 transmission (nprach-SubcarrierMSG3-RangeStart): $N_{MSG3}^{NPRACH}$ After starting a radio frame satisfying $n_f$ mod $(N_{period}^{NPRACH}/10)=0$, the NPRACH transmission may start only in a time unit of $N_{start}^{NPRACH} \cdot 30720T_s$. For frame structure type 1, after transmission of a $4 \cdot 64(T_{CP}+T_{SEQ})$ time unit for preamble formats 0 and 1 or transmission of a $16 \cdot 6(T_{CP}+T_{SEQ})$ time unit for preamble format 2, a gap of a $40 \cdot 30720T_s$ time unit may be inserted. An NPRACH configuration with $N_{scoffset}^{NPRACH}+N_{sc}^{NPRACH}>N_{sc}^{UL}$ is invalid.

An NPRACH start subcarrier allocated to the UE in which the random access is initiated is divided into two sets of the subcarriers. That is, the NPRACH start subcarrier is divided into $\{0, 1, \ldots, \lfloor N_{sc\_cont}^{NPRACH} N_{MSG3}^{NPRACH} \rfloor -1\}$ and $\{\lfloor N_{sc\_cont}^{NPRACH} N_{MSG3}^{NPRACH} \rfloor, \ldots, N_{sc\_cont}^{NPRACH}-1\}$, and here, if exists, a second set represents UE support for multi-tone msg3 transmission.

The frequency location of the NPRACH transmission is limited within $N_{sc}^{RA}+12$ subcarriers, and when preamble format 2 is configured, the frequency location of the NPRACH transmission is limited within $N_{sc}^{RA}=36$ subcarriers. The frequency hopping is used within 12 subcarriers, and when preamble format 2 is configured, the frequency hopping is used within 36 subcarriers. Here, a frequency location of an i-th symbol group is given as in $n_{start}=N_{scoffset}^{NPRACH}+\lfloor n_{init}/N_{sc}^{RA} \rfloor \cdot N_{sc}^{RA}$. Here, $n_{start}+N_{scoffset}^{NPRACH}+\lfloor n_{init}/N_{sc}^{RA} \rfloor \cdot N_{sc}^{RA}$ is satisfied. $\tilde{n}_{sc}^{RA}(i)$ depends on the frame structure.

In each NPRACH generation, {12, 24, 36, 48} subcarriers may be supported. Further, the random access preamble transmission (i.e., PRACH) may be repeated up to {1, 2, 4, 8, 16, 32, 64, 128} times to enhance coverage.

Discontinuous Reception (DRX) Procedure of NB-IoT

While performing the general signal transmission/reception procedure of the NB-IoT, the NB-IoT UE may be switched from an idle state (e.g., RRC_IDLE state) and/or an inactive state (e.g., RRC_INACTIVE state) in order to reduce power consumption. In this case, the NB-IoT UE which is switched to a valid state and/or the inactive state may be configured by using the DRX scheme. As an example, the NB-IoT UE which is switched to the idle state and/or the inactive state may be configured to perform monitoring of the NPDCCH related to paging only in a specific subframe (or a frame or a slot) according to a DRX cycle configured by the BS. Here, the NPDCCH related to the paging may mean NPDCCH scrambled to paging access-RNTI (P-RNTI).

FIG. 33 illustrates an example of a DRX scheme in an idle state and/or an inactive state.

As illustrated in FIG. 33, in F9, the NB-IoT UE in the RRC_IDLE state monitors only a partial subframe (SF) in relation to paging (i.e., paging occasion (PO)) within a subset (i.e., paging frame (PF)) of the radio frame. The paging is used to trigger RRC connection and change system information for the UE in the RRC_IDLE mode.

Further, a DRX configuration and a DRX indication for the NB-IoT UE may be performed as illustrated in FIG. 34. FIG. 34 illustrates an example of a DRX configuration and indication procedure for an NB-IoT UE. Further, FIG. 34 is just for convenience of the description and does not limit the method proposed in the present disclosure.

Referring to FIG. 34, the NB-IoT UE may receive, from a base station (e.g., NodeB, eNodeB, eNB, gNB, etc.), DRX configuration information (S310). In this case, the UE may receive, from the BS, such information through higher layer signaling (e.g., RRC signaling). Here, the DRX configuration information may include DRX cycle information, a DRX offset, configuration information for timers related to DRX, etc.

Thereafter, the NB-IoT UE may receive, from the BS, a DRX command (S320). In this case, the UE may receive, from the BS, the DRX command through higher layer signaling (e.g., MAC-CE signaling).

The NB-IoT UE that receives the DRX command may monitor the NPDCCH in a specific time unit (e.g., the subframe or the slot) according to the DRX cycle (S330). Here, monitoring the NPDCCH may mean that the corresponding CRC is scrambled with a predetermined specific RNTI value after decoding the NPDCCH of a specific area according to the DCI format to be received through the search space to check whether the corresponding value matches (i.e., coincides with) a desired value.

When the corresponding NB-IoT UE receives information indicating a change of a paging ID and/or system information in the NPDCCH through the procedure illustrated in FIG. 34, the corresponding NB-IoT UE may be configured to initialize (or reconfigure) a connection (e.g., RRC connection) with the BS (e.g., a cell search procedure of FIG. 29) or receive (or acquire) new system information from the BS (e.g., a system acquisition procedure of FIG. 29, etc.).

When the NB-IoT UE detects the MPDCCH with Paging Access Radio Network Temporary Identifier (P-RNTI) in the PO, the MTC UE decodes a corresponding PDSCH. A paging message may be transmitted through the PDSCH, and may include information including a list of NB-IoT UEs to be paged, and whether the paging is for a connection configuration or whether the system information is changed.

Each NB-IoT UE which searches an ID thereof in this list may deliver the ID to a higher layer to which the ID is paged and receive a command to initialize the RRC connection in sequence. When the system information is changed, the NB-IoT UE may start reading SIB1-BR and acquire information used for reading the SIB from there again.

When coverage enhancement repetition is applied, the PO refers to first transmission in repetition. The PF and the PO are determined from the DRX periodicity provided from the SIB2-BR and the IMSI provided from the USIM card. DRX is discontinuous reception of a DL control channel used for saving a battery life. 128, 256, 512 and 1024 radio frame periodicities corresponding to time intervals between 1.28 seconds and 10.24 seconds are supported. Since an algorithm for determining the PF and the PO also depends on the IMSI, different UEs have different paging occasions, which are temporally evenly distributed. It is enough for the NB-IoT UE to monitor one paging occasion within the DRX cycle and when there are various multiple paging occasions therein, the paging is repeated in each of the various paging occasions.

The concept of Extended DRX (eDRX) may be applied even to the NB-IoT. This is performed by using a hyper frame. When the eDRX is supported, a time period in which the NB-IoT UE does not monitor the paging message may be significantly extended up to a maximum of 3 hours. In response thereto, the NB-IoT UE should know which HFN and which time interval within the HFN a paging time window (PTW), and monitor the paging. The PTW is defined as start and stop of SFN. Within the PTW, the PF and the PO are determined in the same scheme as non-extended DRX.

FIG. 35 illustrates a DRX cycle.

As illustrated in FIG. 35, in FIG. 35, the DRX cycle designates periodic repetition of 'On Duration' according to a possible period of inactivity.

The MAC entity may be configured by RRC having a DRX function controlling a PDCCH monitoring activity of the UE for RNTI (e.g., C-RNTI) of the MAC entity. Accordingly, the NB-IoT UE may monitor the PDCCH during a short period (e.g., 'On Duration'), and stop PDCCH monitoring for a long period (e.g., an occasion for the DRX).

If the DRX is configured when the MAC entity is in RRC_CONNECTED (i.e., connection mode DRX, CDRX), the MAC entity may discontinuously monitor the PDCCH by using a DRX operation designated below. Otherwise, the MAC entity may continuously monitor the PDCCH. In the case of the NB-IoT, the PDCCH may refer to the MPDCCH. In the case of the NB-IoT, an extended DRX cycle of 10.24(s) is supported in the RRC connection.

The RRC controls the DRX operation by configuring DurationTimer, drx-InactivityTimer, drx-RetransmissionTimerShortTTI (one per DL HARQ process in the case of an HARQ process reserved by using short TTI), drx-ULRetransmissionTimer (one per asynchronous UL HARQ process in the case of the HARQ process reserved by using 1 ms TTI), drx-ULRetransmissionTimerShortTTI (in the case of TTI), drx-ULRetransmissionTimerShortTTI (in the case of the HARQ process reserved by using short TTI), longDRX-Cycle, drxStartOffset value, and selectively drxShortCycleTimer and shortDRX-Cycle values. An HARQ RTT timer (except for a broadcast process) for the DL HARQ process and a UL HARQ RTT timer for the asynchronous UL HARQ process are defined.

Paging in Extended DRX

The UE may be configured by higher layers having an extended DRX (eDRX) cycle $T_{eDRX}$. Except for NB-IOT, the UE may operate in the extended DRX only when the UE is configured by the higher layer and the cell represents supporting for the eDRX in the system information.

In the case of the NB-IOT, the UE may operate in the extended DRX only when the UE is configured by the higher layers.

When the UE is configured by $T_{eDRX}$ cycle of 512 radio frames, the UE monitors the PO as defined in the paging in the DRX by using parameter T=512. Otherwise, the UE which is configured by the eDRX monitors the PO defined in the paging in the DRX during a periodic paging time window (PTW) configured for the UE or until receiving a paging message an NAS identifier of the UE for the UE during the PTW.

In this case, the UE may stop monitoring the PO when receiving the paging message including the NAS identifier even before the PTW lapsed.

The PTW may be UE specific, and may be determined by a Paging Hyperframe (PH), and a start position (PTW_start) and an end position (PTW end) in the PH.

The PH, the PTW_start, and the PTW_end may be given by the following equation.

The PH is an H-SFN satisfying the following equation.

$$H\text{-SFN} \bmod \text{TeDRX},H = (\text{UE\_ID\_}H \bmod \text{TeDRX},H) \quad \text{[Equation 16]}$$

In the equation, each parameter is as follows.

UE_ID_H:

When P-RNTI is monitored on the PDCCH or the MPDCCH, 10 most significant bits of hashed ID.

When the P-RNTI is monitored on the NPDCCH, 12 most significant bits of the hashed ID.

$T_{eDRX,H}$: eDRX cycle of the UE in the hyperframe ($T_{eDRX,H}$=1, 2, . . . , 256 Hyper-frames) (for the NB-IOT, $T_{eDRX,H}$=2, . . . , 1024 Hyper-frames), configured by the higher layer.

The PTW_start represents a first radio frame of PH which is a part of the PTW, and has an SFN satisfying the following equation.

$$\text{SFN}=256*\text{ieDRX, where}$$

$$\text{ieDRX}=\text{floor}(\text{UE\_ID\_}H/\text{TeDRX},H) \bmod 4 \quad \text{[Equation 17]}$$

The PTW_end is a last radio frame of the PTW, and the SFN satisfies the following equation.

$$\text{SFN}=(\text{PTW\_start}+L*100-1) \bmod 1024 \quad \text{[Equation 18]}$$

In the equation, L represents a length (seconds) of the PTW configured by the higher layer.

Hashed_ID represents a frame check sequence (FCS) for bits b31, b30, b0 of S-TMSI, and the S-TMSI has a value of <b39, b38, . . . , b0>.

32-bit FCS should be a complement of 1 of a sum (modulo 2) of Y1 and Y2 below.

Y1: Y1 is a remainder of (modulo 2) xk(x31+x30+x29+x28+x27+x26+x25+x24+x23+x22+x21+x20+x19+x18+x17+x16+x15+x14+x13+x12+x11+x10+x9+x8+x7+x6+x5+x4+x3+x2+x1+1) divided by generator polynomial x32+x26+x23+x22+x16+x12+x11+x10+x8+x7+x5+x4+x2+x+1.

Y2: Y2 is a remainder of (modulo 2) Y3 divided by generator polynomial x32+x26+x23+x22+x16+x12+x11+x10+x8+x7+x5+x4+x2+x+1. Here, Y3 is generator polynomial x32 (b31\*x31+b30\*x30+者+b0\*1).

Paging with Wake Up Signal

When the UE supports Wake Up Signal (WUS) and a WUS configuration is provided in the system information, the UE should monitor the WUS by using WUS parameters provided in the system information.

When discontinuous reception (DRX) is used and the UE detects the WUS, the UE should monitor a subsequent paging occasion (PO).

When extended DRX is used and the UE detects the WUS, the UE should perform earlier monitoring of monitoring numPOs following subsequent POs or performing monitoring until the paging message including the NAS identifier of the UE is received.

If the UE does not detect the WUS, the UE need not monitor the subsequent PO.

numPOs: The number of consecutive Pos mapped to one WUS provided in the system information (numPOs>0).

The WUS configuration provided in the system information includes a time offset between an end of the WUS and a start of a first PO of numPOs POs. A time offset in a subframe used for calculating a start of subframe g0 is defined as follows.

In the case of a UE using the DRX, the time offset is signaled timeoffsetDRX.

In the case of a UE using the eDRX, if timeoffset-eDRX-Long is not broadcasted, the time offset is signaled timeoffset-eDRX-Short.

In the case of the UE using the eDRX, if timeoffset-eDRX-Long is broadcasted, the time offset is a value determined according to a table below.

TABLE 19

| | | timeoffset-eDRX-Long | |
|---|---|---|---|
| | | 1000 ms | 2000 ms |
| UE Reported wakeupSignalMinGap-eDRX | 40 ms | timeoffset-eDRX-Short | timeoffset-eDRX-Short |
| | 240 ms | timeoffset-eDRX-Short | timeoffset-eDRX-Short |
| | 1000 ms | timeoffset-eDRX-Long | timeoffset-eDRX-Long |
| | 2000 ms | timeoffset-eDRX-Short | timeoffset-eDRX-Long |

The time offset is used for determine actual subframe g0 as in the equation below.

g0=PO−timeoffset [Equation 19]

In the UE using the eDRX, the same time offset for generation of all WUSs for the PTW is applied between the end of the WUS and a first associated PO of numPOs POs.

In the above equation, the time offset g0 may be used for calculating the start of the WUS.

Narrowband Wake-Up Signal (NWUS)

The NB-IOT UE using the NWUS may assume an actual duration of the NWUS starting at subframe w0 as one of sets listed in the following table corresponding to a maximum duration $L_{NWUS_{max}}$ of the NWUS configured by the higher layer.

TABLE 20

| $L_{NWUS\_max}$ | Actual NWUS durations set |
|---|---|
| 1 | {1} |
| 2 | {1, 2} |
| 4 | {1, 2, 4} |
| 8 | {1, 2, 4, 8} |
| 16 | {1, 2, 4, 8, 16} |
| 32 | {1, 2, 4, 8, 16, 32} |
| 64 | {1, 2, 4, 8, 16, 32, 64} |
| 128 | {1, 2, 4, 8, 16, 32, 64, 128} |
| 256 | {1, 2, 4, 8, 16, 32, 64, 128, 256} |
| 512 | {1, 2, 4, 8, 16, 32, 64, 128, 256, 512} |
| 1024 | {1, 2, 4, 8, 16, 32, 64, 128, 256, 512, 1024} |

The maximum duration of the MWUS starts in subframe w0 and ends in subframe (g0−1). Here, w0 means a most latest subframe of subframe #4 transporting SystemInformationBlockType1-NB during $L_{NWUS_{max}}$ NB-IoT DL subframes and the maximum duration.

The UE may assume that the NWUS and NB-IoT paging occasion subframes associated therewith exist on the same NB-IOT carrier.

Sequence Generation

An NWUS sequence w(m) may be defined as in the following equation.

$$w(m) = \theta_{n_f,n_s}(m') \cdot e^{-\frac{j\pi un(n+1)}{131}} \quad \text{[Equation 20]}$$

$$m = 0, 1, \ldots, 131$$

$$m' = m + 132x$$

$$n = m \bmod 132$$

$$\theta_{n_f,n_s}(m') =
\begin{cases}
1, & \text{if } c_{n_f,n_s}(2m') = 0 \text{ and } c_{n_f,n_s}(2m'+1) = 0 \\
-1, & \text{if } c_{n_f,n_s}(2m') = 0 \text{ and } c_{n_f,n_s}(2m'+1) = 1 \\
j, & \text{if } c_{n_f,n_s}(2m') = 1 \text{ and } c_{n_f,n_s}(2m'+1) = 0 \\
-j, & \text{if } c_{n_f,n_s}(2m') = 1 \text{ and } c_{n_f,n_s}(2m'+1) = 1
\end{cases}$$

$$u = (N_{ID}^{cell} \bmod 126) + 3$$

Here, M represents the actual duration of the NWUS.

A scrambling sequence $c_{n_f,n_s}(i)$, i=0, 1, . . . , 2·132M−1 is given by the Pseudo-random sequence, and initialized as in the following equation at the start of the NWUS.

$$c_{init\_WUS} = \quad \text{[Equation 21]}$$
$$(N_{ID}^{Ncell}+1)\left(\left(10 n_{f\_start\_PO} + \left\lfloor \frac{n_{s\_start\_PO}}{2} \right\rfloor\right) \bmod 2048 + 1\right)$$
$$2^9 + N_{ID}^{Ncell}$$

In the equation, $n_{f\_start\_PO}$ represents a first frame of a first PO associated with the NWUS and $n_{s\_start\_PO}$ represents a first slot of the first PO associated with the NWUS.

Mapping to Resource Elements

The same antenna port should be used for all symbols of the NWUS in the subframe. The NWUS may not be transmitted on the same antenna port as one of a downlink reference signal or a synchronization signal, and the UE should not assume that the NWUS is transmitted through the same antenna port as one of the downlink reference signal or the synchronization signal.

If only one NRS port is configured by the eNB, the UE may assume that transmission of all NWUS subframes is performed by using the same antenna port.

Otherwise, the UE may assume that the same antenna port is used for transmission of the NWUS in downlink subframes w0+2n and w0+2n+1. Here, w0 may represent the first downlink subframe of the NWUS as described above, and n may have values of 0 and 1.

The NWUS sequence is mapped to a subframe set of the actual NWUS duration in subframe #4 in which SystemInformationBlockType1-NB is transmitted or a subframe in which the SI message is transmitted, and the subframe is counted in NWUS mapping, but is not used for transmission of the NWUS.

On an NB-IoT carrier in which the UE receives a higher layer parameter operationModeInfo indicating inband-SamePCI, inband-DifferentPCI, guardband, or standalone or an NB-IOT carrier in which DL-CarrierConfigCommon-NB exists, an NWUS sequence w(m) is mapped to a resource element (k,l) in order starting at w(0) in an order of an index k=0, 1, . . . , $N_{sc}^{RB}-1$ for 12 allocated subcarriers, and a subsequent index l=3, 4, . . . , $2N_{symb}^{DL}-1$ is transmitted in each subframe in which the NWUS is transmitted.

Additionally, on an NB-IoT carrier in which the UE receives a higher layer parameter guardband or standalone indicating guardband or standalone or an NB-IoT carrier in which DL-CarrierConfigCommon-NB exists and inband-CarrierInfo does not exist, resource mapping for first three OFDM symbols is performed as follows.

A resource element (k, 7) is mapped to a resource element (k, 0) of all indices throughout 12 allocated subcarriers.

Symbols, abbreviations, and terms used in the present disclosure are defined as below.

IoT mode: means a communication scheme or a communication operation mode that supports different levels of combinations for a coupling loss compensation level, a UE complexity (an operation bandwidth of the UE, etc.), a battery consumption level, etc. The IoT mode may be expressed as an operation mode of the UE.

As an example, in the 3GPP LTE system, a general non-BL operation, a non-BL CE mode operation (CE mode A/B), an eMTC operation, an NB-IoT operation, and the like may be different as different IoT modes. Hereinafter, in the present disclosure, a case where the UE operates in a specific IoT mode means that physical channels corresponding to an (N/M)PDCCH/PDSCH/PUSCH/PUCCH/PRACH structure specialized to the specific IoT mode and the number of repetitions (CE level) of the corresponding channel are transmitted and received in a bandwidth supported in the specific IoT mode. The case where 'the UE operates in the specific IoT mode' may also be expressed as a case where 'the UE operates in a specific operation mode'.

non-BL mode: means a mode in which a UE in a general category operates in the LTE system. For example, the UE in the general category may mean a UE that supports category 0 or category 1 or more, and a bandwidth of 20 MHz.

non-BL CE mode: means a mode in which a UE without a bandwidth limitation (e.g., a UE that supports the bandwidth of 20 MHz) operates to receive the MPDCCH and support large repetition/CE as in CE mode A/B of the eMTC in order to compensate larger coupling loss in the LTE system. In particular, CE mode B supports larger repetition/CE than CE mode A.

eMTC mode: means an operation mode of a UE which follows an eMTC standard of the LTE system.

NB-IoT mode: means an operation mode of a UE which follows an NB-IoT standard of the LTE system.

Hereinafter, for convenience of description, the 'base station' may be used as a concept including all of eNB, gNB, etc.

In recent years, a demand for various wireless communication services has increased as compared with the existing human to human communication. As a result, various communication schemes for efficiently supporting communication such as machine to human, machine to machine, etc., widely referred to as Internet of Things (IoT) are being developed. As a representative example, a cellular wireless communication scheme, there is a 3GPP LTE system, and the LTE system includes eMTC which has low complexity and low power, and compensates large coupling loss in addition to a basic communication scheme (a scheme supporting communication in a bandwidth of up to 20 MHz through UE category of category 0 or category 1 or more in the related art). Further, the LTE system supports NB-IoT which has even simpler complexity (lower complexity) and lower power, and compensates larger coupling loss than the eMTC mode and a mode which the UE in the existing category operates in CE mode A/B of the eMTC for compensating large coupling loss.

Hereinafter, for convenience of description, the non-BL mode, the eMTC mode, the NB-IoT mode, the non-BL CE mode, etc., will be referred to as different IoT modes (or operation modes).

In the present disclosure, for convenience, the IoT mode is described based on the LTE system, but when one UE supports an operation scheme supporting different levels of power consumption (e.g., wake-up/sleeping cycle), different levels of UE complexities (e.g., supported bandwidth), and different levels of coupling loss compensations (e.g., the number of transmission repetitions) even in 3GPP NR or 3GPP other systems other than the LTE system, respective operation schemes may be expressed as the IoT mode (or operation mode).

It may be appropriate to apply different data transmission rates, coupling losses, and power consumptions to one device according to a communication situation or a service of the device. Therefore, when one device supports a plurality of IoT modes, it may be efficient that the device switches the operation mode to an appropriate IoT mode of different IoT modes.

For example, when a vehicle is in a parking standby state in an underground parking lot, the vehicle may perform only least communication with the base station in an NB-IoT mode in which low power and large coupling loss compensation are possible. On the contrary, when a driver boards the vehicle, it may be efficient to perform mass data communication for smoothly receiving a user data service in the non-BL mode. In such a case, when the vehicle is regarded as one UE, there may be a scenario in which the UE switches between two modes while supporting both the NB-IoT mode and the non-BL mode.

In this case, hardware supporting the two modes may be implemented through one integrated chip or two chips mounted on one device. Alternatively, the hardware supporting the two modes may be a form in which respectively physically separated devices are mounted on different locations in the vehicle, and a communication path for switching the IoT mode is between two devices.

In a current LTE system, in the case of a UE that supports a plurality of different IoT modes, for switching from a current IoT mode to the other one IoT mode, the UE should release a connection with a cell and connect to a new cell, or the UE should perform a procedure corresponding to handover. This makes the UE bear significantly large delay and data loss. For seamless communication of the user, it may be required to minimize the delay and the data loss. In particular, in the IoT mode or the eMTC mode for the UE to compensate large coupling loss, a delay required for initially accessing the base station may require even to several tens of sec from several hundreds of msec. Therefore, when it is considered that a long time is required for the UE in the IoT mode or the eMTC mode to perform an initial access to the base station, it may be very important to reduce a delay required for a UE supporting a plurality of IoT modes according to various service changes to switch the IoT mode.

The present disclosure proposes a scheme in which the UE supporting the plurality of IoT modes switches a data transmission/reception operation to different IoT modes while maintaining a state of accessing the base station (RRC_CONNECTED).

In particular, when the method proposed in the present disclosure is applied to a 3GPP LTE UE, the method may be applied to a UE operation in each mode or switching between the eMTC mode and the non-BL CE mode (A or B) or the BL CE mode which is not relatively large in difference of implementation.

Hereinafter, the physical downlink control channel (PDCCH) may mean MPDCCH in an eMTC mode and a BL CE mode. Further, a physical random access channel (PRACH), the PDCCH, a physical downlink shared channel (PDSCH), a physical uplink shared channel (PUSCH), and a physical downlink control channel (PUCCH) may mean a narrowband PRACH (NPRACH), a narrowband PDCCH (NPDCCH), a narrowband PDSCH (NPDSCH), a narrowband PUSCH (NPUSCH), and a narrowband PUCCH (NPUCCH), respectively in the NB-IoT mode.

Hereinafter, the method in which the UE supporting one or more IoT modes switches the IoT mode will be described in detail. A method (method 1) for switching the IoT mode according to the request of the UE and a method (method 2) for switching the IoT mode according to the indication of the base station will be described in order.

Method for Switching IoT Mode According to Request of UE—Method (1)

The present method relates to a method for switching the IoT mode of the UE according to the request of the UE. Hereinafter, the IoT mode may also be expressed as an IoT operation mode.

When the vehicle with the UE is in a state in which large-capacity communication with the base station is not required, such as the parking state, the UE may be required to switch to the IoT mode of a scheme capable of compensating larger coupling loss (i) in order to reduce power consumption of the UE or (ii) against a case where a surrounding environment is to be changed to an environment in which coupling loss is large, such as the underground parking lot in a standby mode.

As an example, the UE which is under maintaining the access to the base station and communicates in the non-BL mode may switch an operation state to the non-BL CE mode or the eMTC mode in order to reduce the power consumption. As another example, the UE which is RRC-connected to and communicates with the base station in the eMTC mode or the non-BL CE mode may switch the operation state to the non-BL mode for transmission/reception of data having a larger capacity.

As such, (i) when the UE senses a change a received signal sensitivity of a specific level or higher from a serving cell being accessed thereby, and as a result, a coverage enhancement level of change is required or (ii) when a required data transmission/reception capability is changed or a required battery consumption degree is changed, the UE may request the switch of the IoT mode to the base station through a specific physical channel according to a need. Here, the specific physical channel in which the UE requests switching of the IoT mode may be channels including PRACH, PUCCH, PUSCH, etc.

The base station may transmit, to the UE, a response to the IoT mode switching request of the UE. In this case, the response of the base station may be accepting or rejecting the request of the UE. A response channel through which the base station transmits the response may become a channel such as PDCCH, PDSCH, etc. In particular, when the UE makes the IoT mode switching request through a random access channel (PRACH), the base station may transmit the corresponding response through the PDCCH/PDSCH through which a random access response (RAR) which is a response to a random access.

When the UE receives the acceptance of the IoT mode switching from the base station, the UE may continue data transmission/reception by a target IoT mode requested by the UE. That is, the UE may perform data transmission/reception by applying data transmission/reception parameters (PDCCH search space, the number of repetitions of PDCCH/PDSCH/PUSCH, and a resource allocation bandwidth) corresponding to the target IoT mode.

Hereinafter, for convenience of description, when the UE switches the IoT mode, an IoT mode before switching the IoT mode will be referred to as a source IoT mode. That is, the source IoT mode may mean a current operation mode of the UE. Further, the IoT mode which the UE intends to switch will be referred to as a target IoT mode. That is, the UE may operate in the target IoT mode after switching the operation mode.

A method (proposal 1-1) in which the UE uses a channel corresponding to a source IoT mode in order to request the switching of the IoT mode and a method (proposal 1-2) in which the UE uses a channel corresponding to a target IoT mode in order to request the switching of the IoT mode will be described below.

(Proposal 1-1) Mode Switching Request Through Channel Corresponding to Source IoT Mode The present proposal relates to a method in which the UE requests the mode switching to the base station through the channel corresponding to the source IoT mode. The channel corresponding to the source IoT mode may mean a physical channel (PRACH, PUCCH, PUSCH, etc.) to which a data transmission/reception parameter corresponding to the source IoT mode is applied. The data transmission/reception parameter corresponding to the source IoT mode may mean a parameter used for transmitting/receiving data in the source IoT mode. In particular, the present proposal may be effective if coupling loss supported by the source IoT mode is larger than that in the target IoT mode. That is, if the coupling loss supported by the source IoT mode is larger than that in the target IoT mode, when the UE transmits the IoT mode switching request to the base station through the physical channel of the source IoT mode, the base station may stably receive the IoT mode switching request. Further, when the UE switches the IoT mode, it may be safer that the UE performs a confirmation procedure with the base station in the source IoT mode than a case where the UE immediately applies the target IoT mode in a state in which the confirmation (or authentication) procedure between the base station and the UE is not made, and as a result, the present method may be effective.

The UE requests switching from the source IoT mode to the target IoT mode through transmission of the physical channel corresponding to the source IoT mode. Here, the switching of the IoT mode may be performed through an RRC reconfiguration procedure which goes through a handshaking procedure of the request of the UE through the PUSCH and the accept/reject of the base station through the PDSCH. Alternatively, the switching of the IoT mode may be performed through an MAC layer procedure through transmission of the request of the UE through the PUSCH and implicit/explicit ACK/NACK of the base station for the corresponding request or performed through an MAC layer or physical layer request procedure through PUCCH transmission of the UE. Further, the switching of the IoT mode may be performed through a random access procedure following the request through the PRACH transmission of the UE and subsequent RAR transmission of the base station.

Additionally, before the UE transmits the IoT mode switching request to the base station, the UE may determine whether to transmit the IoT mode switching request based on a specific criterion. More specifically, the UE may determine whether to transmit th IoT mode switching request based on at least one of reference signal received power (RSRP), reference signal received quality (RSRQ), or signal-to-interference-plus-noise ratio (SINR) received from the base station. As an example of the criterion for determining whether to transmit the IoT mode switching request, the RSRP, the RSRQ, the SINR, the SNR, etc., may be equally applied even in a method or proposal to be described below. For example, when the UE operates in an operation mode supporting large coverage and the UE senses that measured RSRP and RSRQ values increase to specific thresholds or more, the UE may determine that the switching of the IoT mode is required. Thereafter, the UE may transmit the IoT mode switching request to the base station based on a determination result.

Further, the UE may determine a specific IoT mode determined to be most appropriate among the IoT modes supported by the UE based on a specific criterion. The specific criterion may be to determine a threshold for the RSRP, a pathloss estimation value, etc., and select a specific IoT mode when the RSRP, the pathloss estimation value, etc., are equal to or more/less than a predetermined threshold. The base station may provide, to the UE, the threshold or a parameter for determining the threshold. In this case, the IoT mode switching request transmitted by the UE may include information for requesting operation mode switching to the specific IoT mode.

As an example, the UE may determine the specific IoT mode determined to be most appropriate among the IoT modes supported by the UE based on whether the measured RSRP value is a specific threshold or more or less. In this case, the IoT mode switching request transmitted by the UE may include information for requesting operation mode switching to the specific IoT mode. The operation in which the UE determines the specific IoT mode based on the specific criterion may be equally or similarly applied even to embodiments described below.

The base station may preconfigure, to the UE, a PUCCH or PRACH resource (time/frequency/code resource) separately configured for the IoT mode switching request in order to support the IoT mode switching request using the PUCCH or PRACH of the UE. The UE may request the IoT mode switching to the base station through the preconfigured PUCCH or PRACH resource.

If the UE requests the IoT mode switching through the physical channel corresponding to the source IoT mode, when the UE receives an IoT mode switching accept signal from the base station, the UE may perform data transmission/reception to/from the base station by applying parameters corresponding to the target IoT mode after a specific time. The data transmission/reception parameter corresponding to the target IoT mode may mean a parameter used for transmitting/receiving data in the target IoT mode.

In a process in which the UE requests the IoT mode switching to the base station and the base station responds to the request, the base station may perform a selection process for determining the target IoT mode suitable for the UE. As an example, when the UE requests the IoT mode switching through the PUCCH/PUSCH/PRACH, the base station may determine the IoT mode suitable for the UE based on a received strength of the PUCCH/PUSCH/PRACH received from the UE. Further, since the base station should operate multiple UEs accessing itself, the base station may select the IoT mode configured to the UE by considering a spare state of a time/frequency resource which may be distributed to the UEs, emergency of a service to be provide to each UE, etc.

Thereafter, the base station may indicate to switch to the specific IoT mode in response to the request of the UE based on the determination result. Here, even though the IoT mode indicated by the base station is different from the target IoT mode requested by the UE, the UE may switch the operation mode to the IoT mode indicated by the base station. Further, the UE does not request the switch to the specific target IoT mode, but the UE may request the switching to a random IoT mode supporting a larger (or smaller) CE level to the base station. Thereafter, the UE may determine the target IoT mode according to the response of the base station.

FIG. 36 is a flowchart showing an example of a method for switching IoT operation modes in a connected state in a wireless communication system proposed in the present disclosure.

More specifically, FIG. 36 illustrates an example of a method in which the UE requests the IoT mode switching to the base station through the channel corresponding to the source IoT mode.

The UE transmits, to the base station, the IoT mode switching request through the physical channel corresponding to the source IoT mode in the source IoT mode (S3610). The IoT mode switching request may include indication information for the target IoT mode requested by the UE.

Next, the UE receives, from the base station, an IoT mode switching response which is a response to the IoT mode switching request (S3720). Here, the IoT mode switching response may indicate accept of the IoT mode switching or reject of the IoT mode switching.

Based on the IoT mode switching response, the UE switches the IoT mode from the source IoT mode to the target IoT mode after a specific time (S3630).

More specifically, when the IoT mode switching response accepts the UE to switch the IoT mode, the UE may switch the IoT mode from the source IoT mode to the target IoT mode after the specific time. Thereafter, the UE may perform data transmission/reception to/from the base station by applying parameters corresponding to the target IoT mode. On the contrary, when the IoT mode switching response indicates switching reject of the IoT mode, the UE may continue to operate in the source IoT mode without switching the IoT mode.

(Proposal 1-2) Mode Switching Request Through Channel Corresponding to Target IoT Mode The present proposal relates to a method in which the UE requests the mode switching to the base station through the channel corresponding to the target IoT mode. The channel corresponding to the target IoT mode may mean a physical channel (PRACH, PUCCH, PUSCH, etc.) to which data transmission/reception parameter corresponding to the target IoT mode is applied. The data transmission/reception parameter corresponding to the target IoT mode may mean a parameter used for transmitting/receiving data in the target IoT mode. In particular, the present proposal may be effective when the UE senses a change of a communication environment late. For example, the UE operates in CE mode A in a specific communication environment and the communication environment is changed to a communication environment suitable for CE mode B, but the UE may sense the change of the communication environment after the communication environment is already changed. In this case, it may be more advantageous that the UE requests the IoT mode switching through the channel of CE mode B suitable for the changed communication environment than a case where the UE transmits the IoT mode switching request through the channel of CE mode A. That is, the reason is that the case of transmitting the IoT mode switching request through the channel of CE mode B has a higher IoT mode switching request receiving possibility of the base station than the case of transmitting the IoT mode switching request through the channel of CE mode A. For convenience of description, the method is described with an example of CE mode A/B, but the method proposed in the present disclosure is not limited thereto.

The UE requests switching from the source IoT mode to the target IoT mode through transmission of the physical channel corresponding to the target IoT mode. Here, the switching of the IoT mode may be performed through an RRC reconfiguration procedure which goes through a handshaking procedure of the request of the UE through the PUSCH and the accept/reject of the base station through the PDSCH. Alternatively, the switching of the IoT mode may be performed through an MAC layer procedure through transmission of the request of the UE through the PUSCH and implicit/explicit ACK/NACK of the base station for the corresponding request or performed through an MAC layer or physical layer request procedure through PUCCH transmission of the UE. Further, the switching of the IoT mode may be performed through a random access procedure following the request through the PRACH transmission of the UE and subsequent RAR transmission of the base station.

Additionally, before the UE transmits the IoT mode switching request to the base station, the UE may determine whether to transmit the IoT mode switching request based on a specific criterion. More specifically, the UE may determine whether to transmit th IoT mode switching request based on at least one of reference signal received power (RSRP) or reference signal received quality (RSRQ) received from the base station. For example, when the UE operates in an operation mode supporting large coverage and the UE senses that measured RSRP and RSRQ values increase to specific thresholds or more, the UE may determine that the switching of the IoT mode is required. Thereafter, the UE may transmit the IoT mode switching request to the base station based on a determination result. Further, the UE may determine a specific IoT mode determined to be most appropriate among the IoT modes supported by the UE based on the measured RSRP and RSRQ values. In this case, the IoT mode switching request transmitted by the UE may include information for requesting operation mode switching to the specific IoT mode.

In the present proposal, the UE performs data transmission/reception to/from the base station by applying a parameter based on the source IoT mode before the IoT mode switching request. Therefore, the base station may separately configure, to the UE, a parameter and a resource corresponding to the target IoT mode of the physical channel which the UE is to use for the IOT mode switching request. Here, using the physical channel corresponding to the target IoT mode may be temporally limited as compared with the physical channel to which the source IoT mode is applied.

Further, when the UE transmits the physical channel for requesting the IoT mode switching through the resource separately configured for the IoT mode switching request, the physical channel may have a higher priority than the transmission of the physical channel in the source IoT mode. That is, when the UE requests, to the base station, the IoT mode switching through the physical channel transmission in the target IoT mode on a specific resource, the UE may drop the physical channel transmission in the source IoT mode in a resource that is temporally overlapping with the specific resource or adjacent to the specific resource. As an example, the UE may request, to the base station, switching between CE modes by using a PRACH resource corresponding to a target CE mode. Here, the switching between the CE modes may be switching from the non-BL mode to the non-BL CE mode.

Further, even though the UE requests the IoT mode switching through the PRACH resource, the UE is in a state of maintaining the access to the base station without losing UL time sync with the base station. Therefore, when the UE requests the IoT mode switching through the PRACH resource, a timing advance (TA) value applied to PRACH transmission of the UE may be generally not 0 which is a value when transmitting the PRACH, but a TA value applied when transmitting other physical channels in the related art. The other physical channels may mean a physical channel of the source IoT mode, and may be the PUSCH or PUCCH. That is, when the UE transmits the IoT mode switching request, the TA value applied to the physical channel transmission of the source IoT mode may be applied to the transmission of the IoT mode switching request.

In the present proposal, when the UE requests the IoT mode switching to the base station through the physical channel corresponding to the target IoT mode, the UE receives the response to the IoT mode switching request from the base station through the PDCCH/PDSCH, and in this case, the UE may assume the PDCCH/PDSCH corresponding to the target IoT mode and attempt to receive the response of the base station. That is, the UE may request the IoT mode switching to the base station through the physical channel corresponding to the target IoT mode and the UE may attempt to receive the response of the base station through the physical channel corresponding to the target IoT mode. In other words, in order to receive the response of the base station, the UE may monitor the physical channel of the target IoT mode. The UE may receive the response of the base station through the physical channel corresponding to the target IoT mode requested by the UE regardless of the type of target IoT mode indicated by the response of the base station. As another example, since the target IoT mode indicated by the response of the base station and the target IoT mode requested by the UE may be different (that is, since the base station may transmit the response through a channel of a mode different from the target IoT mode requested by the UE), the UE may perform blind decoding for receiving the response of the base station for all channels corresponding to the IoT mode supportable thereby.

As in the present proposal (Proposal 1-1), in the process in which the UE requests the IoT mode switching to the base station and the base station responds to the request, the base station may perform a selection process for determining the target IoT mode suitable for the UE. As an example, when the UE requests the IoT mode switching through the PUCCH/PUSCH/PRACH, the base station may determine the IoT mode suitable for the UE based on a received strength of the PUCCH/PUSCH/PRACH received from the UE. Further, since the base station should operate multiple UEs accessing itself, the base station may select the IoT mode configured to the UE by considering a spare state of a time/frequency resource which may be distributed to the UEs, emergency of a service to be provide to each UE, etc.

Thereafter, the base station may indicate to switch to the specific IoT mode in response to the request of the UE based on the determination result. Here, even though the IoT mode indicated by the base station is different from the target IoT mode requested by the UE, the UE may switch the operation mode to the IoT mode indicated by the base station.

FIG. 37 is a flowchart showing an example of a method for switching IoT operation modes in a connected state in a wireless communication system proposed in the present disclosure.

More specifically, FIG. 37 illustrates an example of a method in which the UE requests the IoT mode switching to the base station through the channel corresponding to the target IoT mode.

The UE transmits, to the base station, the IoT mode switching request through the physical channel corresponding to the target IoT mode in the source IoT mode (S3710).

Next, the UE receives, from the base station, an IoT mode switching response which is a response to the IoT mode switching request (S3720). Here, the IoT mode switching response may indicate accept of the IoT mode switching or reject of the IoT mode switching.

More specifically, when the IoT mode switching response accepts the UE to switch the IoT mode, the UE may perform the data transmission/reception and/from the base station by switching the IoT mode from the source IoT mode to the target IoT mode. On the contrary, when the IoT mode switching response rejects the switching of the IoT mode, the UE may continue to perform the data transmission/reception and/from the base station in the source IoT mode.

Further, when the IoT mode switching response indicate a specific target IoT mode determined by the determination of the base station, the UE may perform the data transmission/reception and/from the base station by switching the IoT operation mode to the specific target IoT mode determined by the determination of the base station other than the target IoT mode requested thereby.

Method for Switching IoT Mode According to Indication of Base Station—Method (2)

The present method relates to a method for switching the IoT mode of the UE according to the indication of the base station.

For a UE that establishes a connection with the base station (i.e., in the RRC connected state) and performs the data transmission/reception and/from the base station, the base station may detect that uplink received power from the UE is significantly lowered. Alternatively, the UE may report, to the base station, that the downlink received power from the base station is significantly lowered. In this case, the base station may indicate the UE to switch the IoT operation mode of the UE in a mode suitable for larger coupling loss.

On the contrary, when the base station detects that uplink received power from the UE is significantly raised or the UE reports, to the base station, that the downlink received power from the base station is significantly raised, the base station may indicate the UE to switch the IoT operation mode in a mode suitable for smaller coupling loss.

The base station may indicate the UE to switch the IoT mode through the PDCCH/PDSCH. The base station may indicate the UE to switch the IoT mode through an RRC reconfiguration procedure. Further, the base station may indicate the UE to follow which IoT mode through MAC or PDCCH signaling among a plurality of preconfigured IoT modes and parameters for the plurality of IoT modes.

The base station may use two schemes for PDCCH/PDSCH transmission for indicating the IoT mode switching. That is, the base station may indicate the UE to switch the IoT mode through a method (proposal 2-1) for using the channel corresponding to the source IoT mode or a method (proposal 2-2) for using the channel corresponding to the target IoT mode.

First, the method for indicating the UE to switch the IoT mode by using the channel corresponding to the source IoT mode will be described.

(Proposal 2-1) Indicating IoT Mode Switching Based on Source IoT Mode

The base station informs the UE of the target IoT mode through transmission of the PDCCH/PDSCH corresponding to the parameter of the source IoT mode in which a current UE operates to indicate the IoT mode switching. That is, the base station may indicate the UE which currently operates in the source IoT mode to switch the IoT mode to the target IoT mode through the PDCCH/PDSCH to which a parameter required for operating in the source IoT mode is applied.

The base station may inform the UE of parameters required for operating in the target IoT mode of the UE, such as (i) the number of repetitions to be applied to PDCCH/PDSCH reception and PUCCH/PUSCH transmission of the UE and (ii) a coverage enhancement (CE) level.

In order to inform the UE of the parameters required for operating in the target IoT mode of the UE, the base station may directly configure, to the UE, the parameters through the IoT mode switching indication. Further, the base station may inform the UE of which parameter set is to be applied in the target IoT mode among parameter sets preconfigured to the UE through an RRC configuration message.

The UE that receives the IoT mode switching indication from the base station may transmit, to the base station, a response through the RACH/PUCCH/PUSCH. The response may also be expressed as an 'IoT mode switching response'. The response of the UE may be transmitted to the base station based on the parameter of the source IoT mode. Thereafter, when the base station transmits, to the UE, (i) a message for confirming that the response of the UE is received or (ii) a physical channel, the UE may start operating in the target IoT mode after receiving the (i) message or (ii) physical channel.

Further, the response of the UE which receives the IoT mode switching indication from the base station may be transmitted to the base station based on the parameter of the target IoT mode. The physical channel in which the response is transmitted may be configured to the UE through an RRC configuration, etc., in advance or included in an IoT mode switching indication message of the base station and transmitted to the UE.

FIG. 38 is a flowchart showing an example of a method for switching IoT operation modes in a connected state in a wireless communication system proposed in the present disclosure.

More specifically, FIG. 38 illustrates an example of a method in which the base station indicates, to the UE, the IoT mode switching through the channel corresponding to the source IoT mode. The channel corresponding to the source IoT mode may mean a channel to which the parameter required for operating in the source IoT mode is applied.

The UE receives, from the base station, the IoT mode switching indication through the physical channel corresponding to the source IoT mode in the source IoT mode (S3810). The IoT mode switching indication may include indication information for the target IoT mode.

Next, the UE transmits, to the base station, an IoT mode switching response which is a response to the IoT mode switching indication (S3820).

The IoT mode switching response may be transmitted to the base station based on the parameter of the source IoT mode. Further, the IoT mode switching response may be transmitted to the base station based on the parameter of the target IoT mode.

FIG. 39 is a flowchart showing another example of a method for switching IoT operation modes in a connected state in a wireless communication system proposed in the present disclosure.

More specifically, FIG. 39 illustrates another example of a method in which the base station indicates, to the UE, the IoT mode switching through the channel corresponding to the source IoT mode.

The UE receives, from the base station, the IoT mode switching indication through the physical channel corresponding to the source IoT mode in the source IoT mode (S3910). The IoT mode switching indication may include indication information for the target IoT mode.

Next, the UE transmits, to the base station, an IoT mode switching response which is a response to the IoT mode switching indication (S3920).

The IoT mode switching response may be transmitted to the base station based on the parameter of the source IoT mode. Further, the IoT mode switching response may be transmitted to the base station based on the parameter of the target IoT mode.

Thereafter, the UE receives, from the base station, an IoT switching response confirmation for confirming that the base station receives the response of the UE (S3930).

The IoT switching response indication may be (i) a message for confirming that the base station receives the response of the UE or (ii) a physical channel.

Next, the UE switches the IoT operation mode from the source IoT mode to the target IoT mode after receiving the (i) message or (ii) physical channel (S3940).

When the UE does not receive the IoT switching response confirmation from the base station, the UE may not switch the IoT mode.

(Proposal 2-2) eNB Indicates IoT Mode Switching Based on Target IoT Mode

The base station informs the UE of the target IoT mode through transmission of the PDCCH/PDSCH corresponding to the parameter of the target IoT mode to which the IoT mode of the UE is to be switched to indicate the IoT mode switching. That is, the base station may indicate the UE which currently operates in the source IoT mode to switch the IoT mode to the target IoT mode through the PDCCH/PDSCH to which a parameter required for operating in the target IoT mode is applied.

The base station may inform the UE of a parameter to be applied to a physical channel indicating the IoT mode switching, and a time/frequency/code resource in advance through the RRC configuration, etc. Accordingly, the UE may monitor the PDCCH/PDSCH resource corresponding to the source IoT mode in which the UE currently operates, and additionally periodically monitor the PDCCH/PDSCH resource corresponding to the target IoT mode.

In this case, it may be difficult that the UE simultaneously receives PDCCH/PDSCH based on different IoT modes. Accordingly, the UE may configure a time gap interval of not receiving the physical channel of the source IoT mode and monitor the physical channel of the target IoT mode in the gap interval.

The base station may inform the UE of parameters required for operating in the target IoT mode of the UE, such as (i) the number of repetitions to be applied to PDCCH/PDSCH reception and PUCCH/PUSCH transmission of the UE and (ii) a coverage enhancement (CE) level.

In order to inform the UE of the parameters required for operating in the target IoT mode of the UE, the base station may directly configure, to the UE, the parameters through the IoT mode switching indication. Further, the base station may inform the UE of which parameter set is to be applied in the target IoT mode among parameter sets preconfigured to the UE through an RRC configuration message.

The UE that receives the IoT mode switching indication from the base station may transmit, to the base station, the response through the RACH/PUCCH/PUSCH. The response may also be expressed as an 'IoT mode switching response'. The response of the UE may be transmitted to the base station based on the parameter of the source IoT mode. Thereafter, when the base station transmits, to the UE, (i) a message for confirming that the response of the UE is received or (ii) a physical channel, the UE may start operating in the target IoT mode after receiving the (i) message or (ii) physical channel.

Further, the response of the UE which receives the IoT mode switching indication from the base station may be transmitted to the base station based on the parameter of the target IoT mode. The physical channel in which the response is transmitted may be configured to the UE through an RRC configuration, etc., in advance or included in an IoT mode switching indication message of the base station and transmitted to the UE.

FIG. 40 is a flowchart showing an example of a method for switching IoT operation modes in a connected state in a wireless communication system proposed in the present disclosure.

More specifically, FIG. 40 illustrates an example of a method in which the base station indicates, to the UE, the IoT mode switching through the channel corresponding to the target IoT mode. The channel corresponding to the target IoT mode may mean a channel to which the parameter required for operating in the target IoT mode is applied.

The UE receives, from the base station, the IoT mode switching indication through the physical channel corresponding to the target IoT mode in the source IoT mode (S4010). The IoT mode switching indication may include indication information for the target IoT mode.

Next, the UE transmits, to the base station, an IoT mode switching response which is a response to the IoT mode switching indication (S4020).

The IoT mode switching response may be transmitted to the base station based on the parameter of the source IoT mode. Further, the IoT mode switching response may be transmitted to the base station based on the parameter of the target IoT mode.

FIG. 41 is a flowchart showing another example of a method for switching IoT operation modes in a connected state in a wireless communication system proposed in the present disclosure.

More specifically, FIG. 41 illustrates another example of a method in which the base station indicates, to the UE, the IoT mode switching through the channel corresponding to the target IoT mode.

The UE receives, from the base station, the IoT mode switching indication through the physical channel corresponding to the target IoT mode in the source IoT mode (S4110). The IoT mode switching indication may include indication information for the target IoT mode.

Next, the UE transmits, to the base station, an IoT mode switching response which is a response to the IoT mode switching indication (S4120).

The IoT mode switching response may be transmitted to the base station based on the parameter of the source IoT mode. Further, the IoT mode switching response may be transmitted to the base station based on the parameter of the target IoT mode.

Thereafter, the UE receives, from the base station, an IoT switching response confirmation for confirming that the base station receives the response of the UE (S4130).

The IoT switching response indication may be (i) a message for confirming that the base station receives the response of the UE or (ii) a physical channel.

Next, the UE switches the IoT operation mode from the source IoT mode to the target IoT mode after receiving the (i) message or (ii) physical channel (S4140).

When the UE does not receive the IoT switching response confirmation from the base station, the UE may not switch the IoT mode.

FIG. 42 is a flowchart showing an example an operation implemented in a UE for performing a method for switching IoT operation modes in a connected state in a wireless communication system proposed in the present disclosure.

More specifically, in the method in which the UE switches the Internet of things (IoT) mode in the wireless communication system, the UE transmits, to the base station, an operation mode switching request for requesting switching of a source IoT mode which is a current operation mode of the UE through a specific physical channel in a radio resource control (RRC) connected state (S4210).

Here, the specific physical channel may be one of physical uplink shared channel (PUSCH), physical uplink control channel (PUCCH), and physical random access channel (PRACH).

Further, the operation mode switching request may include indication information indicating switching from the source IoT mode to a first target IoT mode.

Further, the specific physical channel is a channel to which a parameter for data transmission/reception in the source IoT mode is applied.

In this case, when the specific physical channel is one of the PUCCH and the PRACH, the specific physical channel may be scheduled on a specific resource which is separately configured for transmission of the operation mode switching request.

Additionally, Further, the specific physical channel is a channel to which a parameter for data transmission/reception in the first target IoT mode is applied.

In this case, the specific physical channel may be scheduled on a specific resource of the first target IoT mode which is configured separately for transmission of the operation mode switch request, and transmission through an uplink physical channel of the source IoT mode which is scheduled on a resource that is temporally overlapping with the specific resource or adjacent to the specific resource may be dropped.

Further, when the specific physical channel is the PRACH, a timing advance (TA) value applied to transmission of the operation mode switch request may be the same as a TA value applied to an uplink physical channel of the source IoT mode.

Further, the TA value applied to the uplink physical channel of the source IoT mode may be a value greater than or less than 0.

Further, the operation mode switching response may be received through a downlink physical channel scheduled on a resource of the first target IoT mode, and the operation mode switching response may include indication information instructing for instructing a switch from the operation mode to a target IoT mode different from the first target IoT mode.

Next, the UE receives, from the base station, an IoT mode switching response to the operation mode switching request (S4220).

Here, when the operation mode switching response includes accept information indicating accept for the indication information, the specific target IoT mode may be the first target IoT mode.

Further, when the operation mode switching response includes indication information indicating switching from the source IoT mode to a second target IoT mode, the second target IoT mode may be determined based on a received signal strength of the operation mode switching request.

In this case, when the first target IoT mode and the second target IoT mode are different from each other, the specific target mode may be the second target mode.

Last, the UE switches from the source IoT mode to a specific target IoT mode based on the operation mode switching response (S4230).

Additionally, the UE may further perform an operation of receiving a reference signal from the base station, and determining whether to transmit the operation mode switching request based on the reference signal.

The additional operation of the UE may be performed before step S4210, between steps 4210 and 4230, after step S4230.

FIG. 43 is a flowchart showing an example an operation implemented in a base station for performing a method for switching IoT operation modes in a connected state in a wireless communication system proposed in the present disclosure.

More specifically, in the method in which the UE switches the Internet of things (IoT) mode in the wireless communication system, the base station receives, from the UE, an operation mode switching request for requesting switching of a source IoT mode which is a current operation mode of the UE through a specific physical channel in a radio resource control (RRC) connected state (S4310).

Here, the specific physical channel may be one of physical uplink shared channel (PUSCH), physical uplink control channel (PUCCH), and physical random access channel (PRACH).

Further, the operation mode switching request may include indication information indicating switching the source IoT mode to a first target IoT mode.

Further, the specific physical channel is a channel to which a parameter for data transmission/reception in the source IoT mode is applied.

In this case, when the specific physical channel is one of the PUCCH and the PRACH, the specific physical channel is scheduled on a specific resource which is separately configured for transmission of the operation mode switching request.

Additionally, Further, the specific physical channel is a channel to which a parameter for data transmission/reception in the first target IoT mode is applied.

In this case, the specific physical channel may be scheduled on a specific resource of the first target IoT mode which is configured separately for transmission of the operation mode switch request, and transmission through an uplink physical channel of the source IoT mode which is scheduled on a resource that is temporally overlapping with the specific resource or adjacent to the specific resource may be dropped.

Further, when the specific physical channel is the PRACH, a timing advance (TA) value applied to transmission of the operation mode switch request may be the same as a TA value applied to an uplink physical channel of the source IoT mode.

Further, the TA value applied to the uplink physical channel of the source IoT mode may be a value greater than or less than 0.

Further, the operation mode switching response may be received through a downlink physical channel scheduled on a resource of the first target IoT mode, and the operation mode switching response may include indication information instructing for instructing a switch from the operation mode to a target IoT mode different from the first target IoT mode.

Next, the base station transmits, from the UE, an IoT mode switching response to the operation mode switching request (S4320).

Here, when the operation mode switching response includes accept information indicating accept for the indication information, the specific target IoT mode may be the first target IoT mode.

Further, when the operation mode switching response includes indication information indicating switching the source IoT mode to a second target IoT mode, the second target IoT mode may be determined based on a received signal strength of the operation mode switching request.

In this case, when the first target IoT mode and the second target IoT mode are different from each other, the specific target mode may be the second target mode.

The UE may switch from the source IoT mode to a specific target IoT mode based on the operation mode switching response.

Additionally, the base station may transmit the reference signal to the UE, and the UE may determine whether to transmit the operation mode switching request based on the reference signal.

The additional operation of the base station may be performed before step S4310, between steps 4310 and 4330, after step S4330.

The aforementioned embodiments are achieved by combination of structural elements and features of the present disclosure in a predetermined manner. Each of the structural elements or features should be considered selectively unless specified separately. Each of the structural elements or features may be carried out without being combined with other structural elements or features. In addition, some structural elements and/or features may be combined with one another to constitute the embodiments of the present disclosure. The order of operations described in the embodiments of the present disclosure may be changed. Some structural elements or features of one embodiment may be included in another embodiment, or may be replaced with corresponding structural elements or features of another embodiment. Moreover, it is apparent that some claims referring to specific claims may be combined with another claims referring to the other claims other than the specific claims to constitute the embodiment or add new claims by means of amendment after the application is filed.

The embodiments of the present disclosure may be achieved by various means, for example, hardware, firmware, software, or a combination thereof. In a hardware configuration, the methods according to the embodiments of the present disclosure may be achieved by one or more ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, microcontrollers, microprocessors, etc.

In a firmware or software configuration, the embodiments of the present disclosure may be implemented in the form of a module, a procedure, a function, etc. Software code may be stored in the memory and executed by the processor. The memory may be located at the interior or exterior of the processor and may transmit data to and receive data from the processor via various known means.

It will be apparent to those skilled in the art that various modifications and variations can be made in the present disclosure without departing from the spirit or scope of the inventions. Thus, it is intended that the present disclosure covers the modifications and variations of this invention provided they come within the scope of the appended claims and their equivalents.

INDUSTRIAL APPLICABILITY

The method for transmitting the uplink data with high reliability n the wireless communication system of the present disclosure is described based on an example in which the method is applied to the 3GPP NR system, but may be applied to various wireless communication systems in addition to the 3GPP NR system.

The invention claimed is:

1. A method, by a terminal, for switching an Internet of things (IoT) mode in a wireless communication system, the method comprising:
   transmitting, to a base station, an operation mode switch request requesting a switch of a source IoT mode which is a current operation mode of the terminal through a specific physical channel, in a radio resource control (RRC) connection state;
   receiving, from the base station, an operation mode switch response to the operation mode switch request; and
   switching from the source IoT mode to a specific target IoT mode based on the operation mode switch response.

2. The method of claim 1,
   wherein the source IoT mode is one of non-BL (bandwidth reduced low complexity) mode, non-BL CE (coverage enhancement) mode, eMTC (enhanced machine type communication) mode, and NB (narrowband)-IoT mode, and wherein the target IoT mode is one of IoT modes different from the source IoT mode.

3. The method of claim 1,
wherein the specific physical channel is one of a physical uplink physical shared channel (PUSCH), a physical uplink control channel (PUCCH), and a physical random access channel (PRACH).

4. The method of claim 1,
wherein the operation mode switch request includes indication information for instructing a switch from the source IoT mode to a first target IoT mode.

5. The method of claim 4,
wherein based on the operation mode switch response including acceptance information instructing acceptance of the indication information, the specific target IoT mode is the first target IoT mode.

6. The method of claim 4,
Wherein based on the operation mode switch response includes indication information for instructing a switch from the source IoT mode to a second target IoT mode, the second target IoT mode is determined based on a received signal strength of the operation mode switch request.

7. The method of claim 6,
wherein based on that the first target IoT mode and the second target IoT mode are different from each other, the specific target mode is the second target mode.

8. The method of claim 3,
wherein the specific physical channel is a channel to which a parameter for data transmission/reception in the source IoT mode is applied.

9. The method of claim 8,
wherein based on the specific physical channel being one of the PUCCH and the PRACH, the specific physical channel is scheduled on a specific resource which is separately configured for transmission of the operation mode switch request.

10. The method of claim 4,
wherein the specific physical channel is a channel to which a parameter for data transmission/reception in the first target IoT mode is applied.

11. The method of claim 10,
wherein the specific physical channel is scheduled on a specific resource of the first target IoT mode which is configured separately for transmission of the operation mode switch request, and
wherein transmission through an uplink physical channel of the source IoT mode which is scheduled on a resource that is temporally overlapping with the specific resource or adjacent to the specific resource is dropped.

12. The method of claim 10,
wherein based on the specific physical channel being PRACH, a timing advance (TA) value applied to transmission of the operation mode switch request is the same as a TA value applied to an uplink physical channel of the source IoT mode.

13. The method of claim 12,
wherein the TA value applied to the uplink physical channel of the source IoT mode is a value greater than or less than 0.

14. The method of claim 10,
wherein the operation mode switch response is received through a downlink physical channel scheduled on a resource of the first target IoT mode.

15. The method of claim 13,
wherein the operation mode switch response includes indication information instructing for instructing a switch from the operation mode to a target IoT mode different from the first target IoT mode.

16. The method of claim 1, further comprising:
receiving, from the base station, a reference signal; and
determining whether to transmit the operation mode switch request based on the reference signal.

17. A method, by a base station, for switching an Internet of things (IoT) mode in a wireless communication system, the method comprising:
receiving, from a terminal, an operation mode switch request requesting a switch of a source IoT mode which is a current operation mode of the terminal through a specific physical channel, in a radio resource control (RRC) connection state; and
transmitting, to the terminal, an operation mode switch response to the operation mode switch request,
wherein the source IoT mode is switched to a specific target IoT mode based on the operation mode switch response.

18. A terminal for switching an Internet of things (IoT) mode in a wireless communication system, the terminal comprising:
a transmitter for transmitting a radio signal;
a receiver for receiving the radio signal; and
a processor operatively connected to the transmitter and the receiver,
wherein the processor is configured to control:
the transmitter to transmit, to a base station, an operation mode switch request requesting a switch of a source IoT mode which is a current operation mode of the terminal through a specific physical channel, in a radio resource control (RRC) connection state;
the receiver to receive, from the base station, an operation mode switch response to the operation mode switch request; and
to switch from the source IoT mode to a specific target IoT mode based on the operation mode switch response.

19. A base station for switching an Internet of things (IoT) mode in a wireless communication system, the base station comprising:
a transmitter for transmitting a radio signal;
a receiver for receiving the radio signal; and
a processor operatively connected to the transmitter and the receiver,
wherein the processor is configured to control:
the receiver to receive, from a terminal, an operation mode switch request requesting a switch of a source IoT mode which is a current operation mode of the terminal through a specific physical channel, in a radio resource control (RRC) connection state; and
the transmitter to transmit, to the terminal, an operation mode switch response to the operation mode switch request,
wherein the source IoT mode is switched to a specific target IoT mode based on the operation mode switch response.

20. One or more non-transitory computer-readable media (CRM) storing one or more instructions, comprising:
wherein the one or more instructions executable by the one or more processors are executed by a terminal,
the terminal:
transmits, to a base station, an operation mode switch request requesting a switch of a source IoT mode which is a current operation mode of the terminal through a specific physical channel, in a radio resource control (RRC) connection state;

receives, from the base station, an operation mode switch response to the operation mode switch request; and switches from the source IoT mode to a specific target IoT mode based on the operation mode switch response.

* * * * *